United States Patent [19]

Egyed

[11] Patent Number: 5,342,258
[45] Date of Patent: Aug. 30, 1994

[54] COMBINATIONAL INCREMENTALLY VARIABLE TRANSMISSIONS AND OTHER GEARING ARRANGEMENTS ALLOWING MAXIMUM KINEMATIC DEGREES OF FREEDOM

[75] Inventor: Mark J. Egyed, Ossining, N.Y.
[73] Assignee: Motion Sciences Inc., Ossining, N.Y.
[21] Appl. No.: 748,958
[22] Filed: Aug. 16, 1991
[51] Int. Cl.$^5$ ............................................. F16H 57/10
[52] U.S. Cl. ........................................ 475/281; 475/280
[58] Field of Search .................................. 475/280, 281

[56] References Cited

U.S. PATENT DOCUMENTS

| | | | |
|---|---|---|---|
| 2,844,975 | 7/1958 | Kelbel et al. | 475/280 |
| 2,990,727 | 7/1961 | Miller | 475/281 |
| 3,264,902 | 8/1966 | Breting et al. | 475/68 |
| 3,705,521 | 12/1972 | Smith | 475/281 X |
| 3,722,300 | 3/1973 | Crooks | 74/15.63 |
| 3,739,647 | 6/1973 | Crooks | 74/15.63 |
| 3,929,037 | 12/1975 | Marsch | 475/218 |
| 3,956,946 | 5/1976 | Murakami et al. | 475/276 |
| 3,996,817 | 12/1976 | Winzeler | 475/69 |
| 3,999,448 | 12/1976 | Murakami et al. | 475/276 |
| 4,070,927 | 1/1978 | Polak | 475/286 |
| 4,223,569 | 9/1980 | Koivunen et al. | 74/665 GE |
| 4,509,389 | 4/1985 | Vahratian et al. | 475/66 |
| 4,559,848 | 12/1985 | Kerr . | |
| 4,592,250 | 6/1986 | Plasencia et al. . | |
| 4,594,908 | 6/1986 | Akashi et al. | 74/359 |
| 4,594,914 | 6/1986 | Kubo et al. | 475/66 |
| 4,638,688 | 1/1987 | Hiraiwa . | |
| 4,640,152 | 2/1987 | Quick et al. . | |
| 4,653,347 | 3/1987 | Hiraiwa . | |
| 4,653,348 | 3/1987 | Hiraiwa . | |
| 4,660,439 | 4/1987 | Hiraiwa . | |
| 4,683,776 | 8/1987 | Klemen . | |
| 4,802,385 | 2/1989 | Hiraiwa . | |
| 4,813,298 | 3/1989 | Kurtossy | 475/330 |
| 4,813,300 | 3/1989 | Ohkubo | 74/718 |
| 4,813,301 | 3/1989 | Aoki . | |
| 4,817,462 | 4/1989 | Doch et al. | 475/56 |
| 4,850,247 | 7/1989 | Yu | 475/342 |
| 4,864,892 | 9/1989 | Ando et al. . | |
| 4,867,011 | 9/1989 | Garrett | 475/54 |
| 4,884,471 | 12/1989 | Doggett et al. | 475/285 |
| 4,884,472 | 12/1989 | Miura et al. | 475/148 |

(List continued on next page.)

Primary Examiner—Leslie A. Braun
Assistant Examiner—Daniel Wittels
Attorney, Agent, or Firm—Mark J. Egyed

[57] ABSTRACT

In power transmissions having power transmitting structures available for selective coupling to a plurality of power transmitting paths, increased kinematic degrees of freedom result when an input transmitter allows having a reaction element grounded in a reference frame, usually the transmission casing, inserted topologically inside a power transmitting structure or path. The reaction element may be selectively coupled to at least one power transmitting path to ground or restrain selected gearing elements of a geartrain. Interior placement of the reaction element allows that gearing elements or power transmitting paths normally blocked from access to the transmission case or a reference frame may be selectively coupled to either a power transmitting structure or to a braking or restraining structure, substantially increasing the number of possible ratio states.

Resultant embodiments include combinational incrementally variable transmissions (CIVT's), which have a minimum number of gearset linkages and where n free or independent gearing elements can have at least 2 kinematic states, yielding at least $2^n - 1$ possible distinct ratio states. Clutching to achieve these ratio states may be combinational and independent. CIVT's allow using fewer component gearsets than needed previously to form inexpensive, high multi-speed, wide ratio transmissions that do not require final ratio reduction for automotive applications. Embodiments shown include an eight speed planetary power shift transaxle transmission that uses two singly linked simple planetary gearsets and one optional input transmitter planetary gearset; a five speed transmission using a single planetary gearset; and an eighteen speed transmission using three singly linked simple planetary gearsets.

15 Claims, 27 Drawing Sheets

U.S. PATENT DOCUMENTS

| | | | |
|---|---|---|---|
| 4,914,978 | 4/1990 | Moroto et al. | 475/71 |
| 4,916,977 | 4/1990 | Aoki et al. | 475/205 |
| 4,916,980 | 4/1990 | Asada et al. | 475/281 |
| 4,934,216 | 6/1990 | Sandel et al. | 475/59 |
| 4,938,097 | 7/1990 | Pierce | 475/72 |
| 4,955,851 | 9/1990 | Arzoian et al. | 475/59 |
| 4,963,124 | 10/1990 | Takahashi et al. | 475/278 |
| 4,973,297 | 11/1990 | Bergles | 475/289 |
| 4,976,670 | 12/1990 | Klemen | 475/278 |
| 4,978,328 | 12/1990 | Pierce | 475/66 |
| 4,981,050 | 1/1991 | Kurtossy | 475/198 |
| 4,985,011 | 1/1991 | Asada et al. | 475/278 |
| 5,006,102 | 4/1991 | Takase et al. | 475/282 |
| 5,007,887 | 4/1991 | Asada | 475/284 |
| 5,030,178 | 7/1991 | Ming-Luen | 475/36 |
| 5,030,186 | 7/1991 | Asada | 475/278 |
| 5,030,187 | 7/1991 | Asada | 475/278 |
| 5,039,305 | 8/1991 | Pierce | 475/71 |
| 5,046,999 | 9/1991 | Liu et al. | 475/281 |
| 5,049,116 | 9/1991 | Asada | 475/269 |
| 5,057,063 | 10/1991 | Asada et al. | 475/278 |
| 5,059,162 | 10/1991 | Otsuka | 475/276 |
| 5,069,656 | 12/1991 | Sherman | 475/281 X |
| 5,088,354 | 2/1992 | Asada | 475/281 X |

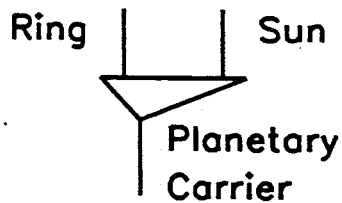
Fig. 1
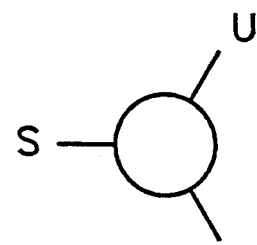
Fig. 2
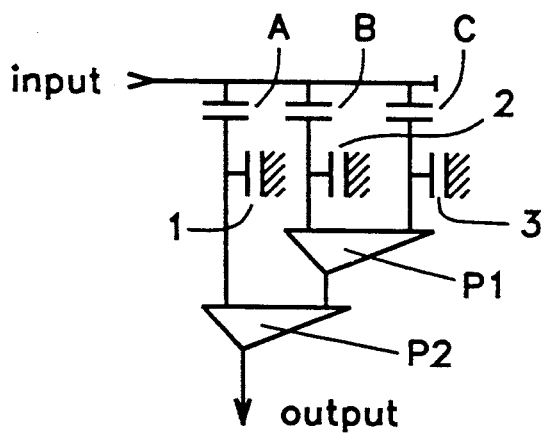
Fig. 3
| Ratio | Clutch | | | OWC | | |
|---|---|---|---|---|---|---|
| | A | B | C | 1 | 2 | 3 |
| N | | | | | | |
| 1 | | | X | X | X | |
| 2 | | X | | X | | X |
| 3 | | X | X | X | | |
| 4 | X | | | | X | X |
| 5 | X | | X | | X | |
| 6 | X | X | | | | X |
| 7 | X | X | X | | | |
Fig. 4
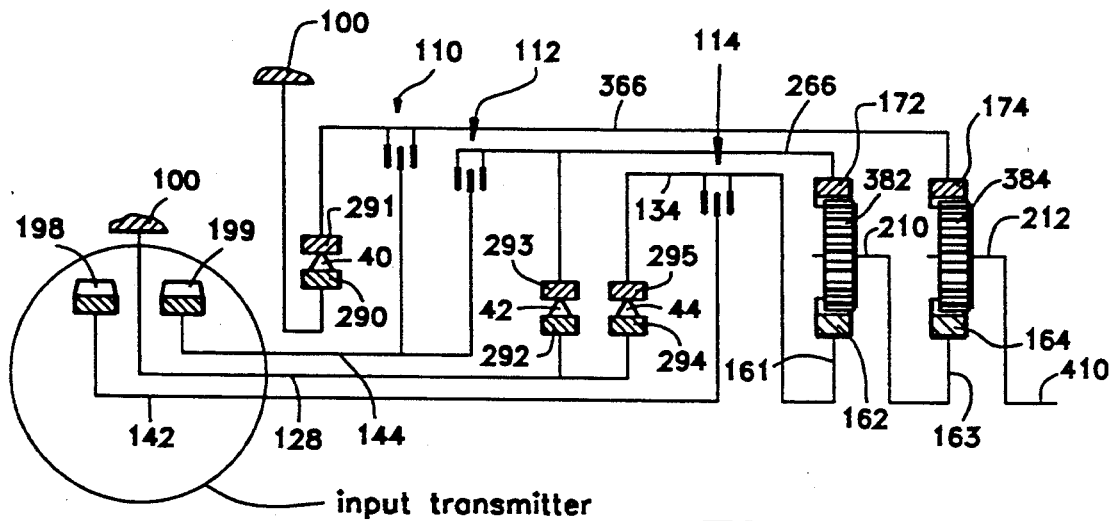
Fig. 5

COMBINATIONAL INCREMENTALLY VARIABLE TRANSMISSIONS AND OTHER GEARING ARRANGEMENTS ALLOWING MAXIMUM KINEMATIC DEGREES OF FREEDOM

BACKGROUND OF THE INVENTION

1. Field of the Invention

This invention relates to mechanical power transmissions, either vehicular or stationary, where output angular speed or torque is modulated or systematically varied. Emphasis in this disclosure is on automotive transmissions, which provide unique engineering challenges as described below. However, as will be evident, the teaching presented here can be applied to power transmissions generally.

2. Background and Description of the Prior Art

Issues Relating to Application of Invention to Passenger Vehicles

Civilian conservation of motor fuels figures importantly in the health of national economies and air quality worldwide. To date, billions of dollars have been invested to reduce automotive fuel consumption, including engineering for vehicle weight reduction, creation of aerodynamic body designs, and improved design of engines, tires, braking systems, fuels and lubricants. However, large potential savings remain in better matching the operation of automotive prime movers to their loads. In developing usable output power, the operating efficiency of internal combustion engines and most other prime movers varies greatly with output speed and torque. Although recent improved automotive transmissions have better exploited this, drivetrains that allow functioning of the prime mover at optimum or near optimum efficiency for all operating regimes have proved impractical in practice.

The need to change transmission ratio to suit load conditions arises from the nature of the typical prime mover. Power developed from a Rankine (steam), Otto (spark ignition), Diesel, Stirling or other thermodynamic cycle is presented at a piston face or the equivalent, giving what is known as indicated power. Much of this power is never delivered to the drivetrain. In transporting working fluids into and out of the engine, some indicated power is dissipated through pumping losses associated with the work done during the intake and exhaust strokes or analogous functions, leaving what is called net power. Further subtracting power lost to overcome engine friction (tribological losses), and to drive internal auxiliaries, such as an engine oil pump, water pump, supercharger or scavenging pump, etc., one is left with power available at the output shaft, called brake power. It is brake power that is available for driving vehicle accessories and for vehicle propulsion. The ratio of brake power to indicated power is termed brake mechanical efficiency.

Brake mechanical efficiency varies greatly in practice because the above losses are a function of engine speed, and torque or mean effective pressure (MEP), which is the time-averaged pressure on the piston face(s) or equivalent power-receiving structure(s). For internal combustion spark-ignition engines, for example, exhaust backpressure and resultant pumping losses escalate with increasing indicated power; throttling or intake pumping losses are greatest when operating with partial throttle openings; and tribological losses, while almost independent of engine load or throttle opening, increase as nearly the square of the engine speed. The result is that to generate a desired amount of brake power, WOT (wide-open throttle) or near WOT conditions which produce high combustion chamber mean effective pressures (MEP) yield the highest brake mechanical efficiency.

There are many times such as during highway cruising where required engine brake power is low. In practice, as the indicated power is decreased, the proportion of indicated work disappearing in friction, pumping work and other losses is increased. Operating the prime mover efficiently for low power operation calls for low engine speeds at high MEP. Presently used transmissions have a limited range or span of available ratios, and as a result the maximum or top transmission ratio is still low or undergeared for modest power requirements at cruising speeds. This causes higher engine speeds that are appropriate for producing medium or high brake power levels to be used often for generating low power levels—at low MEP—and much of the fuel burned is wasted. This increase in fuel consumption is accepted, so as to provide for acceleration on demand and adequate hill climbing ability while in the top gear or ratio state.

To produce the full spread of allowable brake power most efficiently given exhaust emissions constraints, one needs to follow an ideal operating schedule for the engine in question. Useful for this purpose is an alternate measure of engine efficiency given by the brake specific fuel consumption (BSFC), or mass fuel rate per unit engine output power, usually expressed as grams of fuel per kilowatt-hour output or lbs. of fuel per brake horse-power-hour, for a specific operating regime. The specific operating regime is usually specified by two variables: (1) engine speed (RPM), and (2), any one of the following three comparable quantities: output torque (Nm or ft. lbs.), or brake power (kW or hp), or BMEP, brake mean effective pressure (kPa or psi), which is the fraction of the MEP attributable to torque at the output shaft. The BSFC gives the energy conversion efficiency of the prime mover, fully accounting for the efficiency of the thermodynamic cycle as well as the brake mechanical efficiency. Like the brake mechanical efficiency, the brake specific fuel consumption (BSFC) also varies significantly with engine BMEP and RPM, and lines of constant BSFC are often plotted graphically on a cartesian map of BMEP (or output torque or brake power) versus RPM. Although at all times the prime mover is operating on some point on this BSFC map, only certain regions on the BSFC map represent operating conditions yielding optimum efficiency. The region of lowest BSFC is typically an island in the upper BMEP region of the BSFC map. An ideal operating schedule stays near or inside this island, and thus tends to select high torque, low speed operation except when high brake power is required.

To follow this ideal operating schedule, a wide ratio span transmission must be used to tailor the load conditions to operate the prime mover as desired. Although with presently available transmissions the overall ratio coverage has gone up, particularly with recent use of 4 and 5 speed automatic overdrive transmissions, engine-transmission matching is far from adequate, with the largest deviations from optimum protocol occurring when vehicle speed is high and required power is low. This operating mode occurs repeatedly—about 55% of miles traveled are at 80 kmh (50 MPH) or above [ref: SAE Paper 740594, Fuel Economy Trends and Catalytic Devices, Robert C. Stempel, Stuart W. Martens, General Motors Corp., August 1974], and level or near level grade road conditions prevail.

In the past, exhaust emission constraints associated with high peak combustion temperatures may have weighed against strict adherence to a high MEP operating schedule. However, recent minor improvements in engine design using fast burn rates allow WOT or high MEP operation without the production of oxides of nitrogen ($NO_x$) in the exhaust gas normally associated with high MEP in an internal combustion theatre. The result is that usable ratio ranges greater than 5 to 1 can yield significant fuel savings while still keeping exhaust emissions to a minimum. Masanori, Kadota, and Sugiyama, Nissan Motor Company, Limited, 1981; also SAE Paper 800920, "The Attributes of Fast Burning Rates in Engines," James N. Mattavi, General Motors Research Laboratories, 1980]. These fast burn engines usually make use of exhaust gas recirculation (EGR) dilution of the fuel mixture where a portion of the engine exhaust gas is redirected into the intake charge. They are presently available with highly desirable features such as multi-point fuel injection in production passenger cars [ref: SAE paper No. 830574, "Comparison of CVT Engine Operating Schedules," David Ganoung, February 1983].

To provide the engine-drivetrain control needed, engineers have long envisaged storing BSFC and exhaust emission information in electronic PROM (programmable read-only memory) and using a microprocessor electronic control unit (ECU), generating command signals that follow a predetermined optimum operating schedule. The accelerator pedal would no longer control throttle position, but instead would send a signal to the ECU indicating desired output horsepower. The ECU would receive other system inputs like engine RPM, vehicle speed, manifold absolute pressure (MAP) and mass air flow, engine knock or detonation sensor information, rate of accelerator pedal movement, engine coolant or water jacket temperature, transmission oil temperature, engine oil pressure and temperature, vehicle orientation, status of emission control components (e.g., EGR, catalytic converter), oxygen content in exhaust gas, etc. Using this information the ECU would choose values for all operating variables like throttle position, richness of the fuel mixture, ignition timing, EGR intake fraction, and notably the transmission drive ratio, to produce desired power with maximum efficiency given restraints on exhaust emissions. This type of automatic control, including an automatic transmission, allows for longer engine and exhaust system service lifetimes, and quieter vehicle operation, with no loss of performance. One could even tailor the control system characteristics to emulate the feel of the accelerator pedal of a conventional throttle-regulated system, which tends to be self-regulating at cruising speeds. This would avoid need for unnecessary manipulation of the pedal to accommodate changing road grade or load conditions, such as shifting tail winds.

Of course, increasing fuel economy by extensive use of overdrive gearing and frequent low engine speed, high torque operation can require some design changes. To minimize vibration, engine mounts and other support structures can be redesigned to permit low rpm operation without troublesome resonances. To maintain operating temperatures, the engine cooling system can be equipped to shield itself from excessive heat transfer during low power operation. To enhance the flow characteristics of the intake fuel charge, reoptimized or variable valve timing can provide for better fuel mixture induction at very low speeds. Also, in devising an optimum engine operating schedule, it may be helpful to make a compromise by ruling out engine operation in the very low rpm regime (e.g., less than 900 rpm) or by limiting such operation to partial throttle or moderate torque values. If desired, this scheduling can be added to engine torque management (ETM) information where the scheduled ignition timing may be retarded during selected ratio changes to help achieve smooth power shifts at high engine torque.

Criteria that Determine Suitability

Although many multiple speed or continuously variable ratio drivetrains have been proposed to provide engine-drivetrain matching as described above, not one has yet satisfied all of the following nine essential requirements:

[1] Cost—Manufacturing and Development

Transmission component parts should be easily fabricated and well understood. Engineering designs that require approaching engineering limits on materials (e.g., tensile strength) or require that components receive much individual attention, such as selective fitting or modifying of mass-produced components to assure precise geometries or mutual compatibility, prove too costly and time consuming given the competitive nature of the automotive market.

The number of components must also be kept to a minimum, particularly the number of needed gearing elements, which are among the most expensive components in transmission units. Planetary gearsets, for example, must be made of high quality steels, and must be precisely machined, balanced, and finished. Tolerances and clearances in the gearset must be kept to a minimum over the life of the transmission to prevent premature destruction or chipping of the gears by self-perpetuated chatter or vibration. Also, a large number of gearing elements require additional lubrication provisions, as each gearset typically must remain bathed in copious amounts of lubricating or transmission oil to prevent wear and overheating and to keep energy losses to a minimum. The added internal passages and oil output required increase unit manufacturing cost.

[2] Reliability

Any new transmission design must have predictable failure modes and meet or exceed the criteria for statistical failure rates of presently available units. A design that typically requires substantial overhaul on a time scale less than the lifetime of a well-maintained passenger vehicle is generally unacceptable to manufacturers.

Particularly troublesome for continuously variable ratio drivetrains that rely on variable path frictional or contact phenomena for power transmission are the effects of unusual operating conditions. Critical events such as sudden variations in throttle opening and/or vehicle speed, or temporary shortages in fluid or lubrication media, or minor control system malfunctions, often lead to immediate or future damage to critical transmission components. A transmission must be operable through a wide variety of operating temperatures, loads, and operating speeds and other conditions for years without upsetting any critical geometries or critical parameters such as static and dynamic coefficients of friction at clutch lining or contact surfaces.

[3] Space Constraints, Including Axial Length

Space under the hood is at a premium in today's passenger vehicles, particularly for vehicles with front wheel drive transaxle transmissions. Space demands are posed by the geometry of aerodynamic outerbody and underbody profiles, by a recent trend toward larger high displacement engines, and by clearance needed for accessories such as air conditioning compressors, power steering pumps and emission control equipment such as air pumps and catalytic converters. Furthermore, dedicated "empty" space must also be provided for underhood access and serviceability and to provide corridors and zones needed for adequate circulation of cooling air. This latter consideration is extremely important, as some component systems cannot operate at elevated underhood temperatures (e.g., fuel delivery systems), and the service life of many components (e.g., automotive alternators) can be cut short by even a brief departure from maximum operating temperatures.

For front drive transaxle transmissions in particular, axial length is critical, and many drivetrains proposed in the prior art have proved to be impractical from this standpoint alone. There are typically 66 centimeters of usable chassis space between the driving wheels in which to house a transmission unit. Presently used front drive automatic transaxle transmissions typically have axial lengths of 50–52 centimeters, often with the transaxle unit offset toward one front wheel to allow room for bolting to and engagement with one end of a transversely mounted engine. There is little additional room for transaxle units having longer axial lengths, perhaps another 10 centimeters. Also cramped is lateral space, and efforts to use countershafts or multiple axes to house subassemblies of complex drivetrains have met with obstacles, not the least of which are the added cost and weight of a large laterally spread-out transmission case or housing.

[4] Power Density and Torque Capacity

A suitable transmission unit must have a sufficiently high ratio of power handling capacity to transmission unit weight. In addition, torque handling capacity (torque rating) must be equal to or greater than that of the prime mover.

[5] Driveability and Customer Satisfaction

This continues to be an overriding consideration when designing transmissions for automotive use. Noise or vibration must be kept to a minimum, while ratio changes must be smooth, consistent, and responsive to changes sought by the driver. Ratio steps on discrete ratio transmission systems should be small so as to minimize rate of change of vehicle acceleration (jerk) and torsional shock or vibrations in driveline components that cause disturbing sensations. [ref: "Determinants of Off-Road 'Shift Quality'," J. R. Duncan et al, Deere & Co., Applied Ergonomics, September 1985, p. 173].

[6] Conversion Efficiency

Power losses within the transmission should be low, to allow an operating efficiency of 90% or better for moderate to high throttle operation. Waste heat generated from coupling through fluids such as in conventional open (unlocked) hydrodynamic torque converters results in less energy available for application at the driving wheels. It is therefore important to directly couple the prime mover to its load at the lowest possible vehicle speed. Also to be avoided are excessive gear meshing losses which increase with the number of planetary or other gearsets used for power transmission.

[7] Ratio Range

Whether continuously variable or discrete, the ratio range, or span of possible ratios of a transmission, is the most important criterion in providing for increased fuel economy. Ideally the ratio range should allow optimum operation of the prime mover at all foreseeable vehicle speeds and load conditions. With drivetrains presently in use, ratio range is inadequate, and the choice of a final drive (reduction) ratio for a vehicle engine/powertrain combination requires making a tradeoff between performance and fuel economy for the vehicle lifetime. This is often a difficult decision for the manufacturer. Many makers choose to offer the same vehicle with a variety of "axle" or final drive ratios. Once chosen, the final drive ratio determines the acceleration and hill climbing performance of the vehicle. Fuel economy suffers when final drive ratios giving high performance are selected. With a wide ratio transmission, however, one is not resigned to making this tradeoff, as all operating regimes can be accommodated with no loss of performance.

[8] Distribution and Size of Ratio Increments

With discrete ratio transmissions, ratio increments must be chosen to cover adequately the possible range of output speeds while keeping the size of the ratio increments small. Decreasing the size of ratio increments provides for better fuel economy, driver pleasability, longer clutch life, and allows use of clutch application control systems that are simpler and less prone to damaging clutch linings from "soft" shifts and other system malfunctions. Small increments also allow for frequent adjustments of ratio to suit load conditions in a manner that is smooth and well received by the driver. When large ratio increments are used, a ratio selection problem arises: the desired operating regime often straddles two speed ratios. An example of this problem in automatic transmissions having a "lock-up" torque converter and four speeds, including an overdrive high gear, is the annoying "hunting" phenomenon found at certain vehicle speeds, whereby repeated shifts occur back and forth between third gear, typically a 1:1 ratio, and the fourth or overdrive gear, typically a 0.7:1 or 0.66:1 ratio. Alternatively, in seeking to avoid this phenomenon, the clutch application control system will have a built-in resistance to sudden or repeated gear changes, causing a delayed or an altogether suppressed ratio shift. This is highly undesirable among drivers seeking fast powertrain response, and does not encourage public acceptance of automatic transmission control.

[9] Ease of Ratio Modulation or Control

For discrete ratio transmissions, ratio changes should be easily executed, with little dissipated energy, to allow facile movement through underdrive and overdrive ratio states, with fast downshift response to provide sudden acceleration or torque when needed. Single transition shifts are also preferred, particularly at low transmission ratios. A single transition shift accomplishes a ratio change by disengagement of one of the drive establishing devices and the substantially simultaneous engagement of another drive establishing device within the transmission. A double transition shift changes ratio by disengagement of two drive establishing devices with substantially simultaneous engagement of another two drive establishing devices. Double transition shifting can be hard to orchestrate, but for small ratio increments at high transmission ratios, they can be tolerated with little difficulty.

Hydraulic circuits, clutch housings and pistons that do not require more than about $2.0 \times 10^3$ kPa (300 psi) operating pressure to provide the clutching for full-throttle power shifts are helpful for the engineer or designer trying to save money and maximize component service life while minimizing energy losses and pressure drops through leaking seals.

For continuously variable systems, the transmission ratio must be capable of rapid, trouble-free, and arbitrary (history-independent) modulation to suit driving conditions. There should be little energy and time required, and component wear encountered, to effect continuous shifts of the transmission drive ratio.

Disadvantages of CVTs, Traction Drives, and Similar Devices

Friction drives and other continuously variable (ratio) transmissions (CVTs) date from the infancy of the auto industry. Decades of research have led to development of several automotive traction drive CVTs, which use rolling elements or bodies for transmittal of power through an elastohydrodynamic fluid film. An excellent description is given by [ref: SAE Paper 861355, "Automotive Traction Drive CVTs - An Overview," Lubomyr O. Hewko, General Motors Research Laboratories, September 1986]. Although traction power drive devices find broad use in industry, they have not met with success in automotive applications. One disadvantage is that the necessary rollers or other tractive components are heavy and result in a low power-to-weight ratio. Difficulties have also been encountered in ratio control: roller positioning and synchronization are difficult to maintain, and there is much geometric variability resulting from production tolerances and wear. Also problematic is their intolerance to slip—slippage, even once in a vehicle lifetime, can result in premature or catastrophic failure of power transmitting components—and the various loading schemes used in maintaining adequate force on the tractive components still do not safely cover all transient vehicular torque requirements. This places reliability at risk. In an effort to increase power density, it has been necessary to increase stress levels in contact areas. Hertz (compressive) stress in rolling contact areas is typically $2 \times 10^6$ kPa (300,000 psi). To prevent surface fatigue failures like pitting, the use of high cost premium quality steels is required [ref: SAE Paper 790849, "A New Approach to CVT Traction Drives in Automotive Applications," Yves Kemper, Vadetec Corp., September 1979]. Furthermore, thermal phenomena at the rolling contact areas lower the energy conversion efficiency, particularly when using multiple rollers which can work against one another if their positions cannot be controlled precisely. Even with perfect roller positioning, for many operating regimes the gains in efficiency from better engine-transmission matching are lost through hydraulic power losses since high pressure is required for contact loading, which involves elastic deformation of the contact surface. This makes traction drives unfavorable compared to conventional planetary-geared automatic transmissions. Finally, there are energy limits on this waste chef, absorbed by the fluid pad separating the traction elements or bearings—if the limits are exceeded, drastically shorter service lifetime and/or failure can result. As a consequence, the units presently in use have low maximum torque ratings, typically under 136 Nm (100 ft-lbs.).

Also still under development after decades is the belt drive CVT, which modulates transmission ratio by changing the effective radius of driven and/or driving sheaves. One of the latest commercially available units is the metal belt drive CVT manufactured by van Doorne of Holland, which has been adopted by European Ford and Fiat for use on light duty vehicles. A similar unit is made by Subaru of Japan. The metal belt employed in the van Doorne unit is made up of many individual links or vee-blocks which require precision fabrication and sorting, but costs have been kept reasonably low. The maximum allowable torque, however, is only about 122 Nm (90 ft-lbs), and the metal link yes-blocks generate objectionable noise as they impact the pulleys. Peak operational efficiency is only about 90%. The ratio range is good, but not adequate at 5.85:1, and downshift response is fair. Although belt drive CVTs either alone or coupled to epicyclic gearing can offer an adequate ratio range, fundamental engineering problems prevent their use for nearly all automotive applications. A significant part of the input energy is dissipated as heat in the belt or similar structures. This heat generation lowers the energy conversion efficiency and leads to eventual mechanical failure of the belt due to fatigue phenomena. As a result, belt drive CVTs are used only for low torque applications, pending development of new materials.

Because of the above problems encountered with traction and belt drives, conventional gearing with clutching into discrete ratio states continues to be used for nearly all transmissions for automotive applications. In particular, well known epicyclic or planetary gearing arrangements are widely used and offer many advantages. They are always in mesh, allowing use of power shifts where the prime mover proceeds uninterrupted during ratio changes. Their design, using multiple radially spaced pinions, allows several sets of teeth to be in mesh at once, distributing forces to allow for greater strength and torque ratings. Because the shafts and other rotating structures used with planetary gear trains can be arranged on the same centerline, a very compact unit can be realized. With proper ratio control, any wide ratio range transmission possessing numerous discrete ratio steps can reap all or nearly all the fuel economy savings afforded by using a CVT.

Fuel Economy using Discrete Wide Ratio Gearing

The fuel savings that result from use of wide ratio range gearing depend on factors such as the nature of the simulated or actual driving cycle used, including the fraction of travel time spent cruising with low engine power; the type and nature of the prime mover used, including engine displacement and combustion process optimization; and vehicle characteristics, including curb weight, type of service anticipated, and coefficients of rolling and aerodynamic resistance. Estimates for overall savings vary, but are typically 10–30 percent. Fuel savings increase dramatically for large engine displacements and power ratings, or for vehicles having a powertrain configured for high performance. Rarely included in driving or simulation cycles are the low power portions of travel such as extended highway cruising, especially with tail winds and/or slight downgrades. Since the high ratio in practice is nearly always undergeared from an efficiency standpoint, fuel may be saved even for level road conditions or slight upgrades at steady-state speeds. Under very low power conditions the power necessary to maintain constant speed can be a fraction of the typical 6–20 horsepower (4.5–15 kW) needed for normal level-road, zero tail wind travel. This commonly encountered low power operation often pushes large displacement prime movers into an operating regime where BSFC is as high as 2–3 times optimum, and use of a wide range extreme-overdrive transmission can result in fuel savings of nearly 50% as compared to narrow range transmissions where the highest·overdrive mode 0.7 to 1. As a lower bound on fuel savings we can consider how fuel consumption changes when using a wide range automatic transmission having extreme overdrive speeds with a state-of-the-art, four cylinder, low displacement engine specifically designed for high fuel economy at low power levels. An example is provided by the 2.3 liter displacement Quad 4 TM engine recently developed by General Motors, an engine designed for low mechanical and thermal losses and having highly tuned intake and exhaust manifolds for optimum performance and fuel economy. Examination of the BSFC map for this engine (presently available on smaller GM vehicles) reveals potential for large savings at any time required engine output power falls below 15 HP (11 kW). For a vehicle with 195-70-R14 tires or the equivalent, traveling at 60 MPH (97 km/hr), in the 4 TM or overdrive gear of a 4 speed automatic transmission having a typical vehicle final drive (axle) ratio of 3.06, the required engine speed is about 1800 RPM. For road conditions requiring only 8 brake HP (6 kW), brake specific fuel consumption at that engine speed is about 0.64 lb./hp/hr. (A BSFC map for this engine may be found in [ref: SAE Paper 870353, "General Motors 2.3L Quad 4 Engine," Thomson, Frelund, Pallas, Miller, General Motors Research Laboratories, 1987].) A wide range transmission holding engine speed at 1000 RPM for this operating condition would produce the same 8 HP with a brake specific fuel consumption of about 0.54 lb./hp/hr, a saving of approximately 16%. However, because overdrive transmissions are often not selected by the consumer or the manufacturer, many automatic transmission-equipped vehicles are still produced without overdrive gearing. Many vehicles are still sold with conventional 3 speed transmissions equipped with a lockup torque converter, with a traditional top ratio of 1:1. With the above vehicle so equipped, the required engine speed for high gear travel at 60 MPH (97 km/hr) in the above example is about 2600 RPM, and the brake specific fuel consumption for a power output of 8 HP is about 0.81 lb./hp/hr, and so using a wide range transmission to enable operation at 1000 RPM to meet the same required power results in fuel savings of 33%.

The above quoted fuel savings for highway travel would be much higher for: 1) engines not specifically optimized to have large areas of low or optimum brake specific fuel consumption on a BSFC map, or 2) typical non-ideal operating conditions, such as operating with used or aged crankcase oil, where tribological losses are increased, especially for engine speeds above 1500 RPM, or 3) larger displacement engines such as the General Motors 4.5 liter V8 or 5.0 liter V8 which have larger BSFC for this same required brake power.

To achieve these BSFC reductions through better engine-transmission matching, a recent study has recommended that a wide ratio span 8 speed automatic be developed [ref: SAE Paper 810446, "Engine Transmission Matching," R. H. Thring, Ricardo Consulting Engineers, 1981].

Prior Art Using Epicyclic Drivetrains

Many multi-speed planetary change-gear transmission designs exist that have a high number of available ratios. However, none satisfy all nine of the above suitability criteria. For example, the binary incrementally variable transmission of Kerr, U.S. Pat. No. 4,559,848 allows for a large number of equally spaced forward speeds, and could satisfy criteria relating to reliability, driveability, and ease of ratio control, but it uses a large number of complex or twin pinion epicyclic gearsets, and is not suitable because of deficiencies in areas relating to cost, space constraints, power density and efficiency.

Other transmissions presently in use nearly satisfy all criteria except those relating to ratio range and incrementation. At present, to remedy this by adding to these units component gearsets and clutch hardware to give additional well-spaced ratio states and better engine-transmission matching would drive up the unit cost and size considerably. For conventional automatic transmissions having 2 component simple planetary gearsets and needing no additional countershafts or power transfer cases, the number of forward speeds is at best four, and additional reduction or final drive gearing is still necessary for automotive applications. The ratio range on these units cannot provide adequate engine-transmission matching for all load conditions, and in other areas as discussed above they cannot provide for numerous advantages described below for the instant invention.

One such presently used transmission is the Automatic Overdrive TM transmission for rear wheel drive applications made by Ford Motor Company. It uses a compound planetary gearset having 2 sun gears, 3 short pinions, 3 long pinions, and one internal or ring gear, with 4 friction clutches, 2 one-way clutches, and 2 friction bands to produce 4 forward speeds and one reverse.

Another similar unit for front wheel drive applications is the Ford AXOD TM overdrive 4 speed transaxle transmission which uses 3 simple planetary gearsets including a reduction gearset, 4 multiple-disc clutches, two friction bands, and two one-way clutches [ref: U.S. Pat. No. 4,509,389, Vahratian, et al].

Another such four speed overdrive front wheel drive transaxle transmission is the Hydra-Matic TM 440 T4 transaxle made by General Motors. It also uses 3 simple planetary gearsets including a reduction gearset, 4 multiple-disc clutches, 2 friction bands, and two one-way clutches. Recently General Motors has produced the state-of-the-art Hydra-Matic TM 4T60E, which has an additional sprag clutch and friction band for smoother operation.

Other designs have tried to lessen torsional shock and other objectionable characteristics resulting from the use of direct coupling, but still do not provide adequate engine-transmission matching. A four speed planetary transmission by the Ford Motor Company [ref: U.S. Pat. No. 4,867,011, Garrett] has three driving modes, "economy," "normal," and "power," which offer different mixes of open converter and locked up converter operation, depending on the gear utilized. Using two simple planetary gear sets, an additional reduction gearset is necessary. Seven clutches or friction bands and two one-way clutches are used to obtain the 4 speeds including a 0.694:1 ratio overdrive.

To obtain additional ratio states from these and other conventional transmissions for better engine-transmission matching it is necessary to add one or more component gearsets, additional clutches and other hardware. An example is the 5 speed automatic transmission recently developed by Nissan Motor Company, Limited, of Japan. To obtain a fifth ratio state, an auxiliary planetary gearset and additional clutches were added to a conventional 4 speed unit. This brings the total number of planetary gearsets to 3, plus another reduction gearset needed for final reduction gearing. This adds considerably to the cost and axial length of the geartrain. Meshing losses are also increased, lowering the overall transmission efficiency. Similar units have been produced by Toyota of Japan and Mercedes Benz of West Germany.

At present, a transmission unit for passenger vehicles that has acceptable ratio incrementation and control and other characteristics, and has a minimum of friction producing devices to produce 7 to 9 speeds, will require 4 to 5 simple planetary gearsets or the equivalent when reduction gearing is taken into account, and generally will not have tightly spaced ratio increments in the overdrive ratio zone. One example is provided by Hiraiwa, U.S. Pat. No. 4,653,348 where 3 simple planetary gearsets, 7 friction-producing devices and 3 one-way clutches are used to produce 7 forward speeds. An additional planetary gearset or the equivalent is necessary for final drive reduction. Another example is a multi-speed unit with acceptable ratio control afforded by the transmission gearing arrangement of Klemen, U.S. Pat. No. 4,683,776 which uses 4 simple planetary gearsets, 6 friction-producing devices and, in practice, an unspecified number of one-way clutches, to produce 9 forward speeds. An additional reduction gearset is still necessary for automotive use, bringing the total to five. Klemen, U.S. Pat. No. 4,976,670 discloses power transmissions using three planetary gearsets, including one utilized solely as a reversing gear arrangement, to provide 7 forward speeds and one reverse. Because it is topologically impossible to provide independent inputs to all gearing elements used, the two planetary gearsets not used for reversing are doubly linked—the carrier of the first gearset is permanently coupled to the ring of the second gearset, and also the ring of the first gearset is permanently connected to the sun of the second. This limits the number of possible ratio states and the maximum ratio range obtained. The gaps between transmission ratios for the low speeds are large. Additional "very low" forward and reverse speeds can be added, bringing the total number of ratio states to eight forward and two reverse speeds, by adding an optional (fourth) planetary gearset to the drivetrain disclosed. In any case, an additional final reduction gearset must be used for automotive use to give the high overdrive ratios needed for optimum engine operation at cruising speeds. For automotive use, this brings the total number of planetary or equivalent gearsets needed to four or five.

The problem of needing a high number of planetary or other gearsets to produce multi-speed transmissions with a high number of ratios and a high ratio range is not confined to automotive applications, but applies to all power transmission devices. It is also not confined to a particular type of component gearset or compound geartrain—the problem is that the number of kinematic degrees of freedom, or independent shaft speeds, that can be delivered to the constituent gearing elements of any geartrain has always been fewer than that theoretically possible.

OBJECTS OF THE INVENTION

Accordingly it is a broad aim of this invention to introduce a method which can provide additional available kinematic degrees of freedom for every unlinked element in any component gearset, as compared to present gearing arrangements.

It is another object of this invention to provide means for increasing the number of kinematic degrees of freedom in coaxial and or, her drivetrains whereby combinational or independent execution of clutched ratio states is made possible.

It is another object of this invention to deliver to each independent (unlinked) element of any geartrain at least one kinematic degree of freedom, providing a greater number of ratio states for all gearing devices by supplying the necessary dynamic inputs to all independent elements, regardless of their number, thus making better use of gearing components.

It is another object of this invention to allow direct coupling of the prime mover to any or all independent elements of any geartrain so as to allow the theoretical maximum number of ratio states possible using a minimum of clutch devices; additionally, it is another object to permit added clutching devices for coupling to internal gearing elements as well, yielding an even greater number of kinematic degrees of freedom for any or all gearing elements in a drivetrain, adding further still to the number of ratio states attainable.

It is yet another object of this invention to allow use of any gearing arrangement using conventional coaxial gearing components, with fewer planetary or other gearsets, to form inexpensive multi-speed transmissions where no final ratio reduction is required for automotive applications;

whereby the above-described wide range near-CVT operation is obtained in a compact package with time-proven inexpensive components at low technical risk, with no need for countershafts or power transfer cases;

whereby closely spaced power shift ratio changes produce less torsional shock to the drivetrain and generate less dissipated clutch energy than units presently used, resulting in lower operating temperatures and longer clutch life;

whereby energy conversion efficiency is comparable to present day transmissions;

whereby multiple closely-spaced overdrive ratio states eliminate new or alien sensations for vehicle occupants, allowing smooth inconspicuous changes in transmission ratio to suit operating conditions at cruising speeds where most travel occurs;

whereby because of the combinational nature of ratio states available, an extremely wide and varied range of ratios is possible by simply varying the number of teeth or the effective diameter for each of the constituent gearing elements;

whereby one can eliminate the need for a hydrodynamic torque converter for many embodiments;

whereby operation of the prime mover may proceed at the most efficient regime, even for steady state or level road conditions;

whereby the ratio range is large enough to provide both low ratio states for brisk acceleration and climbing ability, and overdrive states that allow efficient operation of the prime mover under low power conditions, such as encountered on level or downhill grades, or with tail winds, etc.;

whereby longer engine life can be obtained through the extensive use of overdrive and high overdrive gearing, with quieter operation;

whereby closely spaced ratios make quality clutch control easier to achieve, with power shifts that can be softer without undue heat dissipation or shift shock;

and whereby the need for friction modifiers in the transmission fluid (e.g., anti-squawk formulations) is reduced, thereby allowing modification of the oil viscosity or other oil properties to meet other transmission needs, such as mechanical efficiency, resistance to temperature-induced deterioration, etc.

It is yet a further object of this invention to allow flexibility in utilization so that subassemblies, clutches, and other components of complex geartrains may be eliminated to cut costs, while retaining a useful nucleus of transmission functions.

Other objects of this invention not given above will become clear from further reading of the specification.

SUMMARY OF THE INVENTION

According to the present invention, an input transmitter is provided to a geartrain whereby a plurality of coaxial shafts or equivalent structures are made available for rotational coupling thereto, such that a torque transmitting structure grounded in a suitable reference frame, usually the transmission casing, is inserted topologically inside a power transmitting structure or power transmitting path. This torque transmitting structure provides a component called a reaction stator or reaction element through which reaction forces may be supplied for the purpose of grounding selected gearing elements of the geartrain. Normally the grounding or restraining of selected gearing elements or power transmitting paths is accomplished by using brake clutches that couple the power transmitting path to the transmission casing. This requires that the power transmitting path to be braked is directly accessible to a braking mechanism fixed to the transmission casing. This invention provides for introducing a reaction element into the interior of power transmitting paths or structures so that gearing elements or other power transmitting paths located therein, and blocked from direct access to the transmission case or a mechanical reference frame, may also benefit from being selectively braked or restrained when desired. As described below, this allows that selected power transmitting paths may be selectively coupled to either a driving structure or a braking or restraining structure, giving a substantial increase in the number of possible ratio states available by yielding a greater number of kinematic degrees of freedom for the transmission overall.

One form of an input transmitter that accomplishes this topological insertion of a reaction element provides a set of three or more coaxial or substantially coaxial shafts or equivalent structures that are made available for rotational coupling to a plurality of power transmitting paths, such that no two constituent radially adjacent coaxial shafts or structures normally have the same angular speed. The substantially coaxial or nested arrangement of these structures, from the inner structure to the outer structure must be such that at least one reaction stator or element forms one of the intermediate elements, that is, elements other than the innermost or outermost coaxial structures.

Another equally useful form of input transmitter topologically inserts a reaction element into the interior of a power transmitting path or structure by allowing the path or structure to be split into two separate elements. A power bridge is provided to maintain torque handling continuity from one element to the other, while a torque transmitting structure that serves as a reaction element is inserted therebetween, thereby giving the reaction element access to an interior space that is normally "forbidden."

The gearing arrangements obtained from practicing this invention include combinational incrementally variable transmissions (CIVTs). Some establish power transmitting paths through the legs of a combinational geartrain tree, defined below. These combinational incrementally variable transmissions fully utilize the elements of component geartrains such that the number of possible distinct ratio states Z of any geartrain or compound geartrain can be $$Z = 2^n - 1$$

or more, where n is the number of elements not permanently linked or coupled to other elements in said tree.

Combinational incrementally variable transmissions (or CIVTs) are characterized by the following:

[a] Power transmission paths can be established that allow the minimum number of gearset linkages or couplings, and the maximum possible number of modulated or independent shaft angular speeds for any type of gearset or powertrain, including non-geared transmissions, such as devices using rollers, belts, or non-traditional traction devices.

[b] The clutching to develop distinct ratio states may be combinational and independent—some or all of the clutches in a CIVT may be activated independently, alone or in combination with other clutches to form meaningful ratio states. For n such clutches, for example, the number of possible ratio states is $(2 \exp n) - 1$. Although ratio states can be added through supplemental clutches and hardware that do not act independently, one is always at liberty to select a configuration where some or all clutching devices operate in a fully independent and combinational manner.

[c] At least one reaction stator or similar member is always present, topologically inserted into the interior of a shaft or rotor. Placement of additional reaction elements may be arbitrary. Any reaction stator may become a reaction rotor when replaced by an equivalent structure in a non-stationary reference frame, such as a structure that is motor-driven at constant or accelerating angular speed.

[d] The number of ratio states as a function of the number of elementary gearsets or total machine or gearing elements is the maximum theoretically possible based on kinematic analysis. For example, a geartrain consisting of two simple planetary gearsets connected with a single mechanical linkage, and thus having three independent or fully modulated gearing elements, gives a minimum of seven ratio states. Additional hardware, especially that exploiting available kinematic inputs from certain input transmitters described below can add further to the number of available ratio states.

[e] Kinematic access is provided so that all independent or freely modulated machine or gearing elements not permanently linked to another gearset or to a power takeoff can have at least two kinematic states (e.g., either stationary or at the driving speed of the prime mover), with independent operation as described in [b] above for all states except for certain optional additional reversing or other configurations. Aside from single linkages, no additional coupling between gearsets is necessary.

It is not necessary for a CIVT to make use of a combinational geartrain tree. A single planetary gearset, for example, can be used to create a CIVT that does not use a combinational geartrain tree. The geartrain(s) employed may contain any type of gearset, e.g., simple and twin pinion planetary types, compound planetary types with long and short pinions (e.g., Ravigneaux type), single axis differential gearsets, or may be mixed to make compound gearsets, or have additional transmission mechanisms. It is also possible to practice this invention using gearing not offering maximum kinematic degrees of freedom and other characteristics of a CIVT, but perhaps having other desirable characteristics.

As used in this disclosure, a gearset is defined as a set of geared or interconnected machine elements arranged such that their total number of kinematic degrees of freedom is one less than the number of gearing or machine elements. An example is the simple planetary gearset, where the 3 elements commonly known as the sun, ring, and carrier (possessing one or more free-rotating pinions), have a linear kinematic relationship allowing for 2 kinematic degrees of freedom. Similarly, a combinational geartrain tree is defined as a geartrain where two or more gearsets are coupled solely through single linkages, affording the highest number of kinematic degrees of freedom possible.

BRIEF DESCRIPTION OF THE DRAWINGS

The following detailed disclosure describes the many aspects of these novel transmissions and refer to the accompanying drawings, in which:

FIG. 1 is a symbolic representation of a simple planetary gearset.

FIG. 2 is a another symbolic representation of a generalized 3-element gearing device.

FIG. 3 is a symbolic diagram for a transmission using a simple combinational geartrain tree consisting of two singly coupled simple planetary gearsets in a sun-modulated configuration, and having modulated power transmission paths fed by clutches A, B, and C.

FIG. 4 is a clutching table for the embodiment of FIG. 3.

FIG. 5 is an upper half-plane schematic representation of the embodiment of FIG. 3.

Figure 6:
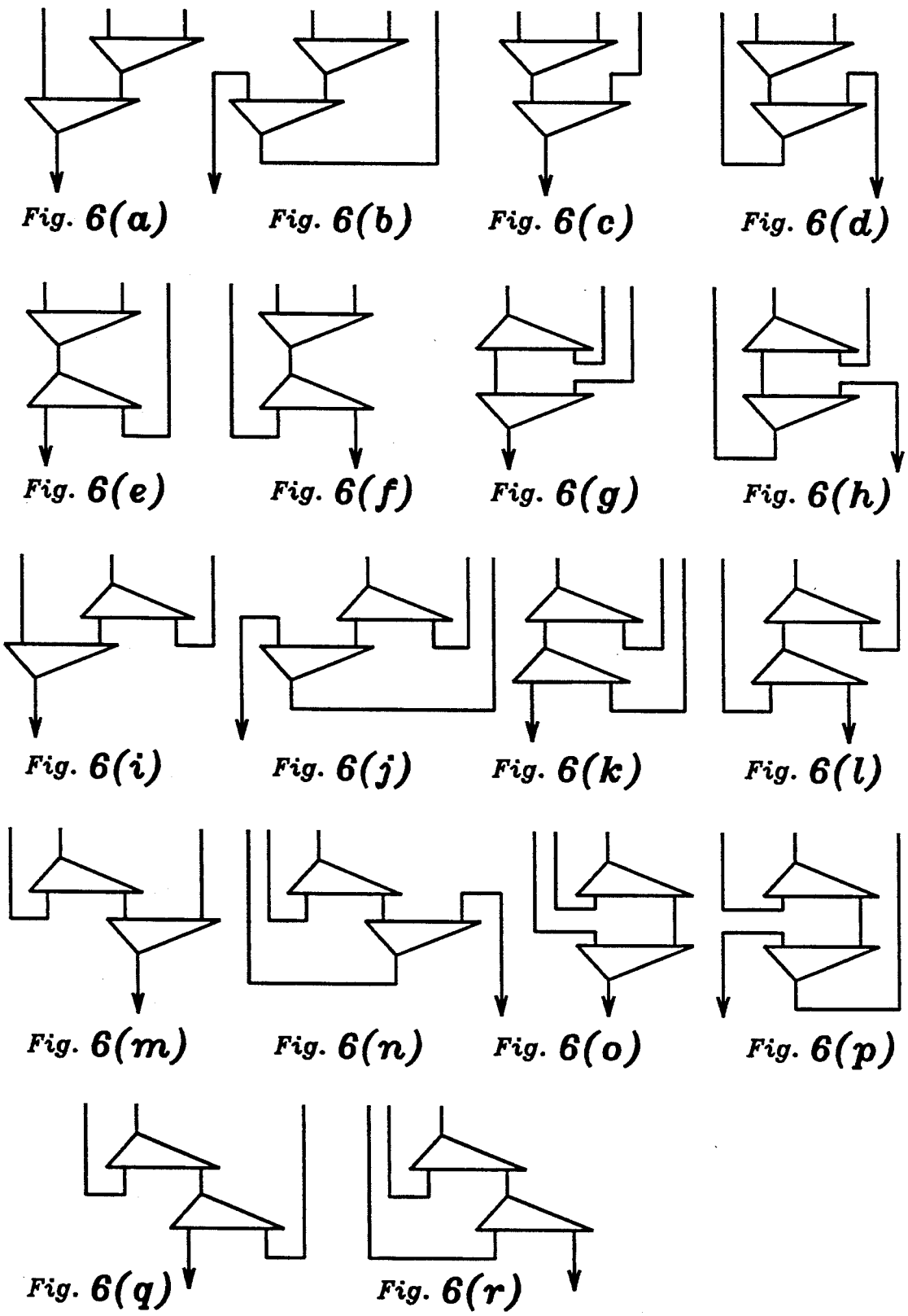
FIGS. 6(a-r) show a set of possible symbolic gearing configurations that may be substituted for the lower half of the symbolic representation of FIG. 3.

Transmissions in this disclosure are shown in [1] symbolic, [2] schematic, or [3] detailed cross-sectional form, as indicated.

Schedule of Reference Characters 10 passage
11 passage
12 passage
13 passage
14 passage
15 passage
16 passage
17 passage
18 passage
20 cavity
27 cavity
30 clutch inner hub
31 clutch inner hub
32 clutch inner hub
33 clutch inner hub
34 clutch inner hub
35 clutch inner hub
36 clutch inner hub
37 clutch inner hub
38 clutch inner hub
39 clutch inner hub
40 A one-way clutch
42 B one-way clutch
44 C one-way clutch
46 D one-way clutch
50 sleeve bearing
58 needle bearing
59 needle bearing
66 thrust bearing
70 clutch piston
71 clutch piston
72 clutch piston
73 clutch piston
74 clutch piston
75 clutch piston
76 clutch piston
77 clutch piston
78 clutch piston
82 input transmitter first sun gear
84 input transmitter second sun gear
86 input transmitter third sun gear
90 return springs
91 return springs
92 return springs
93 return springs
94 return springs
95 return springs
96 return springs
97 return springs
98 return springs
100 case
101 case end plate
102 pump assembly
108 reaction stator grounding foot
110 A clutch
112 B clutch
114 C clutch
116 D clutch
120 A brake clutch
122 B brake clutch
124 C brake clutch
126 D brake clutch
128 reaction stator
129 second reaction stator
130 A clutch housing
132 B clutch housing
134 C clutch housing
140 main input shaft
141 inner shaft
142 input shaft
143 input shaft
144 input shaft
145 input shaft
146 input shaft
147 input shaft
149 input shaft
158 drum coupler dog
161 first sun gear hub
162 first sun gear
163 second sun gear hub
164 second sun gear
165 third sun gear hub
166 third sun gear
172 first ring gear
174 second ring gear
176 third ring gear
181 input transmitter first ring gear hub
182 input transmitter first ring gear
183 input transmitter second ring gear hub
184 input transmitter second ring gear
185 input transmitter third ring gear hub
186 input transmitter third ring gear
197 input sprocket
198 input sprocket
199 input sprocket
200 A one-way direct clutch
202 B one-way direct clutch
204 C one-way direct clutch
206 D one-way direct clutch
210 first pinion carrier
212 second pinion carrier
214 third pinion carrier
215 twin pinion carrier
218 input transmitter carrier
221 sleeve shaft
222 sleeve shaft
226 sleeve shaft
232 B brake clutch housing
234 C brake clutch housing
248 B reaction clutch housing
250 forward clutch housing
252 C forward/reversing clutch housing
254 C reaction clutch housing
255 reversing clutch housing
259 high overdrive clutch housing
261 drum
262 drum
266 drum
268 drive shell
269 drive shell
270 driven sprocket support foot
278 driven sprocket support
280 pinion support spindle
288 input transmitter pinions 289 dual radius pinions
290 A OWC inner race
291 A OWC outer race
292 B OWC inner race
293 B OWC outer race
294 C OWC inner race
295 C OWC outer race
296 D OWC inner race
297 D OWC outer race
303 movable backing plate
304 movable backing plate
312 input drive link
314 input drive link
315 wide input drive link
322 pleated end
328 pleated end
330 spline hub
346 spline ring
350 forward clutch
352 reversing/overdrive clutch
355 reversing clutch
356 carrier brake
357 carrier brake
359 high overdrive clutch
362 drum
364 drum
366 drum
370 differential gearset
372 differential pinions m
374 differential side gear
375 differential carrier
376 differential side gear
378 differential pinions
381 inner twin pinion
382 first planetary pinions
384 second planetary pinions
386 third planetary pinions
389 outer twin pinion
395 differential shaft
409 left output shaft
410 output shaft
411 right output shaft
482 output transmitter first sun gear
484 output transmitter second sun gear
488 output transmitter pinions

DESCRIPTION OF THE PREFERRED EMBODIMENTS

Description of FIG. 1

FIG. 1 shows a symbolic representation of a well-known simple 3 element planetary gearset having a planetary carrier which rotationally supports and includes a plurality of circumferentially spaced planet pinions which are coaxially enclosed by and meshing with an inner sun or center gear and an outer ring or internal gear. This symbolic representation is introduced here to help show explicitly the various power transmitting paths and the combinational nature of the transmissions realized by this invention. (For more information on planetary gearing, see [ref: Herbert W. Muller, Epicyclic Drive Trains, Wayne State University Press, Detroit, 1982]. As will be evident, the instant invention constitutes a departure from conventional application of epicyclic geartrains, such as described in this text.)

Description of FIG. 2

FIG. 2 shows an alternate symbolic representation of a generalized 3-element gearing device having gearing elements U, and E, which may be substituted for any of the planetary gearsets or other gearing devices used in the embodiments described below. Three-element gearing devices are known for their simplicity and are used throughout this disclosure. However, gearing devices having 4, 5, or more elements may be used to practice this invention as discussed in the Description of FIG. 69.

Description of FIG. 3

FIG. 3 shows a symbolic diagram for a transmission according to this invention using a simple combinational geartrain tree consisting of two singly coupled simple planetary gearsets, with the planetary carrier of the first planetary gearset P1 linked or coupled to the sun gear of the second planetary gearset P2. With the planetary carrier of the second planetary gearset P2 serving as the transmission output, there are three remaining shafts or potential power transmitting paths. A first path is available through the ring gear of planetary gearset P2 and may be coupled to the transmission input or prime mover through clutch A, or alternatively the path may be grounded through braking device 1. Similarly, a second path is available through the ring gear of planetary gearset P1 and may be coupled to the transmission input by means of clutch B, or the path may be grounded through braking device 2. Finally, a third available path is through the sun gear of planetary gearset P1 and may be coupled to the transmission input through clutch C, or the path may be grounded through braking device 1. The braking devices 1, 2, and 3 as shown in this disclosure may each signify a simple grounding or braking device, and/or a one-way clutch or drive establishing device, and/or a one-way clutch or drive establishing device which can be selectively coupled or decoupled from the power transmitting path in question.

Using the equation of motion for a simple planetary gearset, $$\omega_c = a\omega_g + b\omega_r \qquad \text{(Eqn. 1)}$$

such that $b > a$ and $a + b = 1$, and where
$\omega_c$ = angular speed of planetary carrier
$\omega_g$ = angular speed of sun gear
$\omega_r$ = angular speed of ring (internal) gear
$a$ = carrier/sun angular ratio, with ring fixed; $a < 1$
$b$ = carrier/ring angular ratio, with sun fixed; $b < 1$
we can derive the equation of motion for this transmission by equating $\omega_c$ of the first planetary gearset with $\omega_g$ of the second planetary gearset P2. We can thus obtain the angular speed of the output shaft, $\omega_{out}$, as a function of the angular speed of the power transmitting paths fed by the clutches A, B, and C, denoted by $\omega_A$, $\omega_B$, and $\omega_C$, respectively:

$$\omega_{out} = b_2\omega_A + a_2b_1\omega_B + a_1a_2\omega_C \qquad \text{(Eqn. 2)}$$

where the new subscripts 1 and 2 refer to planetary gearsets P1 and P2, respectively. In the transmission shown, engagement of clutches A, B, or C results in coupling of a power transmitting path to the transmission input or prime mover.

Description of FIGS. 4 and 5

FIGS. 4 and 5 are a clutching table and an upper half-plane schematic representation, respectively, of one possible gearing arrangement for the simple transmission embodiment shown in FIG. 3. Referring to FIG. 5, the gearing arrangement shown according to this invention includes an input transmitter having a input sprocket 198 drivingly connected to input shaft 142 and a second input sprocket 199 drivingly connected to input shaft 144. Input shafts 142 and 144 are situated so as to topologically or coaxially surround reaction stator 128, which is grounded to case 100 in a manner not interfering with operation of input sprockets 198 and 199. Particular construction of this and other input transmitters will be given in further detail below. Input shafts 142, 128, and 144 are presented and made drivingly available to clutching and gearing devices shown to the right of the input transmitter. Gearing devices include a first planetary gearset symbolically represented by P1 in FIG. 3 having a first sun gear 162 and a first ring gear 172 each meshingly engaged with a plurality of planet pinions 382, which are rotatably supported by planetary carrier 210. Carrier 210 is drivingly coupled, by means of second sun gear hub 163, to second sun gear 164 of a second planetary gearset, symbolically represented by P2 in FIG. 3, which further comprises a second ring gear 174 and a plurality of planet pinions 384 which are rotatably mounted on planetary carrier 212 and which mesh with second sun gear 164 and second ring gear 174. With carrier 210 drivingly connected to output shaft 410, three gearing elements, namely, second ring gear 174, first ring gear 172 and first sun gear 162, are available for modulation of their angular speeds by the input transmitter via three power transmitting paths. Starting with the third power transmitting path driving first sun gear 162, shown symbolically in FIG. 3 as the path fed by clutch C, first sun gear hub 161 drivingly connects first sun gear 162 to C clutch housing 134 which may be selectively coupled to input shaft 142 by means of C clutch 114. Alternatively, when this power transmitting path is not driven by actuation of C clutch 114, reactive force needed to prevent first sun gear 162 from rotating backward during forward loading of the other power transmitting paths may be borne by C one-way clutch (OWC) or drive establishing device 44 whose outer race 295 is drivingly connected to C clutch housing 134 and whose inner race 294 is drivingly connected to reaction stator 128 as shown, thereby preventing backward motion of first sun gear 162.

Similarly, for the second power transmitting path driving first ring gear 172, shown symbolically in FIG. 3 as the path fed by clutch B, first ring gear 172 is drivingly connected to drum 266 which may be selectively coupled to input shaft 144 by means of B clutch 112. Alternatively, when this power transmitting path is not driven by actuation of B clutch 112, reactive force needed to prevent backward rotation of first ring gear 172 may be supplied by B one-way clutch 42 whose outer race 293 is drivingly connected to drum 266 and whose inner race 292 is drivingly connected to reaction stator 128, as shown.

For the first power transmitting path driving second ring gear 174, shown symbolically in FIG. 3 as the path fed by clutch A, second ring gear 174 is drivingly connected to drum 366 which may be selectively coupled to input shaft 144 by means of A clutch 110. Alternatively, during non-actuation of A clutch 110, reactive force to prevent backward rotation of second ring gear 174 is provided by A one-way clutch 40 whose outer race 291 is drivingly connected to drum 366 and whose inner race 290 is drivingly connected to case 100 as shown.

Clutches 110, 112, and 114 operate by well known mechanical, electrical, magnetic, pneumatic, hydraulic, or electrorheological means; preferably they are hydraulically actuated multiple-disc wet clutches which are widely used and well known in the art. In this figure and elsewhere in this disclosure, braking or clutching devices may be substituted for all one-way clutches shown. As can be seen from the above equation of motion for this geartrain, the three power transmitting paths selectively fed by clutches A, B, and C may be driven independently so long as the paths not driven are grounded. One can therefore execute the clutching of the power transmitting paths to the transmission input in a manner which is combinational and independent—clutches A, B, and C may be actuated in any combination, singly (A, B, C), in pairs (AB, BC, AC), or all three at a time (ABC), with all combinations resulting in useful ratio states. Moreover, the principle of superposition applies, so that one can simply add algebraically the contributions to output angular speed made by each power transmitting path. For convenience, one can name the ratio states according to the power transmitting paths that actively contribute to net output, so that the AC state, for example, is the state obtained by coupling of the prime mover to the two power transmitting paths fed by clutches A and C.

Referring to FIGS. 3, 4, and 5, and describing the operation of this gearing arrangement will show how seven forward drive ratio states may be obtained using this transmission by selective actuation of the three clutches 110, 112, and 114 along with the active engagement of one-way clutch (OWC) or drive-establishing devices 40, 42, and 44, when necessary. In neutral, the input shafts 142 and 144 rotate with the engine or prime mover, and may also drive a conventional hydraulic pump, not shown, for use by a control and lubrication system for the transmission, as known in the art. Since all three power transmitting paths A, B and C are operatively restrained from backward motion by one-way clutches 40, 42, and 44, respectively, the output shaft will also be similarly restrained and therefore no neutral rollback is permitted. All power transmitting clutches are released.

From neutral, a first or lowest forward ratio state is achieved in a single transition shift as the clutch control system gradually actuates C clutch 114, which causes C clutch housing 134 and first sun gear 162 to rotate in unison with input shaft 142. With a load on the output shaft 410, the remaining two free gearing elements, first ring gear 172 and second ring gear 174 are urged to rotate backward, or in a sense opposite that of the prime mover. Specifically, first ring gear 172 is urged to rotate backward because the load on the first planetary gearset P1 is borne by first pinion carrier 210, and the forward torque imposed on first sun gear 162 creates a reaction torque in the reverse direction on first ring gear 172. First pinion carrier 210, in turn provides forward torque to the second sun gear 164 of the second planetary gearset P2 since it is drivingly connected thereto via second sun gear hub 163. The forward torque applied to second sun gear 164 thus creates a reaction torque in the reverse direction on second ring gear 174. First ring gear 172, however, is restrained from backward rotation by B one-way clutch 42 which actively engages, causing reaction stator 128 to ground or hold stationary drum 266, which is drivingly connected to first ring gear 172. Similarly, second ring gear 174 is restrained from backward rotation via drum 366 which is arrested by active engagement of A one-way clutch 40 which couples drum 366 to case 100. Thus, when the prime mover is driving the load at output shaft 410, first ring gear 172 and second ring gear 174 are held stationary, and first sun gear 162 driven via C clutch 114 is the sole power transmitting path to contribute to output angular speed at output shaft 410. Power applied to first sun gear 162 causes first pinion carrier 210 to rotate forward at a reduced angular speed. Because first pinion carrier 210 is coupled to second sun gear 164 via second sun gear hub 163, a second reduction in angular speed is achieved in the second planetary gearset P2, causing output shaft 410 to rotate at a further reduced angular speed. Because the gear reductions provided by planetary gearsets P1 and P2 are compounded, the overall transmission ratio for this lowest ratio state may be made low enough to eliminate the need for final ratio reduction gearing in automotive applications, if desired. During a coasting condition where the load at output shaft 410 drives the prime mover, the non-engagement of one-way clutches 42 and 44 causes first ring gear 172 and second ring gear 174 to spin freely in the forward direction, resulting in a decoupling of the prime mover from the output shaft 410. Specifically, with output shaft 410 under forward rotation in excess of forward rotation that would be provided by driving the power transmitting path fed by C clutch 114, second ring gear 174 is no longer urged to rotate backward, but instead is driven forward at reduced speed. This forward rotation of second ring gear 174 is now unconstrained because drum 366 to which it is coupled is allowed to turn freely, since A clutch 110 remains in a released state, and A one-way clutch 40 is inactive or disengaged during forward rotation. With no substantial reaction torque applied to second ring gear 174, no driving torque is applied to second sun gear 164. Since second sun gear 164 is the only link to first planetary gearset P1, no coupling occurs to drive the prime mover, and thus no engine braking is possible while in the first ratio state.

When selected by the transmission control system, a second ratio state is available in another single transition shift through simultaneous release of C clutch 114 and application of B clutch 112. This causes drum 266 and first ring gear 172 to rotate in unison with input shaft 144. In a manner similar to that of the first ratio state, first sun gear 162 and second ring gear 174 are now urged to rotate backward when a load is applied to output shaft 410. First sun gear 162 is restrained from backward rotation by C one-way clutch 44, which causes stationary reaction stator 128 to couple to and ground C clutch housing 134, which is drivingly coupled to first sun gear hub 161 and first sun gear 162. Second ring gear 174 is restrained as above by A one-way clutch 40 via drum 366. Thus when the prime mover is driving the load at output shaft 410, first sun gear 162 and second ring gear 174 are held stationary, and first ring gear 172 driven via B clutch 112 is the only power transmitting path contributing to output angular speed at output shaft 410. Power applied to first ring gear 172 causes first pinion carrier 210 to rotate at moderately reduced angular speed. Again, because first pinion carrier 210 is coupled to second sun gear 164 via second sun gear hub 163, a second reduction in angular speed is achieved in the second planetary gearset P2, causing output shaft 410 to rotate at further reduced angular speed. During a coasting condition where the load rotates faster than the normal driven speed for this ratio, one-way clutches 40 and 44 allow second ring gear 174 and first sun gear 162 to spin freely in the forward direction, decoupling the prime mover from the output shaft 410 in a manner similar to the first ratio state above. As before, drum 366 is no longer restrained by A one-way clutch 40, and with A clutch 110 remaining disengaged, it spins freely, along with second ring gear 174. With no substantial reaction torque applied to second ring gear 174, no driving torque is applied to second sun gear 164, and the decoupling occurs as before.

To effect a change to a third ratio state, C clutch 114 is applied while B clutch 112 remains engaged. Power flows from the first and second speeds are thus combined, whereby first sun gear 162 is coupled to input shaft 142 and first ring gear 172 is coupled to input shaft 144. Since in this case input shafts 142 and 144 are both driven at the same transmission input speed, the first planetary gearset P1 locks up as a unit and drives first pinion carrier 210 at the same transmission input angular speed. As before, second ring gear 174 is urged to rotate backward when a load is applied to output shaft 410, but backward rotation is arrested by active engagement of A one-way clutch 40. With first pinion carrier 210 rotating at full transmission input angular speed, only the single gear reduction by means of the coupling of first pinion carrier 210 to second sun gear 164 into second planetary gearset P2 occurs. As before, A one-way clutch 40 still overruns and decouples the transmission when the output shaft 410 rotates faster than its operative driven speed.

A fourth gear ratio is achieved through a multiple transition shift whereby B clutch 112 and C clutch 114 are released, and A clutch 110 is simultaneously applied. This results in coupling of drum 366 to input shaft 144, driving second ring gear 174 at transmission input angular speed. With a load at output shaft 410, one-way clutches 42 and 44 hold, operatively grounding first ring gear 172 and first sun gear 162, respectively. With first sun gear 162 and first ring gear 172 grounded, first planetary gearset P1 locks up as a unit, so that first pinion carrier 210 and second sun gear 164, through coupling, are held stationary. With second sun gear 164 making no contribution to output angular speed, A clutch 110 makes the only contribution, a moderately reduced output angular speed. During a coasting condition, one-way clutches 42 and 44 again overrun, and no engine braking occurs.

For successively higher speeds of the output shaft 410, fifth, sixth, and seventh speeds are achieved in a combinational fashion through additional single transition shifts as given in FIG. 4. The four-to-five shift is achieved by additional application of C clutch 114. The five-to-six shift is effected by simultaneous release of C clutch 114 and application of B clutch 112. The final six-to-seventh shift is achieved by additional application of C clutch 114. These higher ratio states mimic the first three ratio states, except that the power transmitting path fed by A clutch 110 adds a large contribution to output angular speed and is no longer modulated by A one-way clutch 40. This leaves one fewer one-way clutch to overrun during coasting conditions, and during the seventh and highest ratio state, all three power transmitting paths are contributing to output angular speed, and all one-way clutches are inactive, so no decoupling of the transmission occurs during coasting. Thus, at the highest ratio, the load at output shaft 410 may drive the prime mover, if conditions permit. Also, the power flow is simplified in this ratio, since all free gearing elements, first sun gear 162, first ring gear 172, and second ring gear 174 are driven at the same input angular speed via input sprockets 198 and 199. As a result, both planetary gearsets P1 and P2 lock up, and the transmission in effect becomes a simple direct drive coupling, with output shaft 410 driven at input angular speed.

This and many of the other gearing arrangements made possible by this invention are unconstrained compound epicyclic superposition drives: they allow driving independently two elements of each three-element gearing device, with no need to constrain one of the elements as is done with present transmissions; they make use of two three-element epicyclic gearing devices which are singly coupled to form a compound geartrain; and they are configured to achieve power summation where angular speeds at the transmission output attributable to each power transmitting path may be superposed. Since the first planetary gearset P1 serves, in effect, to modulate or provide a plurality of speeds to second sun gear 164, this gearing arrangement may be called a sun-modulated configuration. Although this simple embodiment lacks engine-braking or reversing provisions, this CIVT using a combinational geartrain tree can provide superposition gearing with excellent ratio modulation and incrementation characteristics, and most notably can be used as a "building block" to develop other transmissions, some more suitable for automotive use, as will be discussed below. The twin sprocket arrangement shown having input sprockets 198 and 199 is not the only way to achieve the function of an input transmitter. Other structures are shown below, with detailed cross sections.

Description of FIGS. 6(a–r) and 7(a–r)

Figure 7:
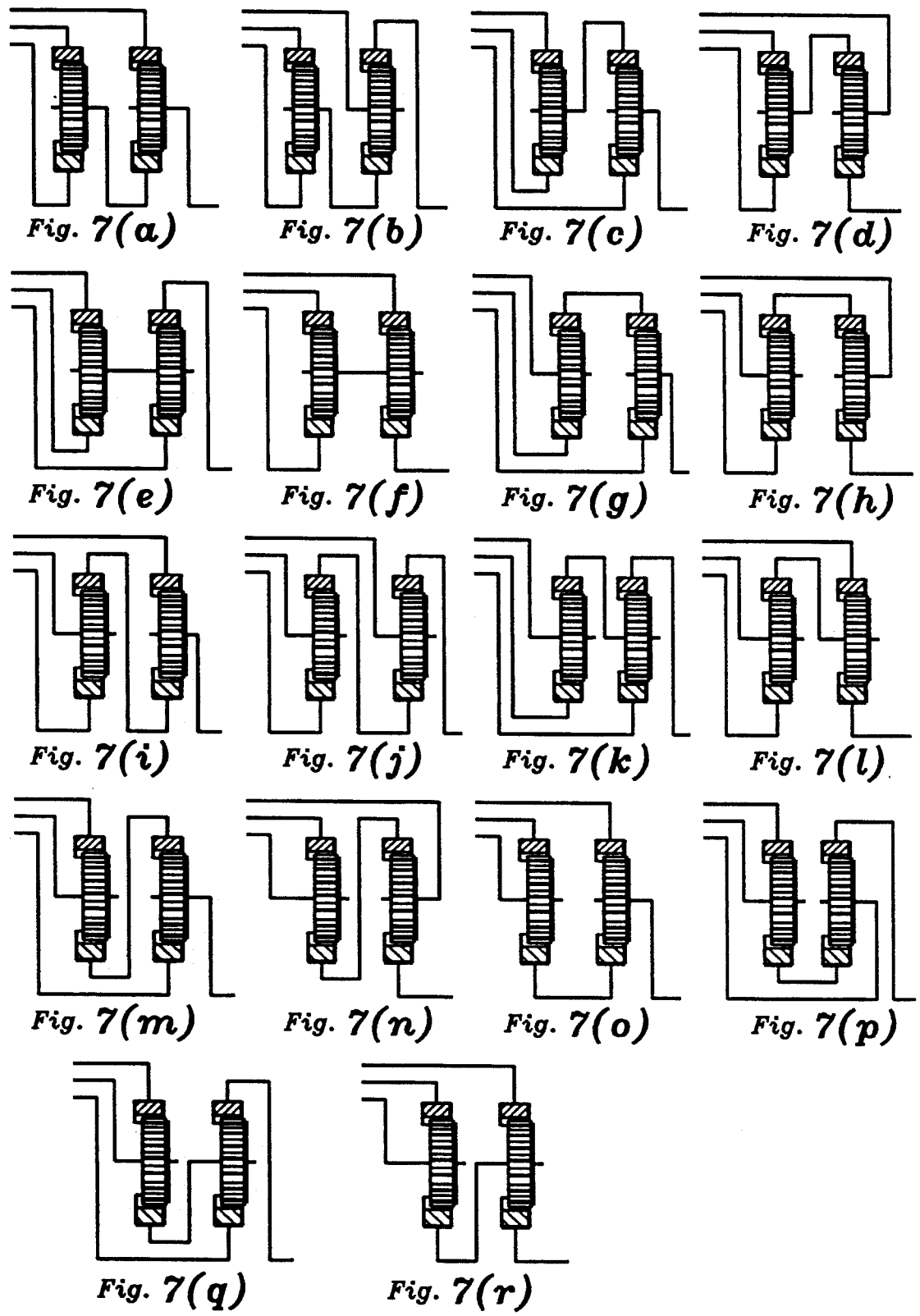
FIGS. 7(a-r) show a set of possible schematic gearing configurations, corresponding to the symbolic gearing configurations of FIGS. 6(a-r), that can he substituted for the right-hand portion of the schematic representation of FIG. 5.

FIGS. 6(a–r) show a set of possible alternative symbolic gearing configurations which may be substituted for the lower half of the symbolic representation of FIG. 3. Each FIG. 6(a)–6(r) possesses three free power transmitting paths represented by truncated vertical lines, and an output power transmitting path shown with a downward arrow similar to FIG. 3. For each configuration, one may obtain the alternative gearing configuration by connecting the power transmitting paths A, B, and C as shown on FIG. 3 to the three free power transmitting paths shown in each of FIGS. 6(a)–6(r). FIGS. 7(a–r) show a set of possible schematic gearing configurations, corresponding to the symbolic gearing configurations of FIGS. 6(a–r), that can be substituted for the right-hand gearing portion of the schematic representation of FIG. 5. The original gearing configuration shown symbolically in FIG. 3 and schematically in FIG. 5 is reproduced in FIGS. 6(a) and 7(a), which can be verified as identical by inspection. Each gearing configuration represents a rearrangement of the single linkage or coupling between one selected element from each three-element planetary gearset, and an output coupling selected on one of the remaining available gearing elements of the second planetary gearset. Eighteen such permutations are presented. In the above described embodiment shown in FIGS. 3, 4, and 5, all seven possible ratio states are forward speeds with transmission ratios ascending sequentially to a maximum transmission ratio of 1:1. It is possible, however, to substitute an alternative gearing configuration from FIGS. 6(a–r) and 7(a–r) to obtain a transmission with different kinematic properties, where all ratio states are obtained with the same combinational clutching given by FIG. 4. Some gearing configurations, such as shown in FIGS. 6(g), 7(g) and 6(n), 7(n) offer higher top ratio states, with the ratio of $\omega_{out}/\omega_{in}$ greater than one. They also develop reversing motion internally, whereby one or more reverse ratio states are achieved when the planetary carrier of one planetary gearset is held stationary and power is applied to either its sun or ring gear, as is well known. This causes one or more power transmitting paths to give a negative or reversing contribution to the motion at the output shaft 410, which may result in a net forward or reverse motion, depending on the other power transmitting paths energized. Sometimes, for example, a forward motion from one energized power transmitting path may combine with a reversing motion from another power transmitting path to yield a net reduced-speed forward motion as an output where the forward motion is slower than that obtained by energizing the forward motion power transmitting path alone. The specific kinematics for each alternative gearing configuration may be obtained by using above (Eqn. 1) and deriving an equation of motion similar to (Eqn. 2).

Using these and other singly coupled planetary gearsets in transmissions of this type allows for maximum kinematic degrees of freedom and produces a maximum number of ratio states, but if desired, one can substitute any of a number of doubly coupled gearsets that are usually employed in planetary geartrain practice. However, this greatly reduces the number of possible ratio states as a function of the number or complexity of the gearsets used. Generally one also may substitute any type of gearset in place of the planetary gearsets shown so long as there are three substantially coaxial free gearing elements or the equivalent available for rotational coupling to the clutching devices and input transmitter shown in FIG. 5. In addition, for this embodiment it is also possible to drive input sprockets 198 and 199 at different speeds, which would alter the mix of gearing ratios provided. Since the ratio patterns generated derive from a combinational summation process, many varied useful ratio patterns may be obtained by varying the number of teeth or the effective radius for each gearing element.

Figure 8:
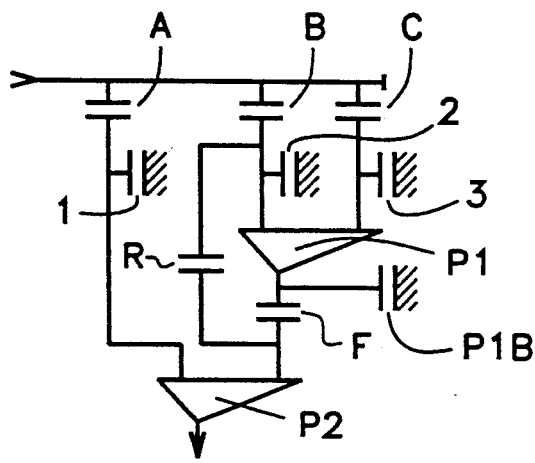
FIG. 8 is a symbolic diagram similar to that of FIG. 3, but with additional clutching provisions that allow added ratio states through sacrificial reversing.
Figure 9:
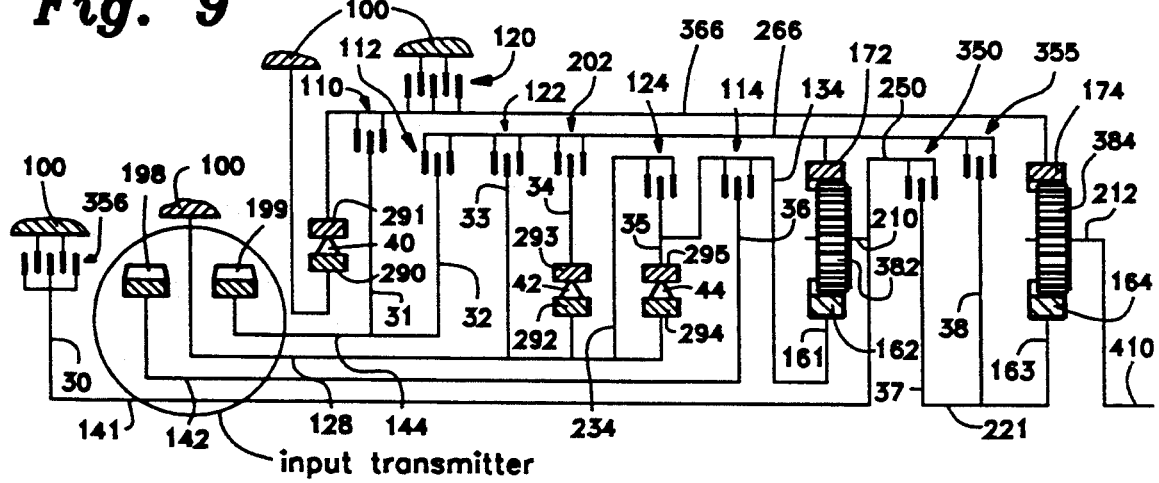
FIG. 9 is a schematic representation of the embodiment of FIG. 8.

Description of FIGS. 8 and 9

FIG. 8 is a symbolic diagram for a sun-modulated transmission similar to that of FIG. 3, using the same gearing configuration shown again in FIG. 6(a), but adding clutching devices to provide more ratio states through generation of reversing motion. Although some of the gearing arrangements given above in FIGS. 6(b)–6(r) will provide reversing motion internally without need for additional reversing clutch hardware, the forward ratio states one obtains tend to involve double transition shifts at low transmission ratios and/or have poor ratio coverage, with unacceptably large gaps between ratios. One can avoid this problem by preserving the sequence of forward ratio states obtained with the gearing configuration of FIG. 6(a) and by using bypass clutching to achieve additional reverse or reversing states. Using bypass clutching, we obtain additional ratio states through sacrificial addition, where one or more power transmitting paths are interrupted or made unavailable (sacrificed) so as to create or enable a new power transmitting path. The example shown here will illustrate this, where a power transmitting path created through sacrificial reversing gives a reverse or negative contribution to output angular speed. This sacrificial reversing may be selected independently to give a reverse speed, and also may in combination with another forward power transmitting path provide an additional forward or reverse ratio state. By selecting judiciously the number of teeth or the effective radius for each gearing element, this additional ratio may be chosen to give forward motion and lie between the third or BC ratio state and the fourth or A ratio state shown in FIG. 4. Referring to FIG. 8, the embodiment shown symbolically uses as a core the elements of FIGS. 3 and 5, as can be seen by inspection. In contrast to FIG. 3, however, the solid drive linkage between the carrier of first planetary gearset P1 and the sun gear of second planetary gearset P2 has been interrupted, and may be selectively and operationally suspended by non-actuation of forward clutch F. In addition, a bypass of this original power transmitting path can occur by actuation of reversing clutch R, which drivingly couples the ring gear of first planetary gearset P1 to the sun gear of second planetary gearset P2, without involving the first planetary carrier. An added planetary brake P1B allows selective braking of the carrier of first planetary gearset P1. To generate reversing motion at any time it is simply necessary to drive the sun gear of first planetary gearset P1 by actuation of clutch C, ground its carrier by actuation of planetary brake P1B, and switch the power transmitting path modulating the sun gear of second planetary gearset P2 by releasing forward clutch F and actuating reversing clutch R. With its sun gear driven forward and its planetary carrier held stationary, first planetary gearset P1 executes reversing motion through its ring gear, which is coupled to the sun gear of second planetary gearset P2 via reversing clutch R. The seven ratio states described in FIG. 4 may still be selected as described above for FIGS. 3, 4, and 5, using clutches A, B, C, and braking devices 1, 2, and 3, but two new ratio states are possible: a reverse ratio or R state where clutching proceeds as just given, with no actuation of the A clutch, and also a forward or reverse ratio state (depending on the number of teeth or effective radius chosen for each gearing element) where the reversing motion generated by the R state and fed to the sun gear of second planetary gearset P2 is added to the forward contribution made by clutch A. This second new ratio state may be called the RA state since it combines the R and A power flows into the second planetary gearset P2. During this RA ratio state, there is some circulated power not appearing as the transmission output, where power flows in a closed path from the power transmitting path fed by clutch A to that fed by reversing clutch R. Using two planetary gearsets, one obtains 9 ratio states, including up to 8 forward ratio states.

FIG. 9 is a schematic representation of the embodiment of FIG. 8. In addition to the reversing clutching discussed above, clutching devices have been added here to expand the functions of braking devices 1, 2, and 3: the power transmitting paths fed by clutches A, B, and C may now be positively grounded when necessary to permit engine braking where the output load drives the prime mover. The transmission thus obtained is then suitable for automotive use, although embodiments discussed below have other added advantages. Input sprockets 198 and 199 are again drivingly connected to input shafts 142 and 144, respectively, which coaxially surround reaction stator 128, for presentation to clutch devices to the right. The second sun gear 164 may now be selectively coupled to first pinion carrier 210, by means of forward (F) clutch 350, or to first ring gear 172 by means of reversing (R) clutch 355. To achieve this, second sun gear 164 is drivingly connected, via second sun gear hub 163, to sleeve shaft 221 which drivingly mates with both clutch inner hub 37 and clutch inner hub 38. Clutch inner hub 37 may be selectively coupled using forward clutch 350 to forward clutch housing 250 which is permanently coupled to or forms an integral part of first pinion carrier 210. Similarly, clutch inner hub 38 may be selectively coupled using reversing clutch 355 to a clutch housing (not shown) which is coupled to or forms an integral part of drum 266, to which first ring gear 172 is drivingly coupled. In addition to being drivingly coupled to forward clutch housing 250, first pinion carrier 210 is also drivingly coupled to inner shaft 141. To perform the function of planetary brake P1B of FIG. 8, inner shaft 141 is drivingly engaged with clutch inner hub 30 and may be grounded using carrier brake As before, first sun gear 162 is drivingly connected via first sun gear hub 161 to C clutch housing 134 which may be selectively driven by input shaft 142 using C clutch 114. Reactive force needed to restrain first sun gear 162 from backward motion is again provided by C one-way clutch 44 whose outer race 295 is drivingly connected to C clutch housing 134 and whose inner race 294 is drivingly connected to reaction stator 128. Now, however, C clutch housing 134 is also drivingly connected to, or is an integral part of clutch inner hub 35, which by means of C brake clutch 124, allows C clutch housing 134 to be positively grounded when desired. Actuation of C brake clutch 124 causes clutch inner hub 35 to be coupled to C brake clutch housing 234 which is splined or drivingly connected to reaction stator 128.

First ring gear 172 is again drivingly coupled to drum 266 which may be selectively coupled to input shaft 144 by means of B clutch 112. Reactive force needed to restrain first ring gear 172 from backward rotation may again be supplied by B one-way clutch 42, whose inner race 292 is drivingly connected to reaction stator 128, but now its outer race 293 is drivingly connected to clutch inner hub 34. This allows B one-way direct clutch 202 to selectively decouple B one-way clutch 42 from drum 266 and first ring gear 172 to allow intentional reverse motion of first ring gear 172 for use by reversing clutch 355 in the new R and RA ratio states. B one-way direct clutch 202 employs clutch inner hub 34 and has an outer housing which is drivingly connected to or forms an integral part of drum 266. Additionally, drum 266 also comprises or drives a clutch housing for B brake clutch 122 whose inner hub 33 is also drivingly connected to reaction stator 128. Actuating B brake clutch 122 allows positive grounding of first ring gear 172 when desired.

Second ring gear 174 is drivingly connected to drum 366, and as before may be selectively coupled to input shaft 144 by actuation of A clutch 110, whose outer housing is drivingly coupled to or forms an integral part of drum 366, and whose inner hub 31 is drivingly coupled to input shaft 144. Again, reactive force to prevent reverse motion of drum 366 and second ring gear 174 is provided by A one-way clutch 40 whose inner race 290 is drivingly connected to case 100 as shown, and whose outer race 291 is driven by drum 366. Additionally, drum 366 may be arrested by A brake clutch or band 120, allowing for positive grounding of second ring gear 174 when desired.

Operation of this embodiment will be discussed for FIG. 13, where a more detailed, generally cross-sectional view of a transmission suggested by this schematic is given.

Figures 10, 11, 12:
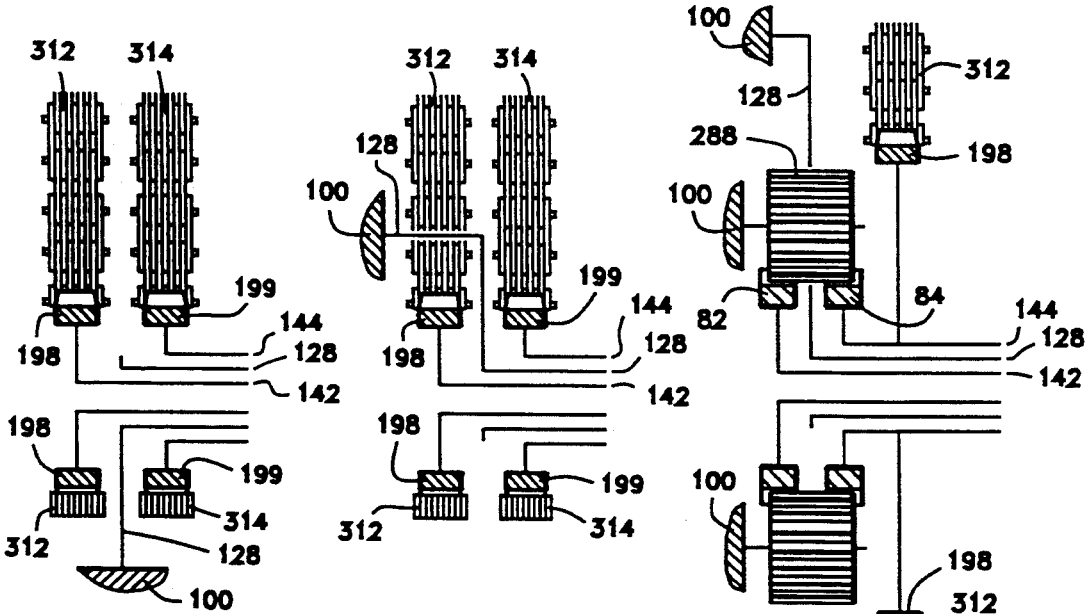
FIGS. 10 and 11 show the input transmitters of FIGS. 5 and 9 schematically in the upper and lower half-planes, with dual drive links.
FIG. 12 shows one type of epicyclic input transmitter schematically in the upper and lower half-planes, using a single drive link.

Description of FIGS. 10 and 11

FIGS. 10 and 11 show full plane schematic cross-sectional views of the split/twin input transmitters of the type shown in FIGS. 5 and 9, with dual input drive links 312 and 314 meshing with input sprockets 198 and 199, respectively. These figures show two ways to have the reaction stator emerge from the input transmitter for mechanical connection to the transmission case or other reference frame. In the lower half-plane, input drive links 312 and 314 are shown in cross-section. In FIG. 10, the reaction stator mechanically bonds to transmission case 100 by passing radially between the input sprockets 198 and 199. Coupling to transmission case 100 is shown occurring in a circumferential location where the drive links 312 and 314 engagingly surround input sprockets 198 and 199. If desired, however, the reaction stator may emerge as shown in FIG. 11, bonding to case 100 in a location between the slack and tensioned sides of input drive links 312 and 314. This method is used and shown explicitly in the detailed embodiment of FIG. 13. It also allows a single input drive link to replace the twin input drive links 312 and 314 in a manner similar to that shown in FIG. 54, which uses a single wide input drive link 315. Generally, one can also eliminate drive links altogether and use offset or countershaft gearing to feed input shafts 142 and 144 and accomplish the coaxial layering of shafts needed for a CIVT.

Description of FIG. 12

FIG. 12 shows a schematic cross-sectional view of an alternate construction, an epicyclic input transmitter, which requires only a single input sprocket 198 and input drive link 312 of normal width. Input sprocket 198 is splined or coupled to input shaft 144. To allow placement of reaction stator 128 and also to drive input shaft 142 without requiring an additional input sprocket, an epicyclic power bridge is used. To form the bridge, input shaft 142 is drivingly connected to or is integral with input transmitter first sun gear 82, while input shaft 144 is drivingly connected to or is integral with input transmitter second sun gear 84. One or more input transmitter pinions 288, which are rotatably mounted on a carrier fixed in case 100 or other suitable reference frame, meshingly engage with both input transmitter first sun gear 82 and input transmitter second sun gear 84. This arrangement allows that both input transmitter sun gears 82 and 84 turn in synchrony. This holds true even if reaction stator 128 is not stationary as shown. The reaction stator 128 exits or passes through the epicyclic input transmitter in a circumferential location between two or more of the input transmitter pinions 288, bonding to case 100 as shown. If only one input transmitter pinion 288 is employed, the reaction stator 128 simply exits in a circumferential location not conflicting with the input transmitter pinion 288. Also, the epicyclic transmitter may be driven from the left side instead of the right side as shown, by having input sprocket 198 or other driving means coupled to input shaft 142.

When using input drive links, this epicyclic input transmitter gives better mechanical efficiency than the twin input transmitters of FIGS. 10 and 11, since fewer meshing and other energy losses are incurred when using a single input drive link of normal width rather than using similarly rated double-width or dual input drive links. Other important advantages include lower cost, and less space required for the additional driven sprocket or sheave. More importantly, this epicyclic construction may be used as a core for more complex input transmitter assemblies disclosed below that can provide additional forward and reverse motions or shaft speeds for use by a combinational geartrain tree or other drivetrain(s). For example, a reverse input can be presented and made drivingly available to clutching and gearing devices without requiring availability of an additional braked or grounded planetary carrier inside the powertrain as is customary to develop reverse motion in presently used transmissions. This saves the added cost and hardware needed to brake a planetary carrier under load, which typically requires a torque that is triple that of the prime mover. A more detailed description of this type of epicyclic input transmitter is given below (e.g., FIG. 15) and other more complex input transmitters will be shown having added advantages.

Figure 13:
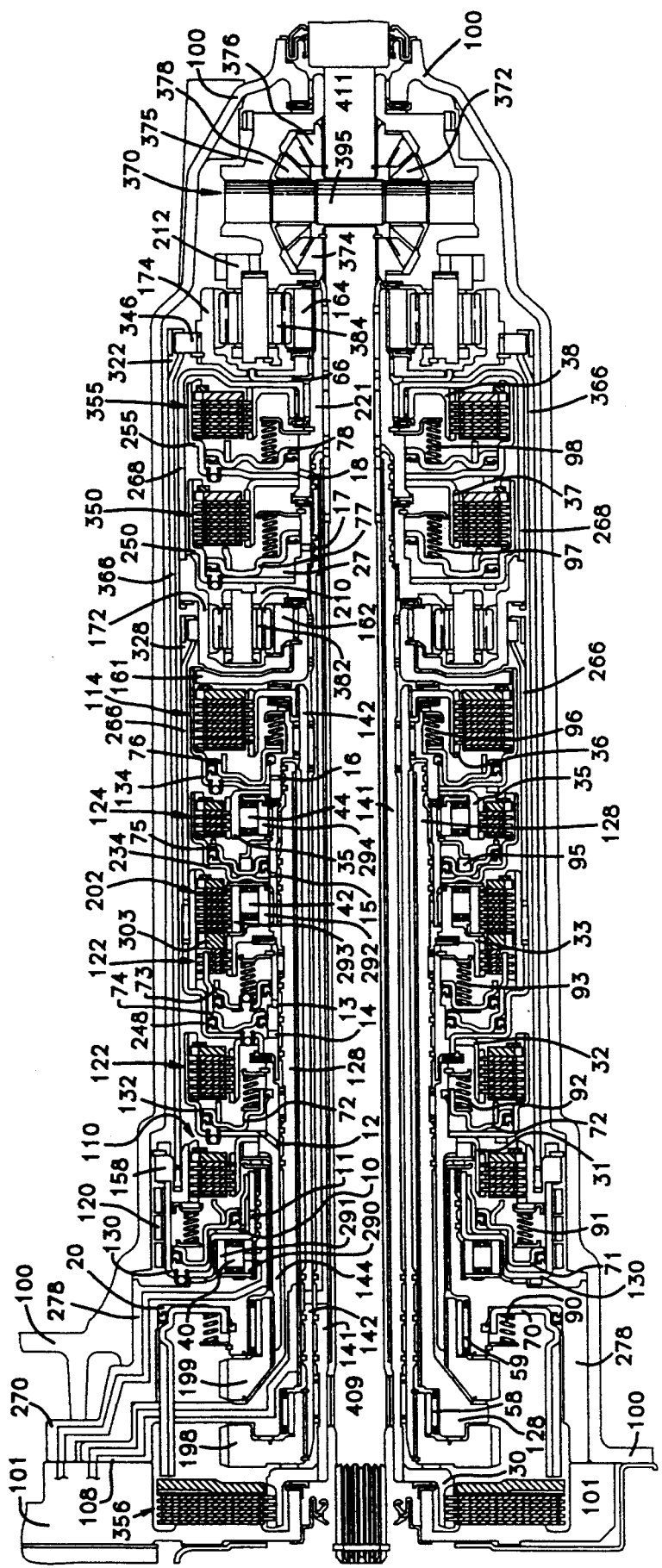
FIG. 13 shows a detailed, generally cross-sectional view of a front wheel drive transaxle transmission suggested by the embodiment shown in FIGS. 8 and 9, having eight forward speeds and one reverse.

Description of FIG. 13

FIG. 13 shows a detailed generally cross-sectional view of a transaxle transmission suggested by the embodiment shown in FIGS. 8 and 9, for use in front wheel drive automotive applications. The geartrain as shown is centered on the drive wheel axis. Not shown is a conventional bell housing centered on a second parallel axis which may bolt to or mate with a transversely mounted engine, and which may contain a four-element hydrodynamic torque converter, driving sprockets, and a hydraulic pump with associated valving and controls, whose construction and operation are well known to those skilled in the art. Reference numerals shown are consistent with those of FIG. 9 for components performing the same or equivalent functions.

Figure 14:
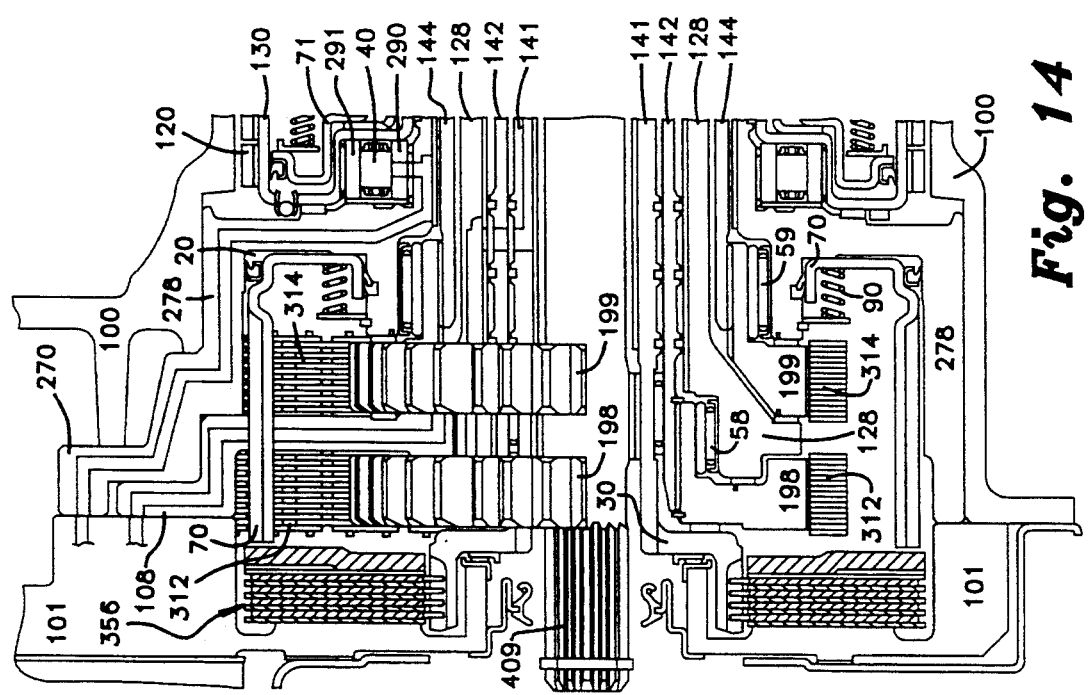
FIG. 14 shows an enlarged partial left-hand side view of FIG. 13, showing the input transmitter structure with dual drive links.

As before in FIG. 9, and now in detailed form, input sprockets 198 and 199 are splined to input shafts 142 and 144, respectively, which coaxially surround reaction stator 128 except where it emerges radially to bond to case end plate 101. Specifically, reaction stator 128 has a reaction stator grounding foot 108 which extends radially outward at an axial location between input sprockets 198 and 199, mechanically coupling to case end plate 101 in a location not interfering with input drive links 312 and 314, which are not shown. An enlarged view of the left side portion of the transmission is shown in FIG. 14, showing the drive links 312 and 314, and the input transmitter structure. Reaction stator 128 may accommodate internal passages to carry fluid used for lubrication or for actuating clutches in the geartrain, or may house electrical or optical conductors used to convey information (e.g., motion sensing) from the geartrain to a transmission control system, which is not shown and whose construction and operation is well known in the art. In addition to mechanically bonding the reaction stator 128 to case, reaction stator grounding foot 108 also sealingly connects these fluid conduits and/or bonds these electrical/optical conductors to corresponding conduits and/or conductors in case end plate 101, which may house or communicate with the transmission control system. Input sprockets 198 and 199 are bearingly supported by needle bearings 58 and 59, respectively, which are insertably secured in the left hand side of reaction stator 128, and in the left hand side of driven sprocket support 278, respectively. In a manner similar to that of reaction stator 128, driven sprocket support 278 bonds mechanically, electrically and hydraulically to case end plate 101 by means of driven sprocket support foot 270. Transmission case 100 encloses carrier brake 356, A brake band clutch 120, A clutch 110, B clutch 112, B brake clutch 122, B one-way direct clutch 202, C brake clutch 124, C clutch 114, forward clutch 350, and reversing clutch 355, as well as first planetary gearset P1 of FIG. 8, which comprises first ring gear 172, first pinion carrier 210, first planetary pinions 382, and first sun gear 162, and also second planetary gearset P2, which comprises second ring gear 174, second pinion carrier 212, second planetary pinions 384 and second sun gear 164.

To couple the two planetary gearsets, second sun gear 164 is coupled directly to sleeve shaft 221, which is drivingly coupled to both clutch inner hub 37 and reversing clutch housing 255. Upon selective operation of forward clutch 350, clutch inner hub 37 is coupled to forward clutch housing 250, which is coupled to, or is an integral part of first pinion carrier 210. This is accomplished in a conventional manner well known to those skilled in the art whereby a sheet metal clutch piston 77 slidably and sealably disposed inside forward clutch housing 250, forming a volume or cavity 27 therebetween. By pressurizing cavity 27 through a radial port or passage 17 within the inner portion of forward clutch housing 250, clutch piston 77 moves axially against the bias of a plurality of return springs 97. Full pressurization of cavity 27 pushes clutch piston 77 to engage two sets of alternately interleaved clutch plates, with one clutch plate set keyed or splined to clutch inner hub 37 and the other alternate set keyed or splined to forward clutch housing 250. In a similar manner one can selectively actuate reversing clutch 355 to couple reversing clutch housing 255 to clutch inner hub 38, which in turn is splined to drive shell 268. Drive shell 268 is by means of a sleeve bearing free to rotate independently of sleeve shaft 221 and bears axially upon thrust bearing 66, separating it from the inner hub portion of second ring gear 174. On its axial left side, drive shell 268 has axially facing teeth that drivingly engage with complementary teeth formed into the axial right side extension of first ring gear 172. Inside reversing clutch housing 255 is sealably disposed a clutch piston 78, and to actuate reversing clutch 355, pressurization through passage 18 within sleeve shaft 221 causes clutch piston 78 to move axially against the bias of a plurality of return springs 98 to force engagement of another dual set of alternately interleaved clutch plates, with one set keyed or splined to clutch inner hub 38 and the other set keyed or splined to reversing clutch housing 255. With second sun gear 164 splined to sleeve shaft 221, which in turn is fixed to reversing clutch housing 255, and also with clutch inner hub 38 splined to drive shell 268, which in turn is keyed to first ring gear 172, engagement of these clutch plates ultimately couples first ring gear 172 to second sun gear 164, as does reversing clutch 355 of FIG. 9, where the clutch and gearing arrangement is topologically equivalent to that shown here in FIG.

In addition to being coupled to or an integral part of forward clutch housing 250, first pinion carrier 210 is also splined to inner shaft 141. Inner shaft 141 contains internal passages for fluid used to actuate both forward clutch 350 and reversing clutch 355, and is extended axially to the right so as to sealably feed passages 17 and 18. First ring gear 172 is secured to drive shell 268 and has a hub which is rotationally isolated from first sun gear hub 161 using both journal and thrust bearings and isolated from first sun gear 162 using a thrust bearing.

The third power transmitting path that drives first sun gear 162 is fed through first sun gear hub 161 which is keyed or splined to the inner portion of the axial right side of C clutch housing 134. With clutch inner hub 36 splined to input shaft 142, C clutch housing 134 may be selectively driven by actuating C clutch 114. Inside C clutch housing 134 is sealably disposed clutch piston 76. To actuate C clutch 114, pressurization through passage 16 within the inner portion of C clutch housing 134 induces clutch piston 76 to move axially against the bias of a plurality of return springs 96 and cause engagement of alternately interleaved clutch plates, with one set keyed or splined to clutch inner hub 36 and the other set keyed or splined to C clutch housing 134. C clutch housing 134 is also drivingly coupled to clutch inner hub 35. To provide braking or reactive forces, C brake clutch 124 may be actuated, selectively coupling clutch inner hub 35 to C brake clutch housing 234, which is always held stationary by virtue of being splined to reaction stator 128. By pressurizing through a passage 15 formed in the inner part of C brake clutch housing 234, a clutch piston 75, sealably disposed therein, is forced to move axially against a stationary wave plate return spring 95 and engage another twin set of alternately interleaved clutch plates, with one plate set splined to clutch inner hub 35 and the other splined to stationary C brake clutch housing 234. To restrain clutch inner hub 35 from backward motion, clutch inner hub 35 functions also as the outer race 295 of FIG. 9 for C one-way clutch 44, whose inner race 294 is splined to stationary C brake clutch housing 234.

The second power transmitting path that drives first ring gear 172 is driven using drum 266 which has a pleated end 328 formed thereon that drivingly engages with complementary splines formed on the outer portion of the axial middle of first ring gear 172. At the other axial end of drum 266 are axially facing teeth which engage with complementary teeth formed on the outer surface of B reaction clutch housing 248. B reaction clutch housing 248 contains both B brake clutch 122, and B one-way direct clutch 202 with its associated B one-way clutch 42. The inner portion of stationary C brake clutch housing 234 extends axially to the left and is splined to inner race 292 of B one-way clutch 42, which in turn has an outer race 293. Outer race 293 also functions as clutch inner hub 34 of FIG. 9. This allows that engagement of B one-way direct clutch 202 will couple B reaction clutch housing 248 to the output of B one-way clutch 42. Stationary inner race 292, however, is also coupled to, or is an integral part of clutch inner hub 33, which B brake clutch 122 may selectively couple directly to B reaction clutch housing 248, bypassing B one-way clutch 42. B brake clutch 122 and B one-way direct clutch 202 are actuated using two nested clutch pistons 73 and 74, respectively. To actuate B one-way direct clutch 202, pressurization through passage 14 in the inner portion of B reaction clutch housing 248 causes clutch piston 74, which forms a sealed volume within B reaction clutch housing 248, to move axially to the right. The alternately interleaved clutch plates used for B brake clutch 122 are apertured to allow extended portions of the right axial end of clutch piston 74 to pass therethrough so that the piston may apply pressure on movable backing plate 303. Movable backing plate 303, in turn, moves slightly to the axial right and applies pressure to engage the alternately interleaved clutch plates of B one-way direct clutch 202, which are alternately keyed to the B reaction clutch housing 248 and to one-way clutch outer race 293. There are no return springs in contact with clutch piston 74, but a part of the axial right side of clutch piston 74 rests upon or contacts a part of the axial left side of smaller nested clutch piston 73, so when clutch piston 74 moves axially rightward, it pushes clutch piston 73. Clutch piston 73 resists, being biased by a plurality of return springs 93. This axial movement of clutch piston 73 is insufficient, however, to engage B brake clutch 122 as the right axial end of clutch piston 73 remains sufficiently distanced from the alternately interleaved clutch plates used for B brake clutch 122. B brake clutch 122 may be actuated, however, provided that B one-way direct clutch 202 has been actuated beforehand, by pressurizing passage 13 in the inner portion of B reaction clutch housing 248. This puts an axially rightward force on clutch piston 73, which is sealably disposed so as to form a volume between clutch piston 74, B reaction clutch housing 248, and itself. As clutch piston 73 moves axially rightward relative to clutch piston 74, return springs 93 are further compressed and the alternately interleaved clutch plates which are keyed alternately to B reaction clutch housing 248 and to clutch inner hub 33 are engaged.

To drive the second power transmitting path, B reaction clutch housing 248 is drivingly coupled to a clutch inner hub 32, and input shaft 144 is drivingly fitted with or is an integral part of B clutch housing 132, whose inner portion is bearingly abutted and sleeved to an axial left side extension of B reaction clutch housing 248. B clutch housing 132 may be selectively coupled to clutch inner hub 32 by actuating B clutch 112. With clutch piston 72 sealably disposed inside B clutch housing 132, fluid pressure through passage 12 in the inner portion of input shaft 144 or B clutch housing 132 pushes the piston against the bias of a plurality of return springs 92 to engage interleaved clutch plates alternately keyed to B clutch housing 132 and to clutch inner hub 32.

The first power transmitting path driving second ring gear 174 is fed by means of drum 366 which has a pleated end 322 which drivingly engages with spline ring 346 which in turn is keyed or splined to second ring gear 174. The axial left end of drum 366 terminates inside drum coupler dog 158, where axially facing teeth on drum 366 drivingly engage with complementary teeth formed inside the coupler dog. Drum coupler dog 158 also has outer radially facing teeth or ridges which mate with axial teeth or projections formed on A clutch housing 130, drivingly securing it thereto. Drum coupler dog 158 is also secured axially by a "C-clip" or other conventional retainer fitted onto A clutch housing 130. This prevents drum coupler dog 158 from moving axially rightward. A clutch housing 130 is bearingly cradled by driven sprocket support 278 and sealably surrounds clutch piston 71. Located between driven sprocket support 278 and the left axial end of A clutch housing 130 is A one-way clutch 40, whose inner race 290 is splined to the stationary driven sprocket support, and whose output outer race 291 is keyed to splines internally cut on the inner left axial side of A clutch housing 130. To drive this power transmitting path, A clutch 110 selectively couples A clutch housing 130 to a clutch inner hub 31, which is drivingly coupled to or an integral part of input shaft 144. To actuate A clutch 110, fluid is driven through passages 10 and 11 in the inner portions of A clutch housing 130. This causes clutch piston 71 to move axially rightward against the bias of a plurality of return springs 91, forcing engagement of a set of alternately interleaved clutch plates that are alternately keyed to splines cut internally on the inner side of drum coupler dog 158 and to splines cut on clutch inner hub 31. This drives drum coupler dog 158, drum 366, and second ring gear 174 at the speed of input shaft 144. Braking is provided by A brake clutch band 120 which is wrapped circumferentially on the cylindrical outer surface of A clutch housing 130, to the axial left of drum coupler dog 158. Selective actuation of this brake band is achieved by means of a conventional piston-driven servo assembly and apply pin, not shown, where construction and operation is well known to those skilled in the art.

On the left axial side of the geartrain within case end plate 101 is carrier brake 356. This clutch is actuated by means of a clutch piston 70 which is sealably disposed inside stationary driven sprocket support 278 forming a sealed volume which may be pressurized using an internal passage, not shown. Clutch piston 70 has extended portions or apply fingers which are circumferentially located to avoid interference with reaction stator grounding foot 108 and the drive links 312 and 314 that are shown in FIG. 14. Upon pressurization, clutch piston 70 moves axially leftward against a plurality of return springs 90 retained on the driven sprocket support 278. The extended portions or fingers of clutch piston 70 then apply leftward axial force to alternately interleaved clutch plates retained inside case end plate 101, which are alternately keyed to the case end plate and to the inner shaft 141.

In addition to bearingly supporting B reaction clutch housing 248 and B clutch housing 132, and being splined to C brake clutch housing 234, the reaction stator 128 also sealably feeds pressurized fluid to passages 12, 13, 14, 15, and 16 when required. Similarly, the driven sprocket support 278 bearingly supports A clutch housing 130, is splined to one-way clutch inner race 290, and sealably feeds passage 11 when required.

TABLE 1

| | | CLUTCHES/BANDS | | | | | | | | | OWC | | | Inverse Overall | Overall | Effective Ratio for Transmissions |
| | | A | B | C | Bow | FOR | REV | P1B | Abr | Bbr | Cbr | A/1 | B/2 | C/3 | | | |
| Speed | Ratio State | 110 | 112 | 114 | 202 | 350 | 355 | 356 | 120 | 122 | 124 | 40 | 42 | 44 | Ratio out/in | Ratio in/out | Having 2.6 Final Reduc. |
| --- | --- | --- | --- | --- | --- | --- | --- | --- | --- | --- | --- | --- | --- | --- | --- | --- | --- |
| N | φ | | | | | | | | | | | | | | — | — | — |
| 1 | C | | | X | X | X | | | | | | X | X | | .13 | 7.98 | 3.07 |
| 2 | B | | X | | (X) | X | | | | | | X | | X | .20 | 4.94 | 1.90 |
| 3 | BC | | X | X | (X) | X | | | | | | X | | | .33 | 3.05 | 1.17 |

TABLE 1-continued

| | | CLUTCHES/BANDS | | | | | | | | | OWC | | | Inverse Overall | Over-all | Effective Ratio for Transmissions |
| | | A | B | C | Bow | FOR | REV | P1B | Abr | Bbr | Cbr | A/1 | B/2 | C/3 | Ratio | Ratio | Having 2.6 |
| Speed | Ratio State | 110 | 112 | 114 | 202 | 350 | 355 | 356 | 120 | 122 | 124 | 40 | 42 | 44 | out/in | in/out | Final Reduc. |
|---|---|---|---|---|---|---|---|---|---|---|---|---|---|---|---|---|---|
| 4 | RA | X | | X | | | X | X | | | | | | | .47 | 2.13 | .82 |
| 5 | A | X | | | X | X | | | | | | | X | X | .67 | 1.49 | .57 |
| 6 | AC | X | | X | X | X | | | | | | | X | | .80 | 1.25 | .48 |
| 7 | AB | X | X | | (X) | X | | | | | | | | X | .87 | 1.14 | .44 |
| 8 | ABC | X | X | X | (X) | X | | | | | | | | | 1.00 | 1.00 | .38 |
| L3 | B̄C̄ | | X | X | (X) | X | | | X | | | | | | .33 | 3.05 | 1.17 |
| L2 | B̄ | | X | | (X) | X | | | X | | X | | | | .20 | 4.94 | 1.90 |
| L1 | C̄ | | | X | (X) | X | | | X | X | | | | | .13 | 7.98 | 3.07 |
| R | R̄ | | | | X | | X | X | X | | | | | | −.20 | −4.93 | −1.90 |

At the transmission output, second pinion carrier 212 is an integral part of a differential carrier 375 which forms part of a conventional differential gearset 370. Inside the differential gearset 370 are two differential pinions 372 and 378 which are rotatably supported by a differential shaft 395 which is fixed inside the differential carrier 375. Pinions 372 and 378 drivingly mesh with differential side gears 374 and 376. Differential side gear 374 is splined to left output shaft 409 which passes coaxially leftward through the geartrain, being radially adjacent to sleeve shaft 221 and inner shaft 141. The other differential side gear 376 is splined to right output shaft 411 which passes coaxially rightward through differential gearset 370, emerging outboard of transmission case 100. Both output shafts 409 and 411 may be drivingly connected through universal joints to the driving wheels of a vehicle, not shown.

Referring to FIGS. 8, 9 and 13, and also to Table 1, a clutching and ratio table for the transmission of FIG. 13, and describing the operation of this gearing arrangement will show how a total of nine ratio states may be obtained by selective or active actuation of the clutching devices described above.

In neutral, the input shafts 142 and 144 again are driven by the prime mover, which may also drive a conventional hydraulic pump, not shown, for lubrication and clutch control. As shown in Table 1, with the Ratio State "empty set," all selectively operable clutches are released. Since both the forward and reverse clutches 350 and 355, respectively, are not applied, both second sun gear 164 and second pinion carrier 212 may spin freely, and thus differential gearset 370 and the left and right output shafts 409 and 411 are also unrestrained. Optionally, however, from a clutch control standpoint any two of the three clutches 202, 350 or 114 may be applied without driving the transmission output.

From neutral, a first forward or C ratio state results as the clutch control system gradually applies C clutch 114, B one-way direct clutch 202 and forward clutch 350, as indicated by "X" symbols under the heading, "Clutches/Bands." C clutch 114 couples input shaft 142 to first sun gear 162 while forward clutch 350 couples the first pinion carrier 210 to second sun gear 164. With a load driven through first pinion carrier 210, first ring gear 172 is urged to rotate backward, but is restrained by automatic active engagement of B one-way clutch (OWC) 42, which is indicated by the "X" symbol under the heading, "OWC." This allows first pinion carrier 210 to drive second sun gear 164 at a reduced rotational speed. A similar reaction force imposed on second ring gear 174 by active engagement of A one-way clutch 40, as indicated in the table, will allow driving a load forward at second pinion carrier 212 at a further reduced rotational speed. During coasting where the load rotates faster than driven by the geartrain, second pinion carrier 212 drives second ring gear 174 forward and A one-way clutch 40 disengages. With second ring gear 174 freewheeling, no reverse coupling of the load to the engine occurs.

The gear reductions provided by this combinational incrementally variable transmission (CIVT) are compounded, eliminating the need for final ratio reduction gearing for automotive applications, if desired. Table 1 lists drive ratios which were obtained using the following number of teeth on each of the principal gearing elements: {first sun gear 162: 52; first ring gear 172: 84; first pinion carrier 210 pinions: 16; second sun gear 164: 38; second ring gear 174: 78; second pinion carrier 212 pinions: 20}. For the C ratio state, the overall drive ratio ($\omega_{in}/\omega_{out}$) is about 7.98, as listed under the heading, "Overall Ratio." To illustrate the combinational nature of the ratio states, the column "Inverse Overall Ratio" lists which gives the fraction of driving speed imparted to the transmission output by the active power transmitting paths. The "C" power transmitting path energized by C clutch 114, for example, contributes a drive fraction of 13/100. The last column shows the overall transmission ratio divided by 2.6, and is helpful for comparison since virtually all automotive drivetrains use final ratio reduction gearing and their transmission ratios are customarily listed separately, not having been multiplied by the final drive ratio used to arrive at an overall drive ratio value.

From the first speed, a second or B ratio state is available through a single transition shift by simultaneous release of C clutch 114 and application of B clutch 112. Both forward clutch 350 and B one-way direct clutch 202 remain applied, although B one-way direct clutch 202 does not participate in power transmission, and remains applied solely to simplify clutch control. This is indicated in the table by having the "X" clutch apply/active symbol inside parentheses. With first ring gear 172 driven forward, C one-way clutch 44 actively engages to prevent reverse rotation of first sun gear 162, thus allowing first pinion carrier 210 to rotate at reduced angular speed. With forward torque transmitted to second sun gear 164, again by coupling through forward clutch 350, second ring gear 174 is also urged backward, but prevented through the reactive force provided by active engagement of A one-way clutch 40. Second pinion carrier 212 then is driven at a moderate reduced angular speed, giving an overall ratio of 4.94, with the contribution made by the "B" power transmitting path being about 20/100 of input angular speed.

This corresponds to a conventional second gear of about 1.90. During a coasting condition, second ring gear 174 again overruns, decoupling the load from the engine.

The third or BC ratio state is achieved by gradual reapplication of C clutch 114, allowing both the "B" and "C" power transmitting paths to contribute to the output motion, so that the sum of the inverse overall ratios or fractional drive contributions for the "C" and "B" states taken individually equal algebraically the inverse overall ratio for the "BC" ratio state, 33/100. With second sun gear 164 driven at transmission input speed, second ring gear 174 is again restrained by active engagement of A one-way clutch 40. The overall ratio of 3.05 gives an effective ratio of 1.17. Again, no engine braking occurs during coasting since forward driving of second ring gear 174 goes unchecked.

To access the fourth or RA ratio state, a multiple transition shift occurs whereby clutches 112, 202, and 350 are released while reversing clutch 355, carrier brake 356 and A clutch 110 are applied. With C clutch 114 applied, first sun gear 162 is coupled to input shaft 142 while first pinion carrier 210 is held stationary by carrier brake 356, giving rise to reversing motion at first ring gear 172. This reverse motion is no longer prevented by engagement of B one-way clutch 42 because B one-way direct clutch 202 is disengaged. The reverse motion of first ring gear 172 is communicated to second sun gear 164 via drive shell 268 and by application of reversing clutch 355. This "R" or reversing power transmitting path contributes an angular speed of $-0.20$ $\omega_{in}$ to the net transmission output speed. In addition to this reversing power transmitting path, application of A clutch 110 drives drum 366 and second ring gear 174 at the speed of input shaft 144, contributing a net drive fraction of 0.67 at the transmission output. The "R" and "A" contributions add to a net 0.47 $\omega_{in}$ at the output. Some power recirculates as the second ring gear 174 also drives the second sun gear 164 backward, so that the engine or prime mover drives A clutch 110 with a torque $T_{110}$ of 1.43 times engine torque, while C clutch 114 drives the engine with the a torque $T_{114}$ of $-43$ times engine torque:

$T_{110} = 1.43\ T_{engine}$ $T_{114} = -0.43\ T_{engine}$

This torque calculation may be verified by equating the force on the sun and ring sides of the free spinning planetary pinions held by second pinion carrier 212. With an overall $\omega_{in}/\omega_{out}$ of 2.13, the effective ratio for conventional transmissions with a 2.6 final reduction gear is a shallow overdrive ratio of 0.82. During coasting, the load may drive the engine, as there are no free gearing elements to freewheel or decouple the engine from the load.

To shift into the fifth or A ratio state, reversing clutch 355, C clutch 114 and carrier brake 356 are released while B one-way direct clutch 202 and forward clutch 350 are again applied. A clutch 110 drives drum 366 and second ring gear 174, and under an output load second sun gear 164 will be urged to rotate backward. By actuation of forward clutch 350, second sun gear 164 is coupled to first pinion carrier 210, which will not rotate backward because first ring gear 172 and first sun gear 162 are restrained by active engagement of one-way clutches 42 and 44, respectively. The A power transmitting path contributes 0.672 win to the output angular speed $\omega_{out}$, giving an overall ratio of 1.49, which is effectively 0.57 overdrive gear.

From fifth, a sixth AC ratio state is available through a single transition shift whereby C clutch 114 is engaged. The power flow is similar to that for the fifth speed, with an additional contribution made by engagement of C clutch 114, giving 0.13 plus 0.67, or 0.80 $\omega_{in}$ contribution to the output angular speed. This gives an overall ratio of 1.25, which translates to a deep overdrive of 0.48 when compared to a conventional automotive drivetrain. The B power transmitting path is still restrained from backward motion by B one-way clutch 42.

From sixth, a seventh AB ratio state is achieved by simultaneous application of B clutch 112 and release of C clutch 114. The output angular speed now totals 0.87 $\omega_{in}$, with an overall ratio of 1.14 and an effective ratio of 0.44, a very deep overdrive. The C power transmitting path is restrained by C one-way clutch 44. Engagement of B one-way direct clutch 202 is again optional, only to simplify clutching, since the B power transmitting path is now driven.

From seventh, the eighth or top ratio state occurs when C clutch 114 engages, allowing all forward power transmitting paths to contribute to output motion. The transmission then acts as a direct coupling, with the drive fraction and overall ratio equal to unity. For the conventional transmission having final reduction gearing, this is effectively an extremely deep 0.38 overdrive, permitting engine speeds of about 1000 rpm at 110 km/hr (70 mph), depending on tire and wheel size. With all power transmitting paths driven, no engagement of one-way clutches occurs, and the engine is always directly connected to the load, permitting engine braking. During the fifth, six and seventh speeds, however, load-engine decoupling occurs, since one-way clutches 42 and/or 44 will disengage, permitting freewheeling of a principal gearing element.

Safety considerations require that manually selectable engine braking states be available. A "manual third" BC ratio state which allows engine braking, commonly available in a selection mode labelled "L3" on a gear selector indicia plate, is achieved through the same clutching given above for the BC state, but with A brake clutch 120 also applied to prevent overrunning of the A clutch housing 130 during coasting. Similarly a "manual second" or "L2" engine braking B ratio state is achieved through B ratio clutching plus additional application of both A brake clutch 120 and C brake clutch 124. A "manual first" C ratio state giving "L1" engine braking is attained with C ratio state clutching plus application of both A brake clutch 120 and B brake clutch 122.

Finally, a pure reverse or R ratio state is available by actuating C clutch 114, carrier brake 356, reversing clutch 355, and A brake clutch 120. As before in the RA ratio state, actuation of C clutch 114 with first pinion carrier 210 held stationary by carrier brake 356 develops reversing motion at first ring gear 172 which is coupled to second sun gear 164 by reversing clutch 355. Now, however, the A power transmitting path is not energized, but is held stationary by A brake clutch 120, which prevents forward spinning of second ring gear 174 when driving an output load.

It is important to note that the "Effective" ratios listed can be shifted by any desired factor to suit an application by changing the input chain ratio—the number of teeth on the driving and driven sheaves or sprockets used in driving the input shafts 142 and 144. For a typical chain ratio, 33/37, where 33 and 37 are the number of teeth on the driving/driven sprockets respectively, the effective transmission ratios in the last column become as follows: {3.44, 2.13, 1.31, 0.92, 0.64, 0.54, 0.49, 0.43, 1.31, 2.13, 3.44, −2.13}. Also, a wide range of ratio patterns may be obtained by varying the number of teeth on each of the principal gearing elements.

From inspection one can see that the layout of clutch devices and power transmitting components found in FIG. 13 is topologically similar to that of FIG. 9. The structure of FIG. 13, however, is not unique and many topological variations in layout of clutches, shafts, etc., can be made without departing from the general arrangement given in FIG. 9. This embodiment allows a maximum number of significant ratio states (nine, total) using a minimum number of planetary gearsets or gearing hardware (two planetary gearsets). There are ten clutching devices required, but some embodiments presented below, using more sophisticated input transmitters, have added advantages, including fewer clutches and simpler transitional shifting.

Figure 15:
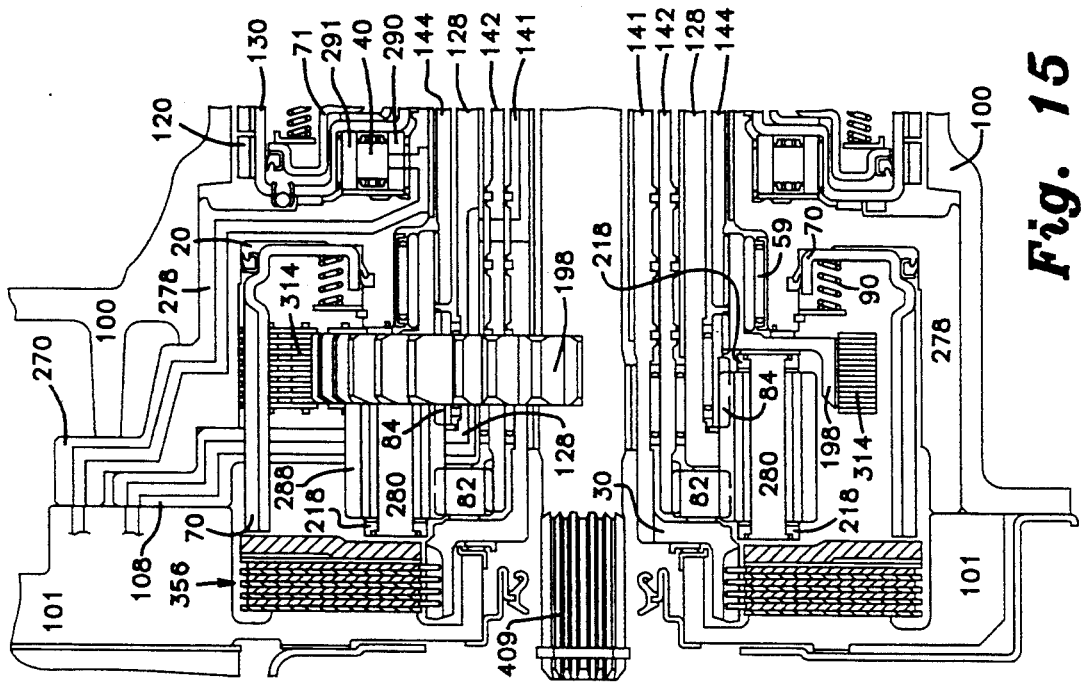
FIG. 15 shows the enlarged left-hand side view of an embodiment almost identical to that of FIG. 13, but using instead the alternative epicyclic input transmitter of FIG. 12, with a single drive link.
Figure 16:
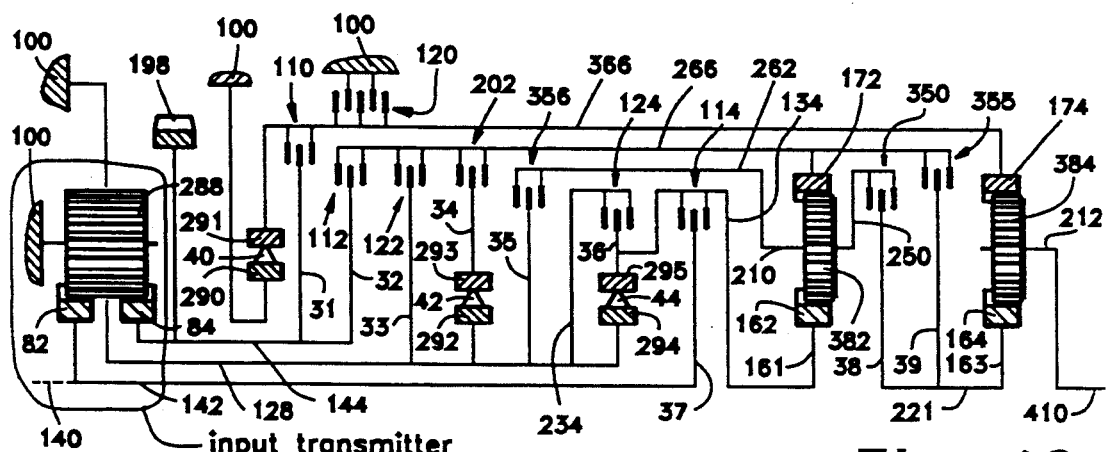
FIG. 16 is a schematic representation of the embodiment suggested by FIG. 15.

Description of FIGS. 14, 15, and 16

Figure 54:
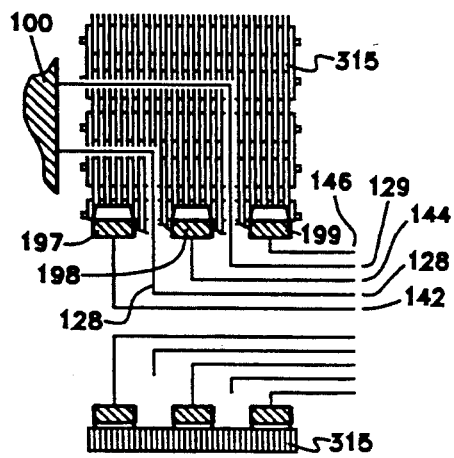
FIG. 54 shows a complex input transmitter in the upper and lower half-planes, having two reaction stators and three driving/driven sprockets fed by a single wide drive link.

To illustrate the input transmitter structure, FIG. 14 shows an enlarged partial left-hand side view of FIG. 13, with the dual drive links 312 and 314 shown. Input sprockets 198 and 199 are shown in cross section in the lower half-plane, and in a surface view in the upper half-plane. Similarly, drive links 312 and 314 are shown in cross-section in the lower half-plane, and in the upper half-plane are shown the far side of the drive links passing upward and behind reaction stator grounding foot 108 and driven sprocket support 278, and on their way to mesh with driving sprockets contained in a bell housing, not shown. Because the reaction stator grounding foot 108 and driven sprocket support 278 bond to case end plate 101 in a location which is radially outside input sprockets 198 and 199, and which is circumferentially between the slack and tensioned sides of drive links 312 and 314, a single wide input drive link 315 such as shown in FIG. 54 may be used instead of dual links.

FIG. 15 shows the enlarged left-hand side view of another embodiment almost identical to that shown in FIG. 13, except it uses instead the alternative epicyclic input transmitter shown in FIG. 12. In the epicyclic input transmitter, an input transmitter carrier 218 rotatably supports, by means of pinion support spindles 280, a plurality of long input transmitter pinions 288 which meshingly engage input transmitter first and second sun gears 82 and 84, respectively. The input transmitter carrier 218 may be fixed or bolted to case end plate 101 or to case 100, but reaction stator 128 provides a convenient attachment point. Because in this case the input transmitter carrier 218 is stationary, it may be highly asymmetric about the transmission axis, and the mutually offset arrangement of the input transmitter pinions 288 can be uneven circumferentially. There is also no dynamic rotational load on the input transmitter carrier 218. As a result, this epicyclic transmitter will generally be lighter in weight and less costly than a planetary gearset having a loaded, rotationally symmetric carrier assembly. In embodiments described below, epicyclic input transmitters will be better utilized, and will derive reversing motion for use by the geartrain. This will eliminate the need for sacrificial or internally derived reverse ratio states, simplifying transitional clutching, and greatly increasing the number of available ratio states by making it possible to provide at least one free power transmitting path with more than one kinematic degree of freedom.

FIG. 16 is a schematic representation of the embodiment suggested by FIG. 15, having the same clutching and operational characteristics as the transmission of FIG. 13, and suitable for a rear wheel drive application, where the input drive is a shaft at one end of the geartrain, rather than by means of an offset gear or a drive sprocket. This is possible by a topological rearrangement, moving carrier brake 356 from the left axial side of the geartrain to an axial location between B one-way direct clutch 202 and C brake clutch 124. The transmission may be driven by using either input sprocket 198, which drives input transmitter second sun gear 84, or by using main input shaft 140, which drives the input transmitter first sun gear 82.

Figure 17:
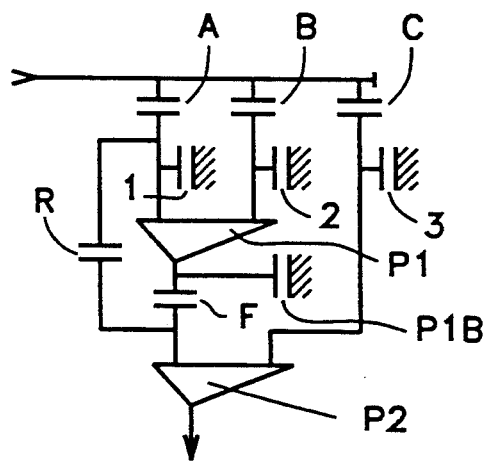
FIG. 17 shows a symbolic diagram similar to FIG. 8, except that the two singly-coupled simple planetary gearsets are in a ring-modulated configuration.

Description of FIG. 17

In a manner similar to that used in FIGS. 6(a–r) and 7(a–r), the same clutching used for the embodiment of FIG. 13 may be used with a different gearing configuration. An example given in FIG. 17 shows a symbolic diagram similar to FIG. 8, except that the two singly-coupled simple planetary gearsets are in a ring-modulated configuration similar to that shown in FIG. 6(c). For this arrangement, the same ratio states are possible, C, B, BC, A, AR, etc., but the progression of ratio states from the numerically highest to lowest may differ from that of FIGS. 8, 9, and 13, depending on the number of teeth chosen for each gearing element.

Figure 18:
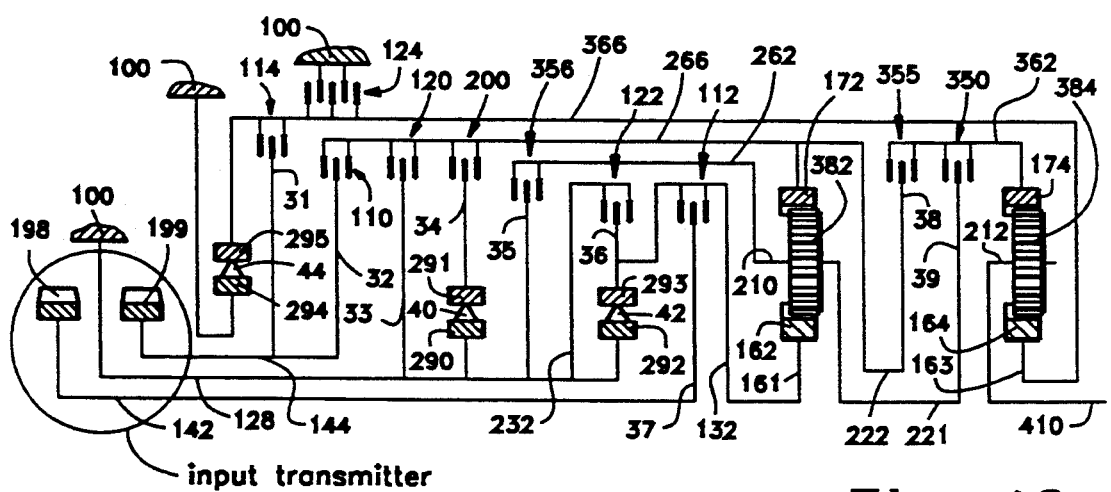
FIG. 18 is a schematic representation corresponding to the embodiment of FIG. 17, using the simple input transmitter of FIGS. 10 and 11.
Figure 19:
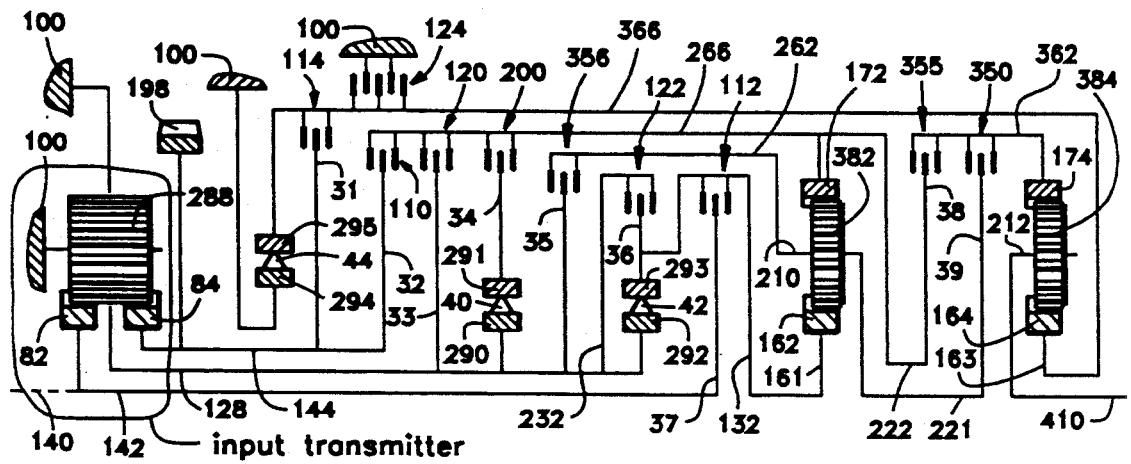
FIG. 19 is similar to FIG. 18, but uses the simple epicyclic input transmitter of FIGS. 12 and 14.

Description of FIGS. 18 and 19

FIG. 18 gives one possible schematic representation corresponding to the symbolic representation of embodiment of FIG. 17 and uses the simple input transmitter of FIGS. 10 and 11. With respect to the arrangement of FIG. 9, there are some topological changes in layout of the clutches and shafts. Output shaft 410, for example, emerges from the left axial side of second pinion carrier 212, while drum 366 now drivingly couples second sun gear 164 and hub 163 on the axial right to C clutch 114, C brake clutch 124 and C one-way clutch 44 on the axial left. An additional drum 362 now drivingly houses forward clutch 350 and reversing clutch 355, and B brake clutch housing 232 performs a role similar to that of C brake clutch housing 234 above. An additional nested sleeve shaft 222 drivingly connects first ring gear 172 to clutch inner hub 38, utilized by reversing clutch 355 for selectively coupling first ring gear 172 to second ring gear 174. FIG. 19 shows the same schematic using instead the simple epicyclic input transmitter shown in FIGS. 12 and 14. Like FIG. 16, input drive may utilize either main input shaft 140 or input sprocket 198.

Description of FIGS. 20, 21, 22 and 23

Figure 20:
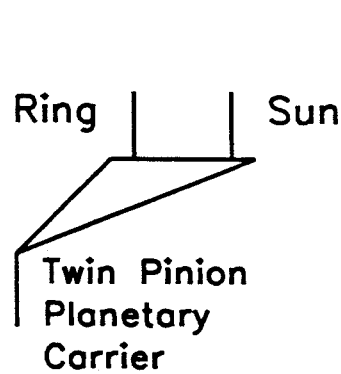
FIG. 20 is a symbolic representation of a simple twin pinion planetary gearset.

FIG. 20 shows a symbolic representation of a well known simple 3 element twin pinion planetary gearset, having a planetary carrier which rotationally supports and includes a plurality of circumferentially spaced twin pinion sets each having an inner pinion and a radially offset outer pinion. The inner planet pinion gearingly meshes with both an inner sun or center gear and the outer planet pinion. The outer planet pinion gearingly meshes with both the inner planet pinion and an outer ring or internal gear. The equation of motion for this gearset, $$\omega_c = c\omega_s + d\omega_r \tag{Eqn. 3}$$

such that $d > c$ and $c + d = 1$, and where
c = carrier/sun angular ratio, with ring fixed; $c < 0$
d = carrier/ring angular ratio, with sun fixed; $d > 1$
is different from that for the simple planetary gearset (Eqn. 1) in that the coefficient d is greater than one, while c is always negative.

Figure 21:
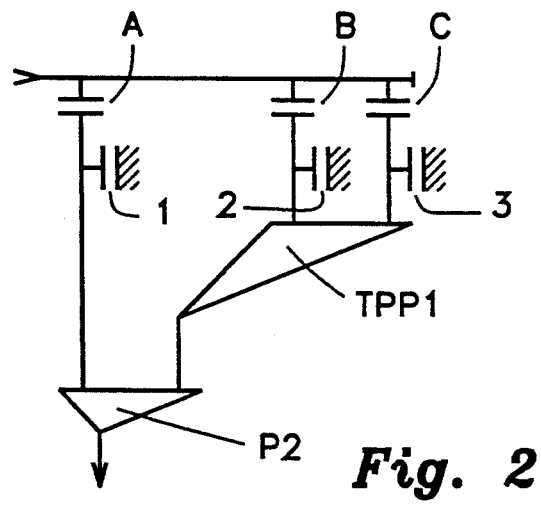
FIG. 21 is a symbolic diagram for a transmission using the twin pinion planetary gearset of FIG. 20 for the first gearset and a simple planetary gearset for the second, having internally derived reversing states.

FIG. 21 is a symbolic diagram for a transmission using the twin pinion planetary gearset TPP1 of FIG. 20 singly coupled in a sun-modulating configuration to a simple second planetary gearset P2. The planetary carrier of twin pinion planetary gearset TPP1 is directly coupled to the sun gear of second planetary gearset P2, allowing internally derived reversing states. The clutching is similar to that shown in FIG. 3, with clutches A, B, and C driving the ring gear of second planetary gearset P2, and the ring and sun gears of twin pinion planetary gearset TPP1, respectively. The equation of motion for this transmission is $$\omega_{out} = b_2\omega_A + a_2d_1\omega_B + a_1c_2\omega_c \tag{Eqn. 4}$$

where the new subscripts 1 and 2 refer to planetary gearsets TPP1 and P2, respectively. Using the following number of teeth for each of the principal gearing elements: {first sun gear 162: 38; first ring gear 172: 78; second sun gear 164: 56; second ring gear 174: 88}, the equation of motion becomes:

$$\omega_{out} = 0.611\omega_A + 0.758\omega_B - 0.370\omega_c \tag{Eqn. 5}$$

With reversing motion developed internally by energizing the power transmitting path fed by clutch C, only a minimum number of clutches are needed even when engine braking ratio states are required.

clutch 124. Actuation of C clutch 114 will couple drum 262 to clutch inner hub 35, which is coupled to input shaft 142. Drum 262 may be braked by actuating C brake clutch 124, which selectively couples drum 262 to clutch inner hub 34, which is coupled to reaction stator 128. For the second power transmitting path, first ring gear 172 is drivingly coupled to drum 266, and may be driven by actuation of B clutch 112, which selectively couples drum 266 to input shaft 144 via clutch inner hub 32. Drum 266 is braked by selective actuation of B brake clutch 122 which couples drum 266 to reaction stator 128 via clutch inner hub 33. Reactive force needed to prevent backward motion of drum 266 is provided by B one-way clutch 42, whose outer race 293 is coupled to drum 266, and whose inner race 292 is coupled to reaction stator 128. For the first power transmitting path, second ring gear 174 is drivingly coupled to drum 366. Actuating A clutch 110 couples drum 366 to input shaft 144 via clutch inner hub 31, while drum 366 may be braked by selective actuation of A brake band clutch 120. Reactive force needed to prevent backward motion of drum 366 is provided by A one-way clutch 40, whose outer race 291 is coupled to drum 366 and whose inner race is coupled to case 100.

Figure 22:
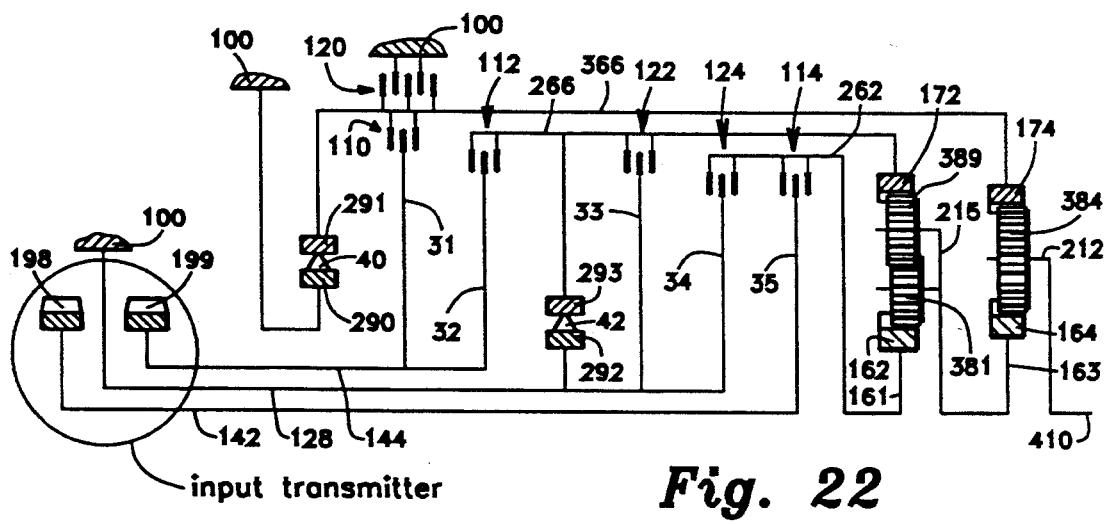
FIG. 22 is a schematic representation of a transmission corresponding to the embodiment shown in FIG. 21, using the simple input transmitter of FIGS. 10 and 11.

Referring to FIGS. 21 and 22, and Table 2, a clutching and ratio table for the transmission of FIG. 22, and describing the operation of this gearing arrangement will show how a total of seven ratio states, including up to six forward speeds, may be obtained.

In neutral, all clutches are disengaged, but to simplify clutch control, either C clutch 114 or A clutch 110 may be engaged without driving output 410.

From neutral, a first forward or AC ratio state may be obtained by gradual simultaneous application of clutches 110 and 114. Actuation of A clutch 110 drives second ring gear 174 forward while C clutch 114 drives first sun gear 162 forward. Because first sun gear 162 is part of a twin pinion planetary gearset TPP1, the contri-

TABLE 2

| Speed | Ratio State | CLUTCHES/BANDS | | | | | | OWC | | Inverse Overall Ratio out/in | Overall Ratio in/out |
|---|---|---|---|---|---|---|---|---|---|---|---|
| | | A 110 | B 112 | C 114 | Abr 120 | Bbr 122 | Cbr 124 | A/1 40 | B/2 42 | | |
| N | φ | | | | | | | | | — | — |
| 1 | AC | X | | X | | | | | X | .24 | 4.14 |
| 2 | BC | | X | X | | | | X | | .39 | 2.57 |
| 3 | A | X | | | | | X | | X | .61 | 1.64 |
| 4 | B | | X | | | | | X | X | .76 | 1.32 |
| 5 | ABC | X | X | X | | | | | | 1.00 | 1.00 |
| 6 | AB | X | X | | | | X | | | 1.37 | .73 |
| L3 | A | X | | | | X | X | | | .61 | 1.64 |
| L2 | BC | | X | X | X | | | | | .39 | 2.57 |
| L1 | AC | X | | X | X | | | | | .24 | 4.14 |
| R | C | | | X | X | X | | | | −.37 | −2.71 |

FIG. 22 shows a schematic representation of the embodiment corresponding to that shown in FIG. 21, using the simple input transmitter of FIGS. 10 and 11. As shown in FIG. 20, second planetary pinions 384 are retained by second pinion carrier 212 which is drivingly coupled to output shaft 410. Second sun gear 164 is drivingly connected to twin pinion carrier 215 via second sun gear hub 163, leaving second ring gear 174, first ring gear 172 and first sun gear 162 as free gearing elements powered by the power transmitting paths driven by clutches A, B, and respectively. In the third power transmitting path, first sun gear 162 is drivingly coupled via first sun gear hub 161 to drum 262, which may be selectively coupled to C clutch 114 or C brake bution of this motion to twin pinion carrier 215 and second sun gear 164 will be backward. When output shaft 410 is connected to a load, some power recirculation occurs as forward loading of second ring gear 174 will drive second sun gear 164 and twin pinion carrier 215 backward, driving first sun gear 162 forward. Backward motion of first ring gear 172 is prevented by active engagement of B one-way clutch 42. The "A" and "C" contributions add to a net $0.24\omega_{in}$ appearing the output shaft 410, giving an overall ratio of 4.14. During a coasting condition, the load is decoupled from the engine as B one-way clutch 42 overruns and allows first ring gear 172 to spin freely.

From the first speed, a second BC ratio state is available in a single transition shift through simultaneous release of A clutch 110 and actuation of B clutch 112. First ring gear 172 is driven forward, providing a "B" output contribution of $0.76\omega_{in}$, and the "C" contribution is $-0.37\omega_{in}$, leaving a net forward contribution $0.39\omega_{in}$, and an overall ratio of 2.57. With the transmission under load, power again recirculates as first ring gear 172 drives first sun gear 162 forward. With twin pinion carrier 215 executing reduced speed forward motion, second ring gear 174 is urged backward, but held stationary by engagement of A one-way clutch 40. A one-way clutch 40 overruns during coasting, allowing second ring gear 174 to spin freely and decouple the transmission.

From second, a third A ratio state is accessed by means of a double transition shift whereby clutches 112 and 114 are released while A clutch 110 and C brake clutch 124 are engaged. This causes only second ring gear 174 to be driven by input shaft 144. Under an output load, this will cause second sun gear 164 and twin pinion carrier 215 to be driven backward. This in turn will urge first ring gear 172 to rotate backward, and urge first sun gear 162 to turn forward. Backward motion of first ring gear 172 is prevented by active engagement of B one-way clutch 42, while first sun gear 162 is held stationary by engagement of C brake clutch 124. This "A" power transmitting path contributes $0.61\omega_{in}$ to the output, giving an overall ratio of 1.64. B one-way clutch 42 overruns during coasting, allowing first ring gear 172 to spin freely.

From third, a fourth B ratio state is obtained in a single transition shift by simultaneous release of A clutch 110 and application of B clutch 112. First sun gear 162 is again held stationary by engagement of C brake clutch 124 while A one-way clutch 40 now engages to prevent backward motion of second ring gear 174 under load. The "B" output contribution of $0.76\omega_{in}$ gives an overall ratio of 1.32. When coasting, A one-way clutch 40 overruns, letting second ring gear 174 spin.

A fifth ABC ratio is obtained in a double transition shift with simultaneous application of A clutch 110 and C clutch 114, and release of C brake clutch 124. With all three power transmitting paths driven, both planetary gearsets TPP1 and P2 lock up and the transmission becomes a direct coupling, giving an overall ratio of 1:1. Engine braking occurs during a coasting condition because all unlinked gearing elements remain coupled to the prime mover.

From fifth a sixth or top AB ratio state is achieved in a single transition shift with simultaneous release of C clutch 114 and application of C brake clutch 124. With first ring gear 172 and second ring gear 174 driven forward, first sun gear 162 is urged forward but held stationary by C brake clutch 124. This allows a combined contribution of $1.37\omega_{in}$ to the transmission output, giving an overall overdrive ratio of 0.73. Engine braking occurs during coasting.

To allow engine braking while coasting in the first three forward ratio states, braking clutches are additionally engaged to hold stationary gearing elements which would ordinarily spin freely due to overrunning of a one-way Clutch. Thus, the "L3" engine braking mode or A ratio state is achieved by applying B brake clutch 122, the "L2" engine braking mode or BC ratio state is obtained by applying A brake clutch 120, and the "L1" engine braking mode or AC ratio state is obtained by additional application of B brake clutch 122.

A reverse C ratio state is obtained by application of C clutch 114, A brake clutch 120 and B brake clutch 122. With C clutch 114 driving first sun gear 162 forward, first ring gear 172 and second ring gear 174 are urged forward when the transmission is under load, but they are prevented from doing so by clutches 120 and 122. With the overall ratios listed, final reduction gearing would be necessary for automotive applications, and while this and other superposition drives can offer acceptable overall ratios, multiple transition shifts are often required to progress sequentially through the "low speed" forward ratio states. This can be remedied by dedicating a gearset in the combinational geartrain tree to reversing motion, and not mixing forward and reverse motion in the forward sequential ratio states, but in keeping the number of gearing elements to a minimum it is preferable instead to make use of more complex input transmitters given below to provide reversing motion to the clutching and gearing devices.

Figure 23:
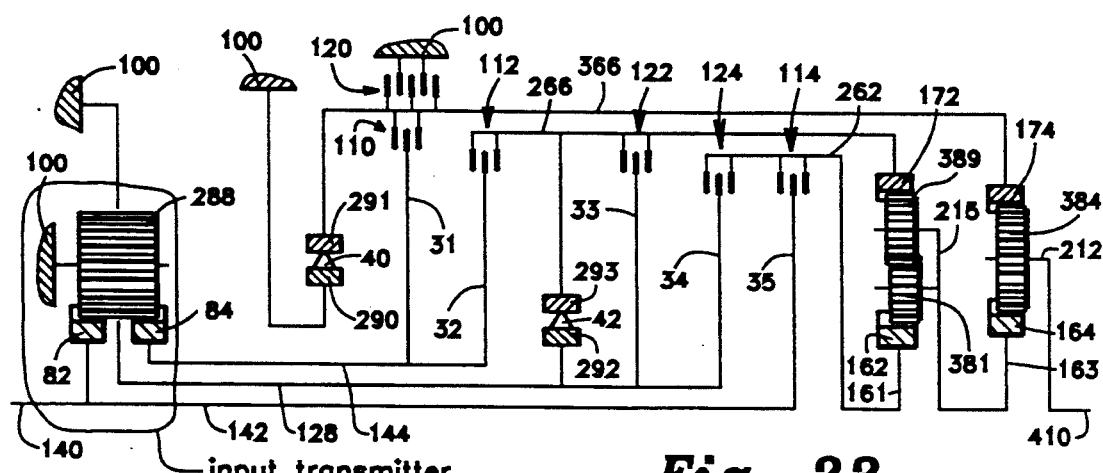
FIG. 23 is similar to FIG. 22, but uses the simple epicyclic input transmitter of FIGS. 12 and 14.

FIG. 23 is nearly identical to FIG. 22, using instead the simple epicyclic input transmitter of FIGS. 12 and 14. This allows an input drive at main input shaft 140 instead by means of input sprockets 198 and 199.

Figure 24:
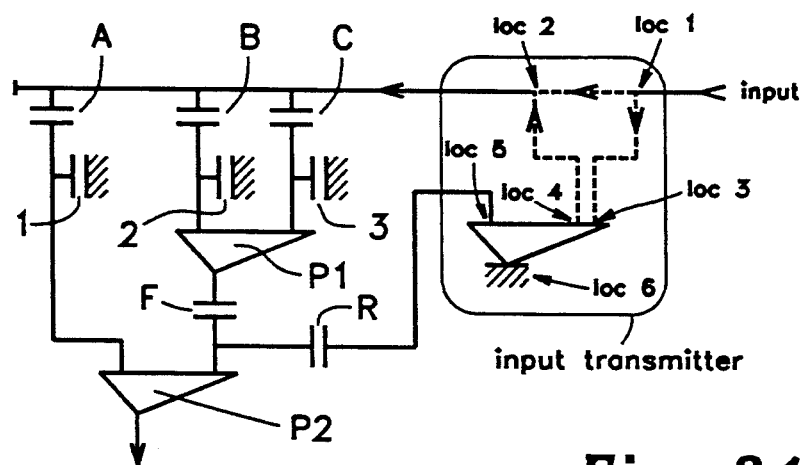
FIG. 24 is a symbolic diagram for a transmission using a simple combinational geartrain tree consisting of two singly coupled simple planetary gearsets in a sun-modulated configuration, similar to that of FIG. 8, except that external low reversing is provided by one type of complex input transmitter, which is explicitly shown in symbolic form.
Figure 25:
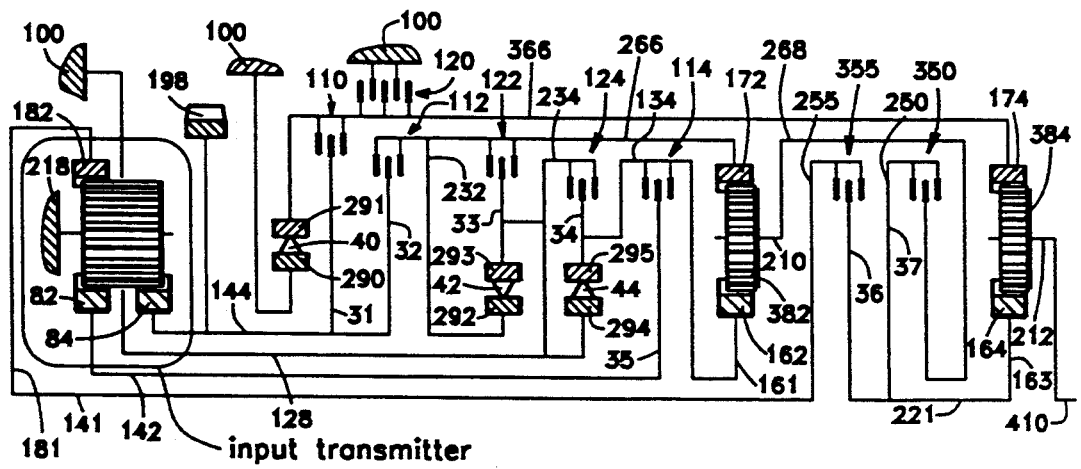
FIG. 25 is a schematic representation corresponding to the embodiment shown in FIG.
Figure 26:
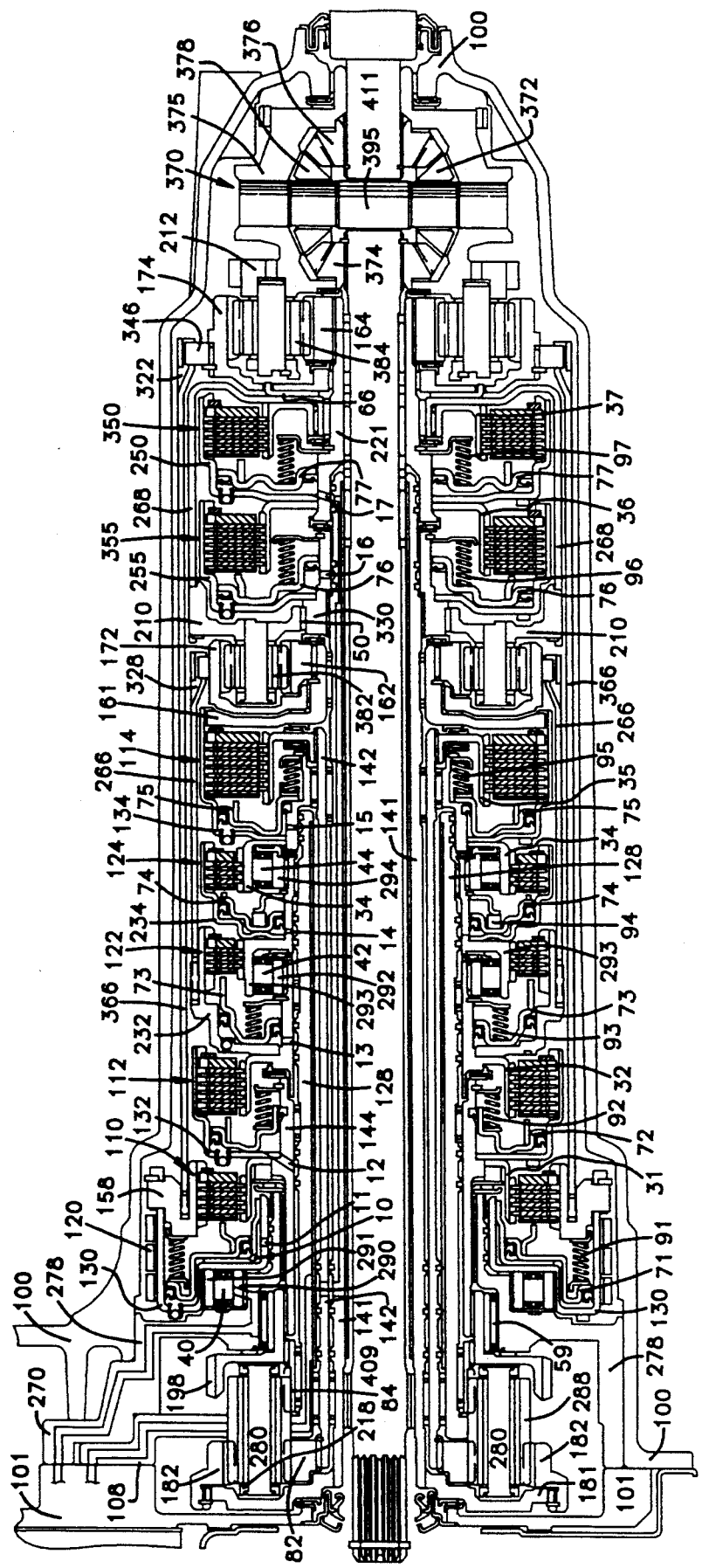
FIG. 26 shows a detailed generally cross-sectional view of a front wheel drive transaxle transmission suggested by the embodiment shown in FIGS. 24 and 25, having eight forward speeds and one reverse.

Description of FIGS. 24, 25, and 26

Gearing arrangements such as those shown in FIGS. 21, 22 and 23 above that use twin pinion planetary gears or other component gearsets to provide internally developed reversing motion can pose some difficulties when using a combinational clutching sequence to progress through forward ratio states. When one or more combinational ratio states are used to develop reversing motion, such as the C ratio state in Table 2 above, forward speed sequence clutching patterns can be disrupted, with double and multiple transition shifts becoming necessary at high output torque modes ("low gears"). Extended ratio coverage may result, but clutching becomes more difficult for automotive applications. Using bypass clutching ("sacrificial reversing") to provide reverse motion typically preserves combinational single transition shifting for some forward speeds, but the transmission will often require additional clutches, and multiple transition shifts can still be required in the forward sequence shifting pattern. As can be seen in Table 1, where sacrificial reversing was used for the R and RA states in the embodiment of FIGS. 8, 9, and 13, only single transition shifting was needed to shift through the first 3 forward speeds, but a triple transition shift was needed to go into a fourth "overdrive" speed state. One can, however, replace sacrificial reversing with externally derived reversing. This is furnished by a complex epicyclic input transmitter, which can impart motion at an angular speed different than that of the engine or prime mover.

FIG. 24 shows a symbolic diagram for a transmission using a simple combinational geartrain tree consisting of two singly coupled simple planetary gearsets in a sun-modulated configuration, similar to that shown in FIG. 8, except that external reversing is provided by an epicyclic input transmitter, now shown in the figure in explicit symbolic form. This allows that selective engagement of the R clutch with F clutch released drives the sun gear of second planetary gearset P2 in reverse. FIG. 25, a schematic representation corresponding to the embodiment shown in FIG. 24, shows this gearing arrangement explicitly. The epicyclic input transmitter is similar to that shown in FIG. 12, where a plurality of fixed-axis pinions 288 mesh with first and second sun gears 82 and 84, except that now an additional first ring gear 182, axially to the left of reaction stator 128, also drivingly meshes with the pinions 288. As before, single input sprocket 198 drives input transmitter second sun gear 84, with first sun gear 82 turning in synchrony. With the carrier 218 retaining the input transmitter pinions 288 being stationary, input transmitter first ring gear 182 will be driven at a reduced reverse speed. Coupled via the input transmitter first ring gear hub 181 to inner shaft 141, input transmitter first ring gear 182 will provide an external reversing input to clutching devices and the geartrain to the axial right. Reaction stator 128 passes as before circumferentially between pinions 288. As can be seen by comparison with FIG. 9, carrier brake 356 is no longer needed to hold first pinion carrier 210 stationary. Second sun gear 164 may again be coupled to either first pinion carrier 210, by means of a forward clutch 350 retained inside forward clutch housing 250, or may be coupled to inner shaft 141 by means of a reversing clutch 355 retained inside reversing clutch housing 255. During an "R" ratio state when reversing clutch 355 is engaged and forward clutch 350 is released, first ring gear 172 is no longer acting as the source of reverse motion, as it was in FIGS. 8, 9, and 13. Thus a B one-way direct clutch 202 is not needed to decouple drum 266 from the influence of B one-way clutch 42 which would prevent reverse motion.

Referring to FIGS. 24 and 25, and in particular to the symbolic input transmitter shown in FIG. 24, the word, "input" is again shown at the right input arrow. This signifies the power input embodied as input sprocket 198. At location loc 1, the torque delivered by input sprocket 198 is fed to what is embodied as input shaft 144. From there, some torque may be supplied to what is embodied as clutches 110 and 112, indicated by the dotted line which continues on to location loc 2. Some torque, however, may be delivered to the input transmitter second sun gear 84, and this is indicated by the dotted line proceeding to loc 3 at the sun part of the triangular gearset introduced in FIG. 1. Input transmitter second sun gears 84 and 82 turn in synchrony, and another dotted line emerges at loc 4 and proceeds to loc 2, where what is embodied as input transmitter first sun gear 82 provides torque to input shaft 142 for clutch 114. The reversing output shown at loc 5 is embodied as input transmitter first ring gear 182, while the braked or stationary carrier shown at loc 6 represents the stationary input transmitter carrier 218 which retains input transmitter pinions 288.

FIG. 26 shows a detailed generally cross-sectional view of a front wheel drive transaxle transmission suggested by the embodiment shown in FIGS. 24 and 25, again shown centered on the drive wheel axis. Referring now to FIGS. 25 and 26, input sprocket 198 is splined to both input transmitter second sun gear 84 and input shaft 144, and is bearingly supported by needle bearing 59, again retained inside the left axial end of stationary driven sprocket support 278. Input transmitter carrier 218 is again fixed by bonding to the stationary reaction stator 128 and has a plurality of pinion support spindles 280 which rotationally support a plurality of input transmitter pinions 288. These input transmitter pinions 288 mesh with input transmitter first and second sun gears 82 and 84, and input transmitter first ring gear 182. Inner shaft 141 incorporates a first ring gear hub 181 which is splined to input transmitter first ring gear 182 and is secured thereto by a "C-clip" or other conventional retainer. Input shaft 142 is now splined to input transmitter first sun gear 82, and reaction stator 128 is again coaxially surrounded by input shafts 142 and 144. Reaction stator 128 and driven sprocket support 278 may again include hydraulic passages used for lubrication or for actuating clutches in the geartrain, or may house electrical or optical conductors used to convey information from the geartrain to a transmission control system, not shown. Reaction stator grounding foot 108 and driven sprocket support foot 270 again sealingly connect these fluid conduits or bond these electrical or optical conductors to corresponding conduits and/or conductors in case end plate 101, which may house or communicate with the transmission control system. Transmission case 100 encloses A clutch 110, B clutch 112, B brake clutch 122, C brake clutch 124, C clutch 114, reversing clutch 355, and forward clutch 350, as well as first planetary gearset P1 of FIG. 24, which comprises first ring gear 172, first pinion carrier 210, first planetary pinions 382 and first sun gear 162, and also second planetary gearset P2, which comprises second ring gear 174, second pinion carrier 212, second planetary pinions 384 and second sun gear 164.

To couple the two planetary gearsets, second sun gear 164 is now drivingly coupled via sleeve shaft 221 to forward clutch housing 250 and to clutch inner hub 36. Upon selective actuation of forward clutch 350, forward clutch housing 250 is coupled to clutch inner hub 37, whose inner end is splined to drive shell 268. Drive shell 268 is by means of a sleeve bearing free to rotate independently of sleeve shaft 221 and bears axially upon thrust bearing 66, separating it from the inner hub portion of second ring gear 174. On its axial left side, drive shell 268 has axially facing teeth that drivingly engage with complementary teeth formed into the outermost portion of first pinion carrier 210. Inside forward clutch housing 250 is sealably disposed a clutch piston 77, and to actuate forward clutch 350, pressurization through passage 17 within sleeve shaft 221 causes clutch piston 77 to move axially against the bias of a plurality of return springs 97 to force engagement of a dual set of alternately interleaved clutch plates, with one set keyed or splined to clutch inner hub 37 and the other set keyed or splined to forward clutch housing 250. With second sun gear 164 splined to sleeve shaft 221, which in turn is now fixed to forward clutch housing 250, and also with clutch inner hub 37 splined to drive shell 268, which in turn is keyed to first pinion carrier 210, engagement of these clutch plates ultimately couples first pinion carrier 210 to second sun gear 164.

Upon selective actuation of reversing clutch 355, clutch inner hub 36 is drivingly coupled to reversing clutch housing 255, which incorporates a spline hub 330 for drivingly coupling to splines on the outer surface of inner shaft 141. Inside reversing clutch housing 255 is sealably disposed a clutch piston 76, and to actuate reversing clutch 355, pressurization through passage 16 within reversing clutch housing 255 causes clutch piston 76 to move axially against the bias of a plurality of return springs 96 to engage a set of alternately interleaved clutch plates, with one set keyed or splined to clutch inner hub 36 and the other set keyed or splined reversing clutch housing 255. With reversing clutch housing 255 splined to reversing inner shaft 141, and with clutch inner hub 36 coupled to sleeve shaft 221, which is in turn splined to second sun gear 164, engagement of these clutch plates causes second sun gear 164 to be driven at the low reversing speed of inner shaft 141.

Inner shaft 141 again contains internal passages for hydraulic actuating fluid for clutches 350 and 355, and is extended axially to the right so as to sealably feed passages 16 and 17. Drive shell 268 is fitted with a "c-clip" or other conventional retainer which axially secures first pinion carrier 210. By being journalled to a sleeve bearing 50 fitted on the outside of spline hub 330, first pinion carrier 210 is free to rotate independently of reversing clutch housing 255. First ring gear 172 is secured by its inner hub which is rotationally isolated from first sun gear hub 161 using both journal and thrust bearings and is isolated from first sun gear 162 using a thrust bearing.

The third power transmitting path that drives first sun gear 162 is fed through first sun gear hub 161 which is keyed or splined to the inner surface of the axial right side of C clutch housing 134. With clutch inner hub 35 splined to input shaft 142, C clutch housing 134 may be driven by actuating C clutch 114. Inside C clutch housing 134 is sealably disposed clutch piston 75. To actuate C clutch 114, pressurization through passage 15 within the inner portion of C clutch housing 134 induces clutch piston 75 to move axially against the bias of a plurality of return springs 95, causing engagement of alternately interleaved clutch plates, with one set keyed or splined to clutch inner hub 35 and the other set keyed or splined C clutch housing 134. To hold this power transmitting path stationary, a C brake clutch 124 may be actuated, selectively coupling clutch inner hub 34 to C brake clutch housing 234, whose inner portion is splined to stationary reaction stator 128. By pressurizing through a passage 14 through the inner part of C brake clutch housing 234, a clutch piston 74, sealably disposed therein, is forced to move axially against a stationary wave plate spring 94 and engage another twin set of alternately interleaved clutch plates, with one plate set splined to clutch inner hub 34 and the other splined to stationary C brake clutch housing 234. Clutch inner hub 34 also functions as the outer race 295 of FIG. 25 for C one-way clutch 44, whose inner race 294 is splined to the stationary C brake clutch housing 234, thereby providing reaction force and preventing reverse motion of clutch inner hub 34.

The second power transmitting path that drives first ring gear 172 uses drum 266 which again has a pleated end 328 formed thereon that drivingly engages with complementary splines formed on the outer portion of the axial middle of first ring gear 172. At the other end of drum 266 are axially facing teeth which engage with complementary teeth formed on the outer surface of B brake clutch housing 232. B brake clutch housing 232 has an inner portion which is splined to inner race 292 of B one-way clutch 42. The outer race 293 of B one-way clutch 42 is formed by an axially leftward extension of stationary C brake clutch housing 234. This prevents backward rotation of drum 266 and first ring gear 172. The outer race 293 also functions as clutch inner hub 33 of FIG. 25. This allows that engagement of B brake clutch 122 will couple stationary outer race 293 to B brake clutch housing 232, and hold drum 266 and first ring gear 172 stationary. B brake clutch 122 is applied using clutch piston 73, which is sealably disposed inside B brake clutch housing 232. Pressurization through passage 13 in the inner portion of B brake clutch housing 232 causes clutch piston 73 to move axially to the right against the bias of a plurality of return springs 93 and engage alternately interleaved clutch plates which are alternately keyed to B brake clutch housing 232 and to splines cut on the outer surface of stationary outer race 293.

To drive this power transmitting path, B brake clutch housing 232 is coupled to or is an integral part of a clutch inner hub 32, and input shaft 144 is again drivingly fitted with or is an integral part of B clutch housing 132, whose inner right axial end is bearingly abutted and sleeved to an axial left side extension of B brake clutch housing 232. B clutch housing 132 may be selectively coupled to clutch inner hub 32 by applying B clutch 112. With clutch piston 72 sealably disposed inside B clutch housing 132, fluid pressure through passage 12 in input shaft 144 or B clutch housing 132 pushes clutch piston 72 axially rightward against the bias of a plurality of return springs 92 to engage a plurality of alternately interleaved clutch plates which are keyed alternately to B clutch housing 132 and clutch inner hub 32.

The first power transmitting path driving second ring gear 174 is again fed by means of drum 366 which has a pleated end 322 which drivingly engages with spline ring 346 which in turn is splined to second ring gear 174. The axial left end of drum 366 terminates inside drum coupler dog 158, where axially facing teeth on drum 366 drivingly engage with complementary teeth formed inside the coupler dog. Drum coupler dog 158 also has outer radially facing teeth or ridges which mate with axial teeth or projections formed on A clutch housing 130, drivingly securing it thereto. Drum coupler dog 158 is also secured by a "C-clip" or other conventional retainer fitted onto A clutch housing 130. This prevents drum coupler dog 158 from moving axially rightward. A clutch housing 130 is bearingly cradled by driven sprocket support 278 and contains a clutch piston 71 sealably disposed therein. Again located between driven sprocket support 278 and the left axial end of A clutch housing 130 is A one-way clutch 40, whose inner race 290 is splined to the stationary driven sprocket support, and whose outer race 291 is keyed to splines cut internally on the inner left axial side of A clutch housing 130. To drive this power transmitting path, A clutch 110 selectively couples A clutch housing 130 to clutch inner hub 31, which is drivingly coupled to or is an integral part of input shaft 144. To actuate A clutch 110, fluid is driven through passages 10 and 11 in the inner portions of A clutch housing 130. This causes clutch piston 71 to move axially rightward against the bias of a plurality of return springs 91, forcing engagement of a set of alternately interleaved clutch plates that are alternately keyed to splines cut internally on the inner side of drum coupler dog 158 and to splines cut on clutch inner hub 31. This drives drum coupler dog 158, drum 366, and second ring gear 174 at the speed of input shaft 144. Braking is again provided by an A brake clutch band 120 which is wrapped circumferentially on the cylindrical outer surface of A clutch housing 130, to the axial left of the drum coupler dog 158. Selective actuation of this brake band is achieved by means of a conventional piston-driven servo assembly and apply pin, not shown, whose construction and operation is well known to those skilled in the art.

Reaction stator 128 bearingly supports B clutch housing 132 and B brake clutch housing 232, and is splined to C brake clutch housing 234, and also sealably feeds pressurized fluid to passages 12, 13, 14, and 15 when required. Similarly, the driven sprocket support 278 bearingly supports A clutch housing 130, is splined to one-way clutch inner race 290, and sealably feeds passage 11 when required.

forward clutch 350 may be applied without driving the transmission output.

From neutral, the first forward C ratio state is obtained by gradual application of C clutch 114 and forward clutch 350. C clutch 114 again couples input shaft

TABLE 3

| Speed | Ratio State | CLUTCHES/BANDS | | | | | | | | OWC | | | Inverse Overall Ratio out/in | Overall Ratio in/out | Effective Ratio for Transmissions Having 2.6 Final Reduc. |
|---|---|---|---|---|---|---|---|---|---|---|---|---|---|---|---|
| | | A 110 | B 112 | C 114 | FOR 350 | REV 355 | Abr 120 | Bbr 122 | Cbr 124 | A/1 40 | B/2 42 | C/3 44 | | | |
| N | φ | | | | | | | | | | | | — | — | — |
| 1 | C | | | X | X | | | | | X | X | | .13 | 7.98 | 3.07 |
| 2 | B | | X | | X | | | | | X | | X | .20 | 4.94 | 1.90 |
| 3 | BC | | X | X | X | | | | | X | | | .33 | 3.05 | 1.17 |
| 4 | RA | X | (X) | (X) | | X | | | | | | | .47 | 2.13 | .82 |
| 5 | A | X | | | X | | | | | | X | X | .67 | 1.49 | .57 |
| 6 | AC | X | | X | X | | | | | | X | | .80 | 1.25 | .48 |
| 7 | AB | X | X | | X | | | | | | | X | .87 | 1.14 | .44 |
| 8 | ABC | X | X | X | X | | | | | | | | 1.00 | 1.00 | .38 |
| L3 | BC | | X | X | X | | X | | | | | | .33 | 3.05 | 1.17 |
| L2 | B | | X | | X | | X | | X | | | | .20 | 4.94 | 1.90 |
| L1 | C | | | X | X | | X | X | | | | | .13 | 7.98 | 3.07 |
| R | R | | | | | X | X | | | | | | −.20 | −4.93 | −1.90 |

The transmission output is similar to that shown in FIG. 13, with second pinion carrier 212 being an integral part of a differential carrier 375 which forms part of a differential gearset 370. Inside the differential gearset are two differential pinions 372 and 378 which are rotatably supported by a differential shaft 395 which is fixed inside the differential carrier 375. Pinions 372 and 378 drivingly mesh with differential side gears 374 and 376. Differential side gear 374 is splined to left output shaft 409 which passes coaxially leftward through the geartrain, being radially adjacent to sleeve shaft 221 and inner shaft 141. The other differential side gear 376 is splined to right output shaft 411 which passes coaxially rightward through differential gearset 370. Both output shafts 409 and 411 pass outboard of transmission case 100 and may be drivingly connected through universal joints to the driving wheels of a vehicle, not shown.

Referring to FIGS. 24, 25, and 26, and also to Table 3, a clutching and ratio table for the transmission of FIG. 26, and describing the operation of this gearing arrangement will show how a total of nine ratio states may be obtained by selective or active actuation of the clutch or apply devices described above. To illustrate better the operation of this embodiment, the number of teeth chosen for each gearing element in planetary gearsets P1 and P2 and the resultant transmission drive ratios are kept the same as those given for the transmission of FIG. 13. The number of teeth chosen for each input transmitter gearing element is as follows: {input transmitter sun gears 82 and 84: 52; input transmitter ring gear 182: 84; input transmitter pinions 288: 16}. As will be seen, an identical ratio set is attained using two fewer clutching or apply devices than utilized by the embodiment of FIG. 13.

In neutral, the input shafts 142 and 144 again are driven by the prime mover, which may also drive a conventional hydraulic pump, not shown, for lubrication and clutch control. As shown in Table 3, with the Ratio State "empty set," all selectively operable clutches are released. Since both the forward and reverse clutches 350 and 355, respectively, are not applied, both second sun gear 164 and second pinion carrier 212 may spin freely, and thus differential gearset 370 and the left and right output shafts 409 and 411 are also unrestrained. Optionally, either C clutch 114 or 142 to first sun gear 162 while forward clutch 350 couples first pinion carrier 210 to second sun gear 164. Under an output load, first ring gear 172 and second ring gear 174 are urged to rotate backward, but are restrained by active engagement of B one-way clutch 42 and A one-way clutch 40, respectively.

From first, a second B ratio state is obtained through a single transition shift by simultaneous release of C clutch 114 and application of B clutch 112. First ring gear 172 is now driven by input shaft 144, while backward motion of second ring gear 174 and first sun gear 162 is prevented by active engagement of one-way clutches 40 and 44, respectively.

The third BC ratio state is attained by gradual reapplication of C clutch 114, so that both the "B" and "C" power transmitting paths contribute to the output motion. This drives first pinion carrier 210 and second sun gear 164 at transmission input speed, and second ring gear 174 is again restrained by active engagement of A one-way clutch 40.

Shifting to the fourth or RA ratio state occurs through a double transition shift whereby forward clutch 350 is released and A clutch 110 and reversing clutch 355 are applied. Application of A clutch 110 drives second ring gear 174 forward, giving a contribution of $0.67\omega_{in}$ to the transmission output, while the "R" or reversing power transmitting path enabled by actuation of reversing clutch 355 gives an output contribution of $-0.20\omega_{in}$. The "R" and "A" contributions again add combinationally to a net output speed of $0.47\omega_{in}$, and again some power recirculates, with second ring gear 174 driving second sun gear 164 backward, so that the engine drives A clutch 110 with a torque $T_{110}$ of 1.43 times engine torque, while the reversing clutch 355 now drives the engine via input transmitter first ring gear 182 with a torque $T_{355}$ of 0.43 times engine torque:

$$T_{110} = 1.43 \, T_{engine}$$

$$T_{355} = -0.43 \, T_{engine}$$

During a coasting condition, the load may drive the engine, since no power transmitting gearing element is free to freewheel. With forward clutch 350 released, B clutch 112 and C clutch 114 do not participate in power transmission, as indicated in the table by having the "X" clutch apply/active symbols inside parentheses. During the fourth or RA ratio state, B clutch 112 and C clutch 114 may remain applied, and at any time deemed appropriate by the transmission control system they may be released, e.g., just prior to shifting to the fifth or A ratio state. One clutch apply/release sequence which may be helpful for a 3-4 shift using a transmission clutch feedback/control system is to start applying A clutch 110 with B clutch 112, C clutch 114 and forward clutch 350 still applied. This will cause the engine speed to ramp down toward a speed synchronous with the ABC or $8^{th}$ speed ratio. As A clutch 110 engages and engine speed synchronous for the RA ratio state is approached or attained, release of forward clutch 350 and application of reversing clutch 355 may commence or be fully underway. The speed of A clutch housing 130 and second pinion carrier 212 may be monitored and this information used by the transmission control system to achieve a high-quality shift. In a 4-3 downshift, B clutch 112 and C clutch 114 are pre-applied while release of reversing clutch 355 and application of forward clutch 358 occur. As engagement of forward clutch 350 progresses, engine speed will drop temporarily as the transmission starts to approach an ABC or $8^{th}$ ratio state. At that time, with application of forward clutch 350 assured, A clutch 110 may be released.

From fourth, a fifth or A ratio state is achieved through a single transition shift by simultaneous release of reversing clutch 355 and application of forward clutch 350. Under an output load with second ring gear 174 driven forward, second sun gear 164 will be urged backward. Actuation of forward clutch 350 couples second sun gear 164 to first pinion carrier 210, which in turn will urge first ring gear 172 and first sun gear 162 backward. First ring gear 172 and first sun gear 162 are held stationary, however, by active engagement of one-way clutches 42 and 44, respectively.

From fifth, a sixth AC ratio state is available by additional engagement of C clutch 114. The C one-way clutch 44 overruns, with B one-way clutch 42 still active.

Transition to a seventh AB ratio state occurs when C clutch 114 is released simultaneously with application of B clutch 112. The B one-way clutch 42 now overruns, with C one-way clutch 44 active.

The eighth or top ratio state is then achieved when C clutch 114 engages, so that all forward power transmitting paths "A," "B," and "C" contribute to output motion. The transmission again acts as a direct coupling, again providing the same deep effective overdrive gear as shown in Table 1. During coasting conditions, no engine braking occurs for speeds 1, 2, 3, 5, 6, and 7, because at least one of one-way clutches 40, 42 or 44 will overrun, allowing freewheeling of a principal gearing element and decoupling the prime mover from its load. To obtain engine braking during these ratio states, it necessary as before to prevent overrunning of the appropriate one-way clutches. The "manual third" or "L3" engine braking BC ratio state is thus obtained through BC ratio clutching with A brake clutch 120 additionally applied to prevent overrunning of the A clutch housing 130 during coasting. Likewise the "manual second" or "L2" engine braking B ratio state is achieved through B ratio clutching plus additional application of both A brake clutch 120 and C brake clutch 124, and the "manual first" or "L1" C ratio state is attained with C ratio state clutching plus application of both A brake clutch 120 and B brake clutch 122.

The reverse or R ratio state is available by applying reversing clutch 355 and A brake clutch 120. Applying reversing clutch 355 drives second sun gear 164 in reverse, which under an output load will urge second ring gear 174 to rotate forward. Second ring gear 174 is held stationary by A brake clutch 120. To facilitate shifting into a "Drive" the C clutch 114 may be applied, since with non-application of forward clutch 350, it does not participate in power transmission.

Description of FIGS. 27, 28, 29, 30, 31, 32, 33, and 34

Even when confined to simple combinational geartrain trees comprising two singly linked 3-element planetary gearsets, many variations can be made in the construction of the input transmitter, the manner in which its transmitted rotational outputs are utilized by the gearing, and the gearing configuration employed. A few variations are shown here in symbolic and topological schematic form. Although one-way clutches are used generally to great advantage in simplifying clutch control, they are omitted here for brevity, and may be inserted adjacently or coaxially with the conventional brake clutches shown.

Figure 27:
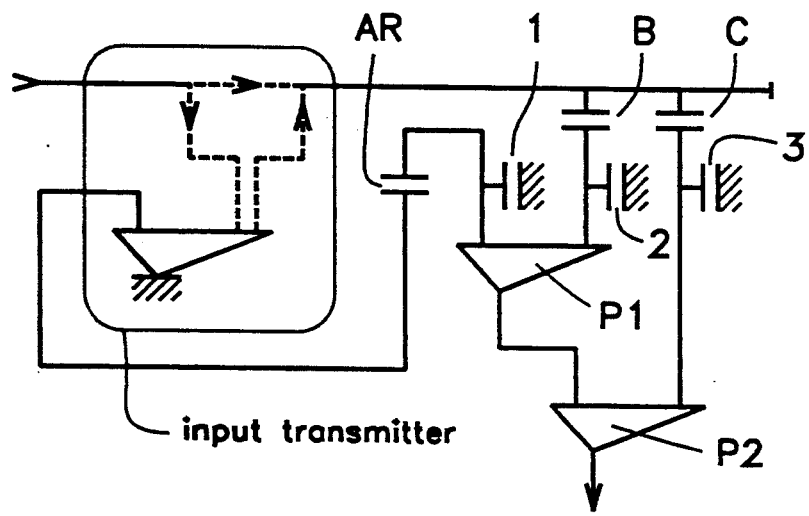
FIG. 27 and 28 are somewhat similar to FIGS. 24 and respectively, except that the singly-coupled simple planetary gearsets are in a ring-modulated configuration, and the low reversing input from a complex input transmitter similar to that shown in FIGS. 24, 25, and 26 is used instead to provide the sole power input for the power transmitting path formerly fed by clutch A.
Figure 28:
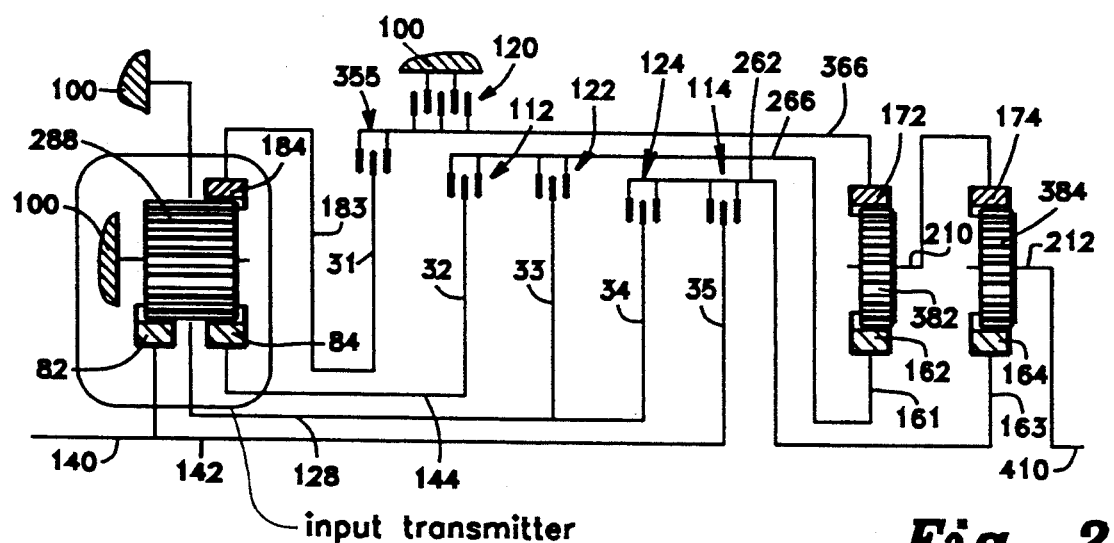

FIG. 27 and 28 are somewhat similar to FIGS. 24 and 25, respectively, except that the singly-coupled simple planetary gearsets are in a ring-modulated configuration, that is, the planetary carrier of first planetary gearset P1 is linked to the ring gear of second planetary gearset P2. Also, the low reversing speed input from a complex input transmitter similar to that shown in FIGS. 24, 25, and 26 is used now to provide the sole power input for the power transmitting path formerly fed by clutch A. This new reversing input to the first power transmitting path is executed by symbolic clutch AR. Referring to FIG. 28, the input transmitter shown has a plurality of fixed axis pinions 288 which drivingly mesh with first and second sun gears 82 and 84, and with an outer ring gear 184 located to the axial right of reaction stator 128. This provides a different coaxial arrangement of rotating shafts than the input transmitter shown in FIG. 25: the reversing input is now coaxially outside input shaft 144. The driving input at main input shaft 148 is coupled to both input transmitter first sun gear 82 and to input shaft 142. Input shaft 144 is coupled to input transmitter second sun gear 84 which turns in synchrony with input transmitter first sun gear 82, and the low speed reversing output of input transmitter ring gear 184 is coupled to clutch inner hub 31 by means of a ring gear hub 183. For the gearing shown, the three free gearing elements, namely first ring gear 172, first sun gear 162 and second sun gear 164 are coupled to drums 366, 266, and 262, respectively. The function of the numbered clutches is as previously given. Reversing clutch 355, for example, performs the function of symbolic clutch AR by selectively coupling the output of the low speed reversing input transmitter ring gear 184, via ring gear hub 183 and clutch inner hub 31, to drum 366. In the combinational execution of the ratio states (AR, B, C, AR-B, AR-C, AC, AR-BC), any power transmitting paths not driven, e.g., the path driven by actuation of C clutch 114, can be held stationary by the corresponding braking clutch, e.g., 124. A minimum of seven ratio states is thus attained.

Figure 29:
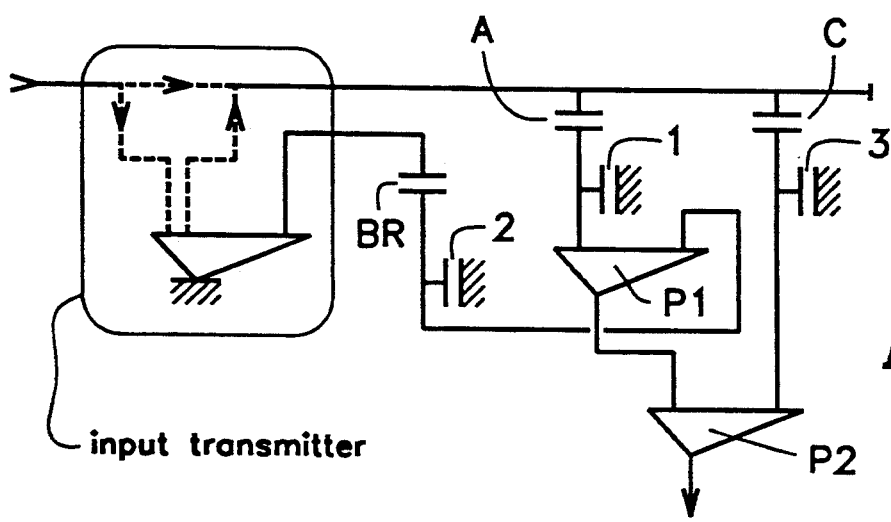
FIGS. 29 and 30 are somewhat similar to the ring-modulated configuration of FIGS. 27 and 28, respectively, except that a another type of complex input transmitter is used to provide high reversing as the sole power input for power transmitting path formerly fed by clutch B.
Figure 30:
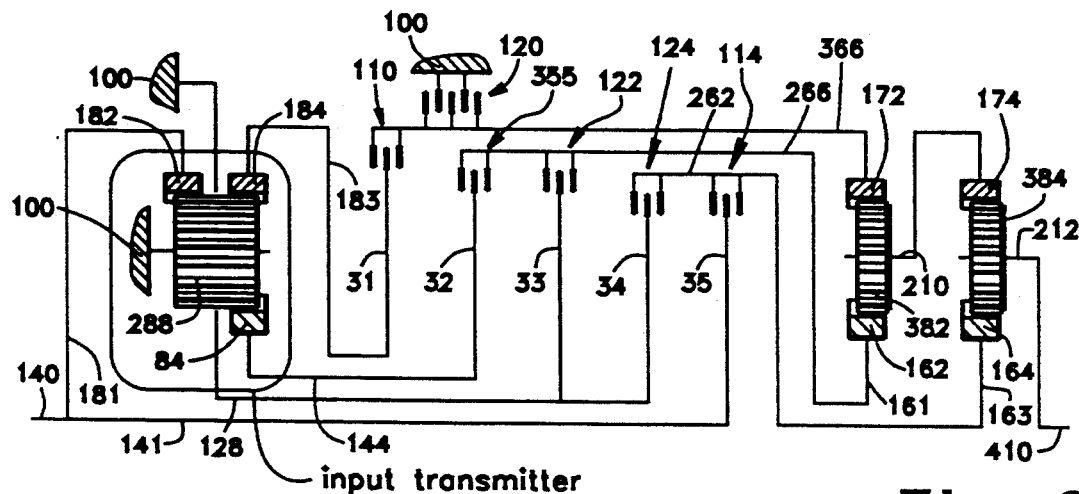

FIGS. 29 and 30 are somewhat similar to the symbolic and schematic representations shown in FIGS. 27 and 28, respectively, except that a another type of complex input transmitter is used to provide a high reversing speed input as the sole power input for power transmitting path formerly fed by clutch B. The symbolically shown input transmitter in FIG. 29 now shows the power input coupled in part to the input transmitter ring gear, with high speed reversing motion generated at the input transmitter sun gear. The high speed reversing input may be delivered to the second power transmitting path by engagement of symbolic clutch BR. Referring to FIG. 30, the three free gearing elements, first ring gear 172, first sun gear 162 and second sun gear 164 are again coupled to drums 366, 266, and 262, respectively. The input transmitter shown now has a plurality of fixed axis pinions 288 which drivingly mesh with first and second ring gears 182 and 184 on either axial side of reaction stator 128, and which mesh also with a sun gear 84 to the axial right of reaction stator 128. This provides yet another coaxial arrangement of rotating shafts. The driving input at main input shaft 140 is coupled to both input transmitter first ring gear 182 and to input shaft 141, so it is now the input transmitter ring gears which rotate in the forward sense. Coaxially outside inner shaft 141 is the reaction stator 128; coaxially outside reaction stator 128 is input shaft 144 which is coupled to input transmitter second sun gear 84. The output of input transmitter second ring gear 184 is coupled by means of hub 183 directly to clutch inner hub 31, which is now used by A clutch 110. With the axes of the pinions 288 fixed, input transmitter sun gear 84 will exhibit high speed reversing motion, that is, reverse rotation at speed greater than the forward speed of the main input shaft 140. This reversing motion is selectively delivered by reversing clutch 355 now coaxially inside drum 366, drivingly accessible instead to drum 266 which forms part of the power transmitting path fed by symbolic clutch B. Again by holding stationary any power transmitting path not driven, a minimum of seven ratio states is attained.

Figure 31:
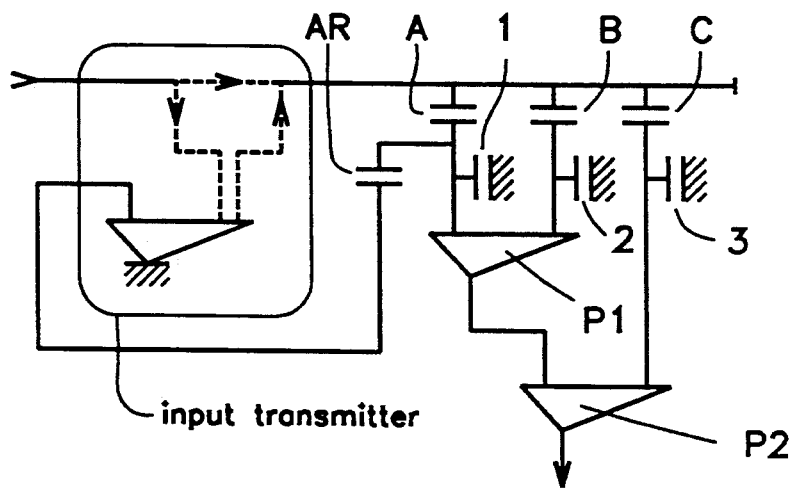
FIGS. 31 and 32 are symbolic and schematic representations, respectively, similar to FIGS. 27 and 28, except that the power transmitting path fed by clutch A may be driven forward or at low reversing speed, thus providing the path with two kinematic degrees of freedom and allowing eleven possible ratio states.
Figure 32:
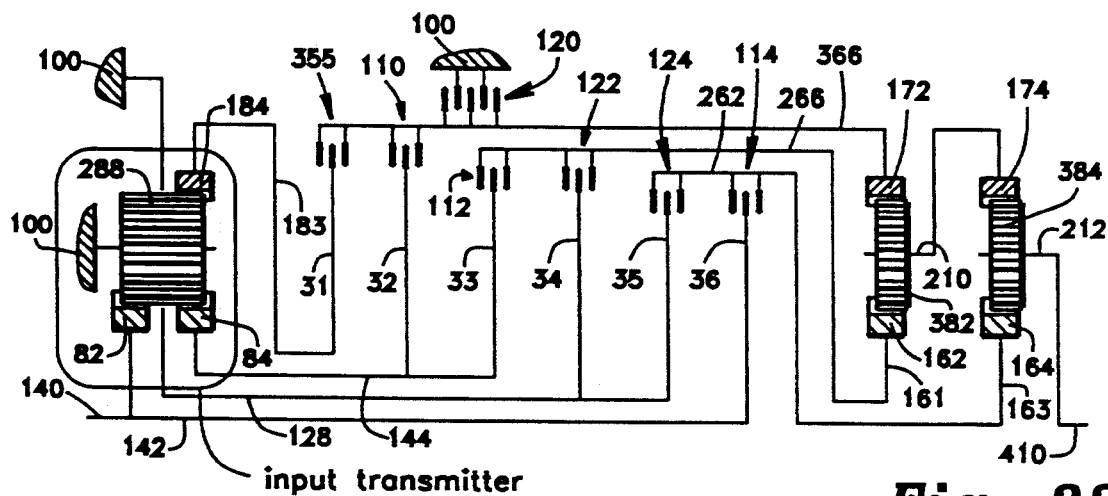

FIGS. 31 and 32 are symbolic and schematic representations, respectively, similar to FIGS. 27 and 28, but now the first power transmitting path has access to two driving modes: forward motion by engagement of symbolic clutch A, and low speed reversing motion by action of clutch AR. This provides the path with two kinematic degrees of freedom and allows four more ratio states for a total of eleven: (A, B, C, AB, BC, AC, ABC, AR, AR-B, AR-C, AR-BC). Referring to FIG. 32, the input transmitter shown is the same as shown in FIG. 28. An additional A clutch 110 is now provided to selectively couple input shaft 144 to drum 366. The engagement of clutches AR and A simultaneously would tie up the prime mover and is not permitted. Otherwise, so long as inactive power transmitting paths are braked or restrained, all the ratio states may be employed.

Figure 33:
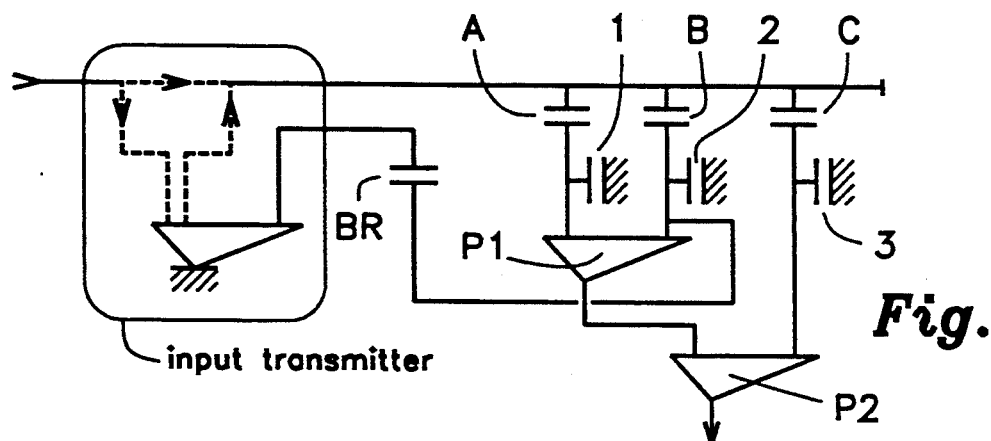
FIGS. 33 and 34 show the ring-modulated transmission of FIGS. 29 and 30, where the power transmitting path fed by clutch B is also provided with a high reversing input, giving it two kinematic degrees of freedom using the same complex input transmitter, and giving a total of eleven ratio states.
Figure 34:
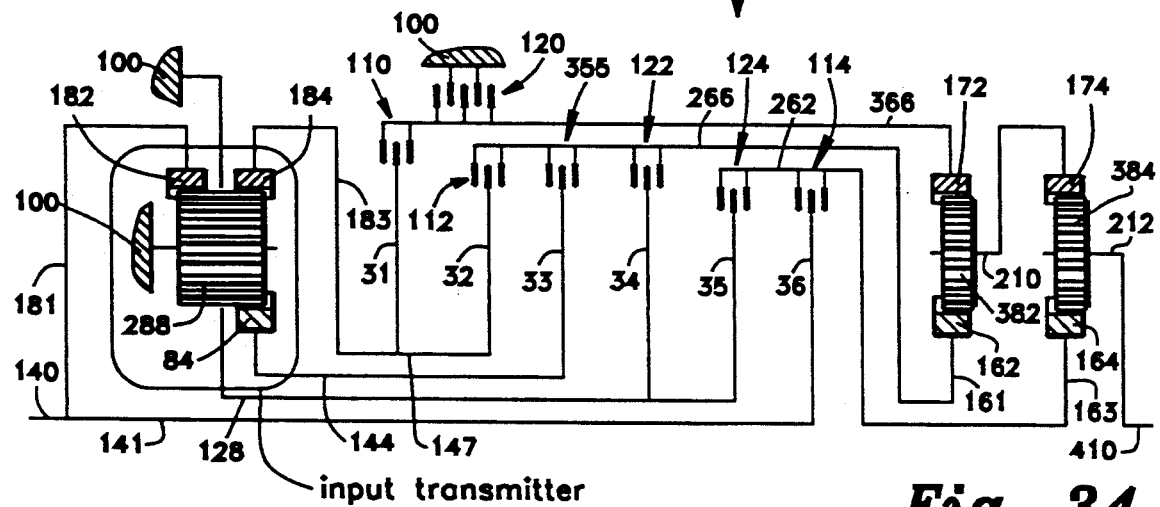

In a similar vein one can provide the second power transmitting path of the transmission shown in FIGS. 29 and 30 with two kinematic degrees of freedom. FIGS. 33 and 34 show this transmission with a B clutch 112 is added so that drum 366 may be selectively coupled to input shaft 147, which carries the output of input transmitter second ring gear hub 183 to clutch hubs 31 and 32. Eleven ratio states are allowed: (A, B, C, AB, BC, AC, ABC, BR, BR-A, BR-C, BR-AC).

Description of FIGS. 35, 36, 37, 38, 39, and 40

In a given gearing arrangement, many input transmitter structures or configurations can be utilized. One can usually devise an input transmitter that will accommodate the requirements of the gearing and clutch devices, such as: the number and type of forward and/or reversing inputs required; the input drive means, whether by use of an end shaft, a sprocket input that uses drive links or belts, offset gearing, or any hybrid combination thereof; and the specific topologic coaxial arrangement of shafts needed to access the gearing elements or structures to be driven.

Figure 35:
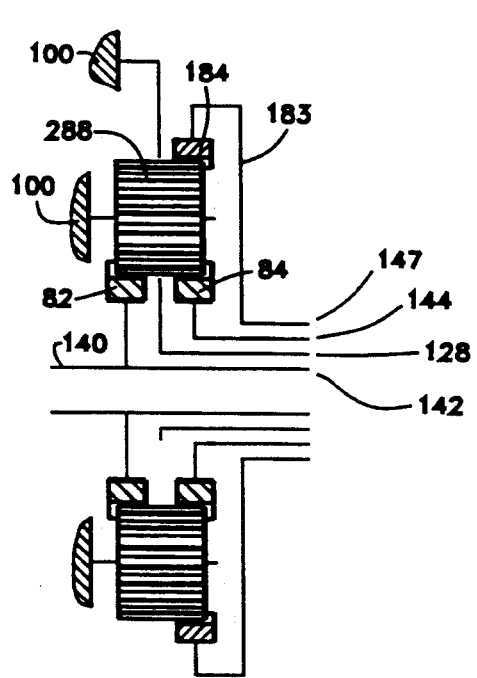
FIGS. 35, 36, 37, 38, 39, and 40 are schematic upper and lower half-plane views of the input transmitters of FIGS. 25, 28, and 32, along with other alternative complex input transmitters, some using single drive links.
Figure 36:
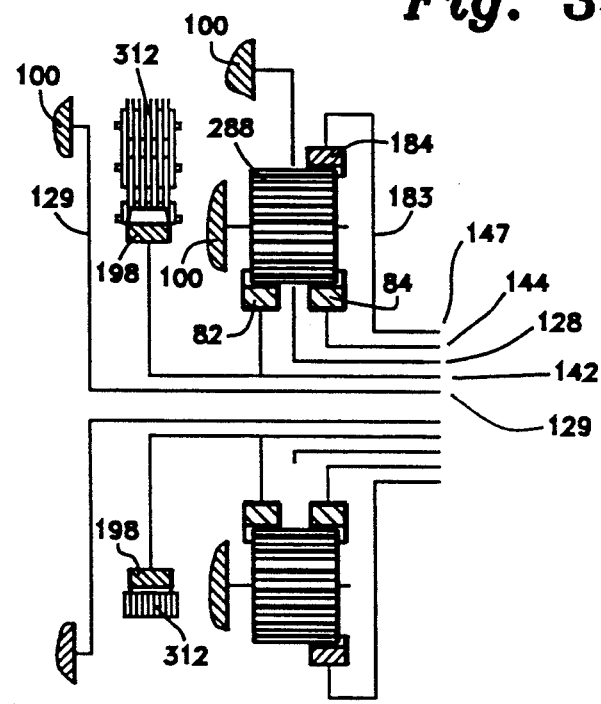
Figure 37:
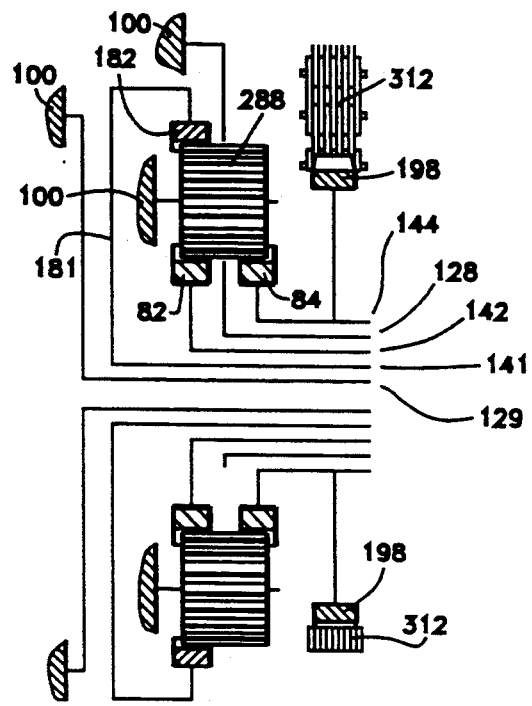

FIGS. 35, 36, 37, 38, 39, and 40 show schematic upper and lower half-plane views of the input transmitters of FIGS. 25, 28, and 32, along with other alternative complex input transmitters, some using single drive links, making them well suited for front wheel drive transaxles or other arrangements where it is desirable to have a drive link or offset gearing input. FIG. 35 shows the input transmitter used in FIGS. 28 and 32 in the upper and lower half-planes. FIG. 36 shows a similar arrangement, but now a input drive link 312 drives a input sprocket 198 which is coupled to input transmitter first sun gear 82 and input shaft 142. Another reaction stator 129 is also added, bonding to case 100 at the axial left end of the input transmitter. This provides an innermost stationary structure for braking or restraining structures in the gearing or clutch device structure. As mentioned before, reaction elements like reaction stator 129 may be driven or allowed to rotate, becoming reaction "rotors." FIG. 37 shows the input transmitter of FIG. 25 having a second reaction stator 129 similar to that shown in FIG.

Even in the description Just given, many variations may be made. In FIGS. 35, 36, and 37, the input drive was coupled to either input shaft 142 or 144. Instead, however, the input drive in FIGS. 35 and 36 may be coupled to the input shaft 147, and the input drive of FIG. 37 coupled to inner shaft 141. This interchanges the roles of the "reversing" and "forward" shafts, e.g., input shafts 142 and 144 would then exhibit reverse motion.

Figure 38:
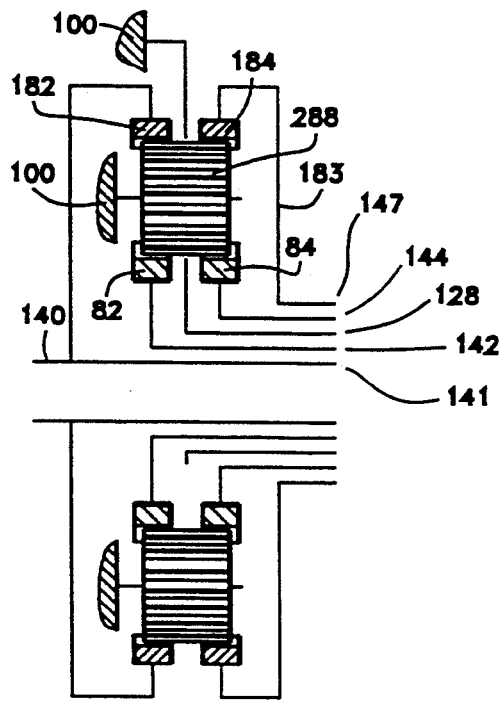
Figure 39:
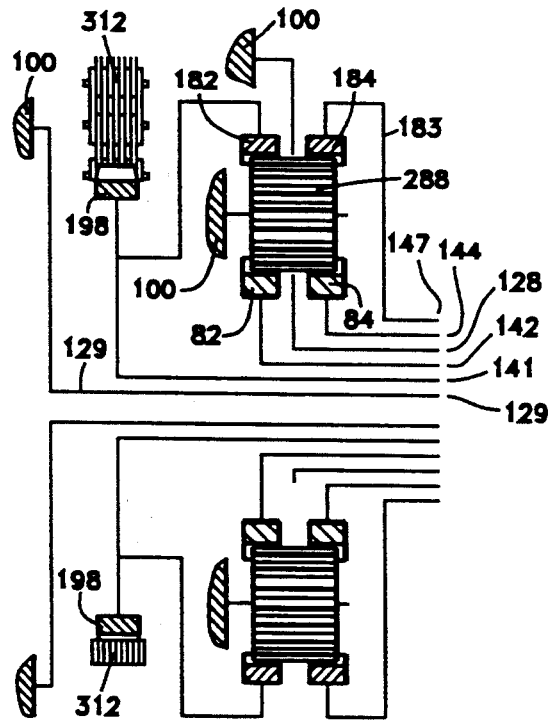
Figure 40:
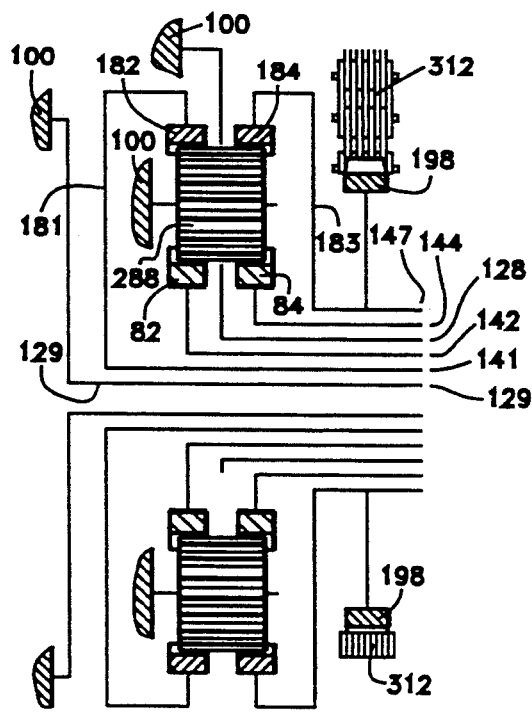

FIG. 38 shows an input transmitter having one reaction stator 128 surrounded coaxially by two rotating shafts on both its outside and inside surfaces. A plurality of input transmitter pinions 288 gearingly mesh with first sun gear 82 and first ring gear 182 to the axial left of reaction stator 128 and mesh also with input transmitter second sun gear 84 and second ring gear 184 to the axial right of reaction stator 128. In this arrangement, main input shaft 140 is coupled to both input transmitter first ring gear 182 via hub 181 and to inner shaft 141. First sun gear 82 is coupled to input shaft 142 and second sun gear 84 is coupled to input shaft 144. Second ring gear 184 is coupled to input shaft 147 via second ring gear hub 183. The coaxial grouping of shafts, in order of ascending radii, 141, 142, 128, 144, and 147, may be used with gearing and clutch device arrangements where access to reversing inputs (142 and 144) is required in a location radially adjacent to the reaction stator 128. FIG. 39 shows a similar construction where instead a input drive link 312 drives a input sprocket 198 which is coupled to both first ring gear 182 and inner shaft 141. This allows an added second reaction stator 129 to become the innermost shaft, with the left axial end again grounded in case 100. FIG. 40 shows the input sprocket 198 coupled instead to both second ring gear 184 and input shaft 147.

Description of FIGS. 41, 42, 43, 44, 47, and 48

In many conventional automotive transmission units, reversing motion is developed using a planetary gearset where the planetary carrier is braked with the sun gear driven by the engine. Molding the planetary carrier stationary requires a clutch device with a torque rating that is typically two or three times rated engine torque. In keeping the diameter and axial length of the drivetrain to a minimum, the increased torque requirement using multiple-disk wet clutches is usually managed in part by temporarily raising or "boosting" the normal hydraulic apply pressure, usually to about $1.4-2.0\times 10^3$ kPa (200–300 psi) for full throttle or maximum torque conditions. This keeps the clutch devices from slipping under full load. In the embodiments of FIGS. 13 and 26, the forward clutch 350, and reversing clutch 355, and the carrier brake 356 of FIG. 13, also must handle torques greater than engine output torque—2.6, 1.6, and 2.6 times rated engine torque, respectively. In keeping their physical size to a minimum, these clutches also would require a boosted hydraulic line pressure for satisfactory operation in the reverse "R" and fourth forward "RA" ratio states, particularly for full-throttle power shifts. However, by using the high reversing speed, low torque output from an epicyclic input transmitter similar to those shown in FIGS. 30 and 34, the carrier brake 356 and forward clutch 350 become unnecessary, and the reversing clutch R required to couple the reversing input to one or elements of the geartrain need only handle a fraction of rated engine torque, typically about $0.6 T_{engine}$. This makes boosted hydraulic line pressures unnecessary, except possibly for the manual engine braking modes, that is "L3," "L2," and "L1" on a standard gear selector/indicator. In the following embodiment, all hydraulic drive clutches used for normal forward travel conditions (clutches 110, 112, 114, 204 and 355) would not ordinarily require boosted line pressures, and for typical applications would operate satisfactorily for full throttle power shifts at line pressures under $1.4\times 10^3$ kPa (200 psi).

Figure 41:
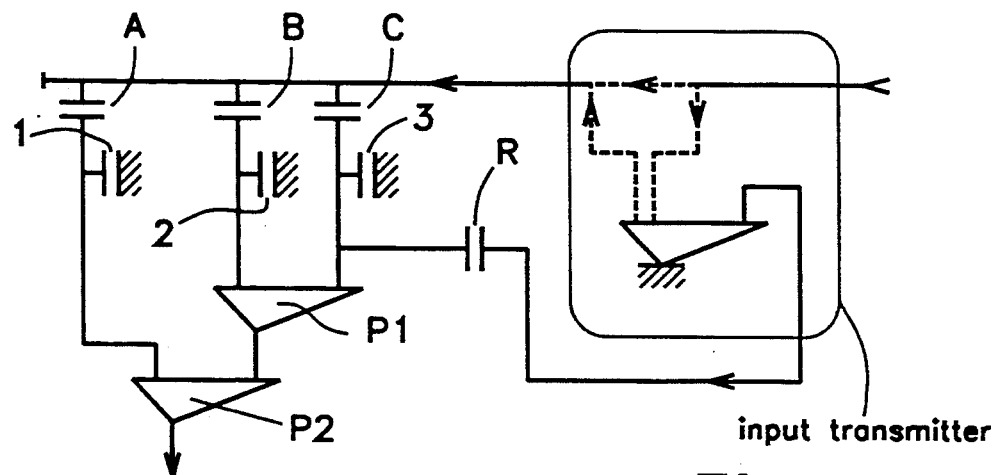
FIG. 41 is a symbolic diagram for the sun-modulated two planetary embodiment of FIG. 3, where the power transmitting path fed by clutch C is also provided with a high reversing input, giving the path two kinematic degrees of freedom, and yielding a total of eleven possible ratio states.

Referring now to FIG. 41, a symbolic diagram is shown using the sun-modulated planetary embodiment of FIG. 3, where reversing is selectively provided by the input transmitter to the power transmitting path selectively fed by clutch C. This third power transmitting path now has two kinematic degrees of freedom: it may be driven forward by actuation of clutch C, driven in reverse by action of clutch R, or held stationary by engagement of clutch 3. This allows up to eleven combinational ratio states: (A, B, C, AB, BC, AC, ABC, R, AR, BR, ABR). The CR "state," that is, actuating the C and R clutches simultaneously, would tie up the prime mover and is not allowed. With the type of input transmitters used below, the C and R clutches can be consolidated into a single clutch housing, keeping the axial length of the geartrain to a minimum. Again, because the gearing arrangement does not require additional final reduction gearing, a compact unit can be obtained which gives the same ratio coverages as the embodiments shown in FIGS. 13 and 26.

Figure 42:
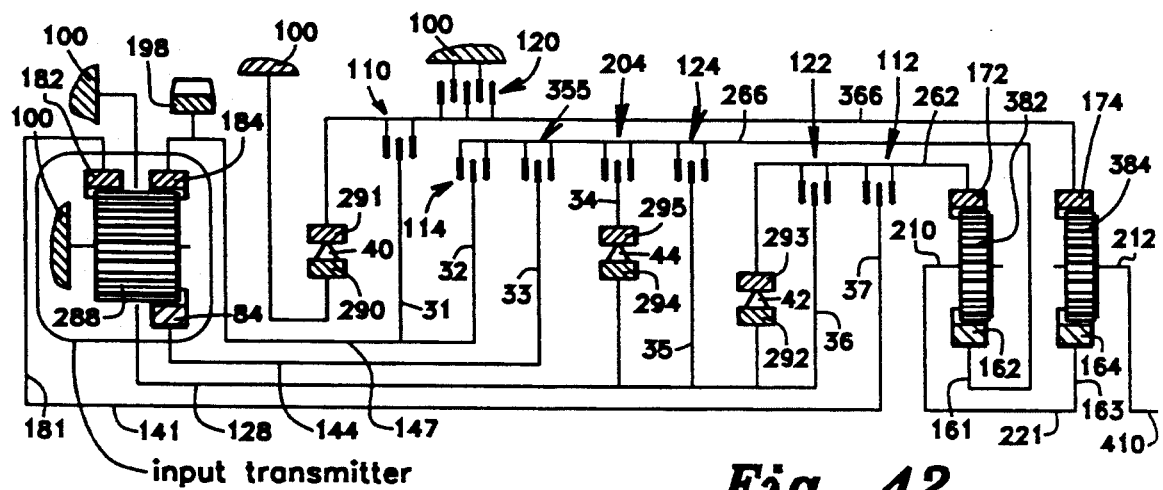
FIGS. 42 and 43 are alternative schematic representations corresponding to FIG. 41, using different complex input transmitters and different coaxial topology.
Figure 43:
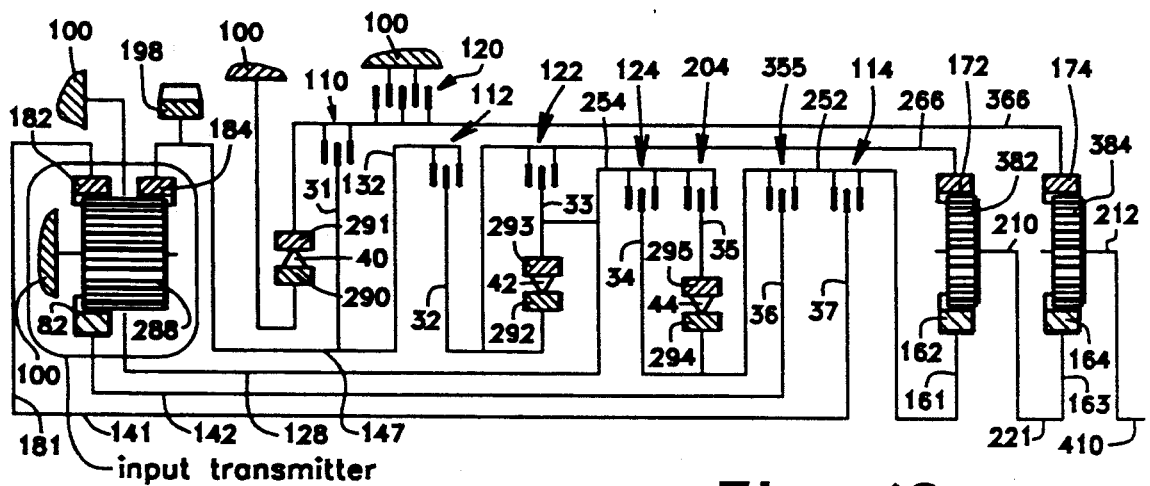

FIGS. 42 and 43 show alternative schematic representations corresponding to FIG. 41, using different complex input transmitters and a different coaxial arrangement of shafts. In FIG. 42, an input transmitter similar to that of FIGS. 30 and 34 is used whereby a plurality of input transmitter pinions 288 drivingly mesh with first and second ring gears 182 and 184, and with a sun gear 84. Input drive occurs through an input sprocket 198 which is coupled to or is an integral part of input transmitter second ring gear 184 and input shaft 147, the outermost input shaft. Input transmitter first ring gear 182 is coupled via first ring gear hub 181 to inner shaft 141, which is coaxially surrounded by reaction stator 128. Radially outside of reaction stator 128 is input shaft 144 which is drivingly coupled to reversing sun gear 84. The three free gearing elements, first sun gear 162, first ring gear 172 and second ring gear 174, are coupled to drums 266, 262, and 366, respectively. The first power transmitting path driving second ring gear 174 is again driven by A clutch 110 which selectively couples drum 366 to input shaft 147 using clutch inner hub 31. Braking and reactive forces are provided by A brake clutch 120 and A one-way clutch 40, whose inner race 290 is coupled to case 100 and whose outer race 291 is coupled to drum 366. Similarly, the second power transmitting path driving first ring gear 172 is driven by B clutch 112 which selectively couples inner shaft 141, via clutch inner hub 37, to drum 262. B brake clutch 122 selectively couples drum 262 to reaction stator 128 by way of clutch inner hub 36, and B one-way clutch 42 assures one-way motion of drum 262, with inner race 292 coupled to reaction stator 128 and outer race 293 to drum 262. The third power transmitting path driving first sun gear 162 is driven by C clutch 114 which selectively couples drum 266 with input shaft 147 by way of clutch inner hub 32. Alternatively, this power transmitting path may be reverse driven by actuation of reversing clutch 355, which selectively couples drum 266 to reversing input shaft 144 via clutch inner hub 33. Reactive force to prevent backward rotation of this power transmitting path is provided by C one-way clutch 44, whose inner race 294 is coupled to reaction stator 128 and whose outer race 295 is coupled to clutch inner hub 34. This allows C one-way direct clutch 204 to decouple the output of C one-way clutch 44 from drum 266, similar to the action of B one-way direct clutch 202 described for FIGS. 9 and 13 above. This permits reverse rotation of drum 266 when reversing clutch 355 is actuated. For engine braking, C brake clutch 124 selectively couples drum 266 to reaction stator 128 via clutch inner hub 35. Notice that the output of first pinion carrier 210 is connected to sleeve shaft 221 to the axial left of the carrier, and the output of first sun gear 162 is carried through first sun gear hub 161 to drum 266 axially between the two planetary gearsets P1 and P2.

FIG. 43 shows an alternative schematic representation that is kinematically equivalent to the structure of FIG. 42, but uses a different input transmitter and arrangement of shafts and connecting structures. The input transmitter comprises a plurality of pinions 288 which drivingly mesh with first and second ring gears 182 and 184, as in FIG. 42, and also with a sun gear 82 now on the left axial side of reaction stator 128. This arrangement permits the reversing clutch 355 and C clutch 114 to be housed together in C forward/reversing clutch housing 252, in proximity with first sun gear 162. The simpler arrangement of connecting structures around the two planetary gearsets provides for better lubrication and capacity for dissipating the heat generated by the gearsets during operation.

Figure 47:
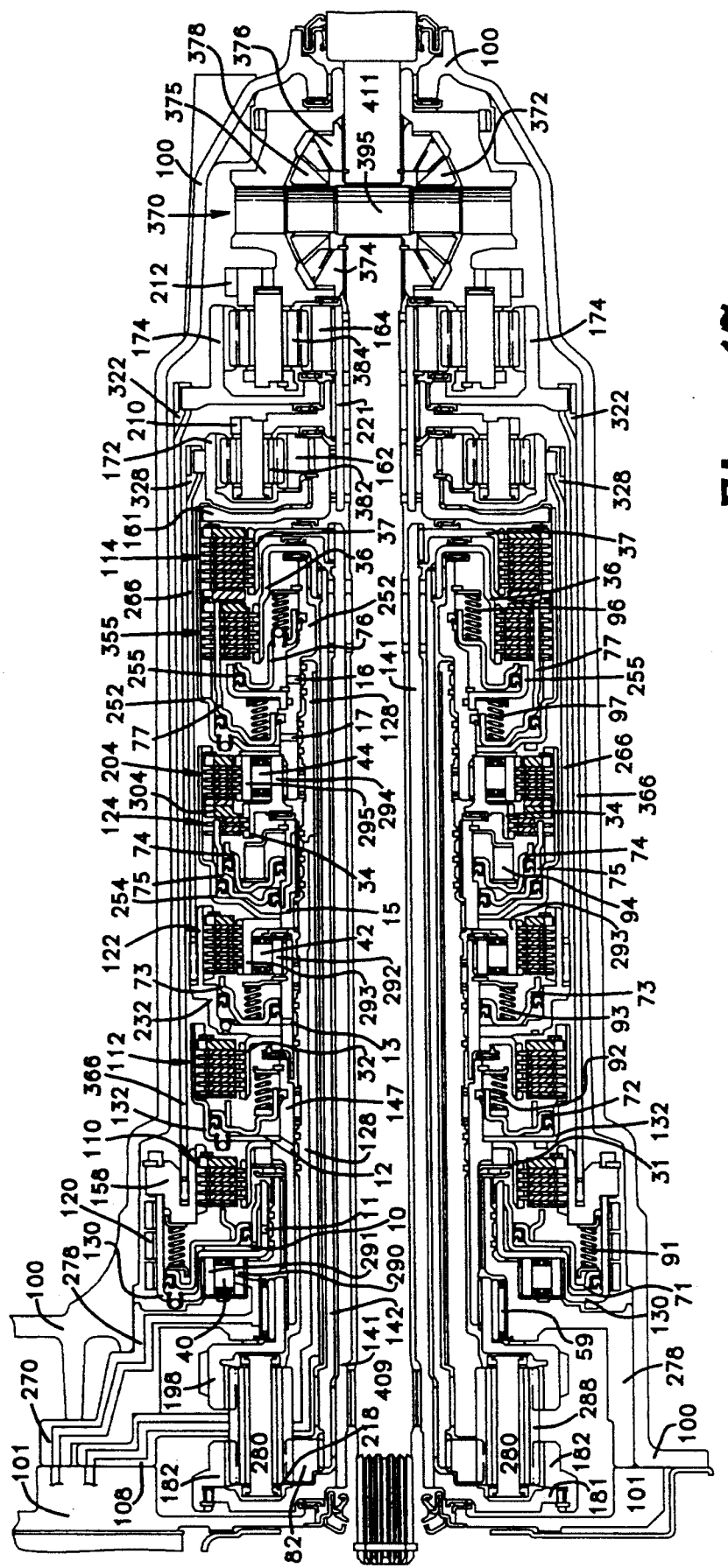
FIG. 47 shows a detailed generally cross-sectional view of a front wheel drive transaxle transmission suggested by the embodiment shown in FIGS. 41 and 43, utilizing eight forward speeds and one reverse.

FIG. 47 shows a detailed generally cross-sectional view of a front wheel drive transaxle transmission suggested by the embodiment shown in FIGS. 41 and 43, and employs eight forward speeds and one reverse selected from a total of eleven possible ratio states. Referring to FIGS. 41, 43, and 47, input sprocket 198, which is bearingly supported by needle bearing 59 retained inside the left axial end of driven sprocket support 278, incorporates or is integral with input transmitter second ring gear 184, and is also splined to input shaft 147. Input transmitter carrier 218 is fixed by mechanically bonding to reaction stator 128 and has a plurality of pinion support spindles 280 which rotationally support a plurality of input transmitter pinions 288. The input transmitter pinions 288 drivingly mesh with input transmitter first and second ring gears 182 and 184, and input transmitter first sun gear 82. Inner shaft 141 again incorporates a ring gear hub 181 which is splined to input transmitter first ring gear 182 and is secured thereto by a "C-Clip" or other conventional retainer. Input shaft 142 is again splined to input transmitter first sun gear 82, and reaction stator 128 is now coaxially surrounded only by input shaft 147. As before, reaction stator 128 and driven sprocket support 278 may incorporate hydraulic passages used for lubrication and clutch control, and may carry electrical or optical conductors used to send motion sensing information from the geartrain to a transmission control system, not shown. Reaction stator grounding foot 108 and driven sprocket support foot 270 sealingly connect these fluid conduits and bond any electrical or optical conductors to corresponding conduits or conductors in case end plate 101, which again may house or communicate with the transmission control system. Transmission case 100 encloses A clutch 110, A brake clutch 120, B clutch 112, B brake clutch 122, C brake clutch 124, C one-way direct clutch 204, reversing clutch 355, and C clutch 114, as well as first planetary gearset P1 of FIG. 41, which comprises first ring gear 172, first pinion carrier 210, first planetary pinions 382 and first sun gear 162, and also second planetary gearset P2, which comprises second ring gear 174, second pinion carrier 212, second planetary pinions 384 and second sun gear 164.

Second sun gear 164 is now directly coupled to first pinion carrier 210 via sleeve shaft 221. The inner hub of second ring gear 174 is rotationally isolated from both second sun gear 164 and sleeve shaft 221 using both journal and thrust bearings. In a similar fashion, first ring gear 172 is free to rotate independently of both first sun gear 162 and first sun gear hub 161.

The driving clutches for the third power transmitting path, C clutch 114 and reversing clutch 355, are found inside C forward/reversing clutch housing 252. The first sun gear 162 is driven by first sun gear hub 161 which is splined to the inner surface of the axial right side of C forward/reversing clutch housing 252. With clutch inner hub 37 splined to inner shaft 141, C forward/reversing clutch housing 252 may be driven by actuating C clutch 114. Inside C forward/reversing clutch housing 252 is sealably disposed clutch piston 77. To actuate C clutch 114, pressurization through passage 17 within the inner portion of C forward/reversing clutch housing 252 induces clutch piston 77 to move axially rightward against the bias of a plurality of return springs 97, causing engagement of alternately interleaved clutch plates, with one set keyed or splined to clutch inner hub 37 and the other set keyed or splined to C forward/reversing clutch housing 252. With clutch inner hub 36 splined to input shaft 142, C forward/reversing clutch housing 252 may also be driven in reverse by actuating reversing clutch 355. Sealably and mechanically affixed using conventional means to C forward/reversing clutch housing 252 is an additional reversing clutch housing 255. Inside reversing clutch housing 255 is sealably disposed clutch piston 76, which forms a sealed volume between itself and reversing clutch housing 255 and the inner portion of C forward/reversing clutch housing 252. To actuate reversing clutch 355, pressurizing through passage 16 found on the inner portion of C forward/reversing clutch housing 252 induces clutch piston 76 to move axially against the bias of a plurality of return springs 96, causing engagement of alternately interleaved clutch plates, with one set keyed or splined to clutch inner hub 36 and the other set keyed or splined to C forward/reversing clutch housing 252. The clutch plates used for C clutch 114 and reversing clutch 355 are isolated from each other using a conventional snap ring, and the clutch plates for reversing clutch 355 are apertured to allow portions of the clutch piston 77 to pass therethrough to contact and apply force to the interleaved plates used for C clutch 114.

The braking and reaction clutches for the third power transmitting path driving first sun gear 162 are found inside C reaction clutch housing 254 which is splined to reaction stator 128 and is therefore held stationary. The left axial side of C forward/reversing clutch housing 252 is extended and is splined to inner race 294 of C one-way clutch 44, whose outer race 295 also has keyways or splines cut on its outer surface so it can perform the function of clutch inner hub 35 of FIG. 43. This allows that engagement of C one-way direct clutch 204 will couple C reaction clutch housing 254 to the output of C one-way clutch 44. Stationary inner race 294 is also coupled to or is an integral part of clutch inner hub 34, which C brake clutch 124 may selectively couple to C reaction clutch housing 254. C brake clutch 124 and C one-way direct clutch 204 are actuated using two nested clutch pistons 75 and 74, respectively. To actuate C one-way direct clutch 204, pressurization through passage 15 in the inner portion of C reaction clutch housing 254 causes clutch piston 75, which forms a sealed volume between itself and C reaction clutch housing 254, to move axially rightward. The alternately interleaved clutch plates used for C brake clutch 124 are apertured to allow extended portions of clutch piston 75 to pass therethrough so that the piston may apply pressure on movable backing plate 304. Movable backing plate 304, in turn, moves slightly to the axial right and applies pressure to engage the alternately interleaved clutch plates of C one-way direct clutch 204, which are alternately keyed to the C reaction clutch housing 254 and one-way clutch outer race 295. There are no return springs in contact with clutch piston 75, but a part of the axial right side of clutch piston 75 rests upon or contacts a part of the axial left side of smaller nested clutch piston 74, so that when clutch piston 75 moves axially rightward, it pushes clutch piston 74. Clutch piston 74 resists, being biased by a plurality of stationary return springs 94. This axial movement of clutch piston 74 is insufficient, however, to engage C brake clutch 124 as the right axial end of C brake clutch 124 remains sufficiently distanced from the alternately interleaved clutch plates used for C brake clutch 124. C brake clutch 124 may be actuated, however, provided that C one-way direct clutch 204 is actuated beforehand, by pressurizing a passage, not shown, situated in the inner portion of C reaction clutch housing 254. This puts an axially rightward force on clutch piston 74, which forms a sealable volume between clutch piston 75, C reaction clutch housing 254 and itself. As clutch piston 74 moves axially rightward relative to clutch piston 75, return springs 94 are further compressed and the alternately interleaved clutch plates which are keyed alternately to C reaction clutch housing 254 and clutch inner hub 34 are engaged.

The second power transmitting path that drives first ring gear 172 uses drum 266 which again has a pleated end 328 formed thereon that drivingly engages with complementary splines formed on the outer portion of the axial middle of first ring gear 172. At the other end of drum 266 are axially facing teeth which engage with complementary teeth formed on the outer surface of B brake clutch housing 232. B brake clutch housing 232 has an inner portion which is splined to inner race 292 of B one-way clutch 42. The outer race 293 of B one-way clutch 42 is formed by an axially leftward extension of stationary C reaction clutch housing 254. This arrangement prevents backward rotation of drum 266 and first ring gear 172. The outer race 293 also functions as the clutch inner hub 33 of FIG. 43. This allows that engagement of B brake clutch 122 will couple stationary outer race 293 to B brake clutch housing 232, and hold drum 266 and first ring gear 172 stationary. B brake clutch 122 is applied using clutch piston 73, which is sealably disposed inside B brake clutch housing 232. Pressurization through passage 13 in the inner portion of B brake clutch housing 232 causes clutch piston 73 to move axially to the right against the bias of a plurality of return springs 93 and engage alternately interleaved clutch plates which are alternately keyed to B brake clutch housing 232 and to splines cut on the outer surface of stationary outer race 293.

To drive this power transmitting path, B brake clutch housing 232 is coupled to or is an integral part of a clutch inner hub 32, and input shaft 147 is drivingly fitted with or is an integral part of B clutch housing 132, whose inner right axial end is bearingly abutted and sleeved to an axial left side extension of B brake clutch housing 232. B clutch housing 132 may be selectively coupled to clutch inner hub 32 by applying B clutch 112. With clutch piston 72 sealably disposed inside B clutch housing 132, fluid pressure applied through passage 12 in input shaft 147 or B clutch housing 132 pushes clutch piston 72 axially rightward against the bias of a plurality of return springs 92 to engage a plurality of alternately interleaved clutch plates which are keyed alternately to B clutch housing 132 and clutch inner hub The first power transmitting path driving second ring gear 174 is again fed using a drum 366 which has a pleated end 322 which drivingly engages with splines cut on the outer surface of second ring gear 174. The left axial end of drum 366 again terminates inside drum coupler dog 158, where axially facing teeth on drum 366 drivingly engage with complementary teeth formed inside the coupler dog. Drum coupler dog 158 also has outer radially facing teeth or ridges which mate with axial teeth or projections formed on A clutch housing 130, drivingly securing thereto. Drum coupler dog 158 is also secured by a "C-Clip" or other conventional retainer fitted onto A clutch housing 130. This prevents drum coupler dog 158 from moving axially rightward. A clutch housing 130 is again bearingly cradled by driven sprocket support 278 and contains a clutch piston 71 sealably disposed therein. Once again located between driven sprocket support 278 and the left axial end of A clutch housing 130 is A one-way clutch 40, whose inner race 290 is splined to the stationary driven sprocket support and whose outer race 291 is keyed to splines cut internally on the inner left axial side of A clutch housing 130. To drive this power transmitting path, A clutch 110 selectively couples A clutch housing 130 to clutch inner hub 31, which is drivingly coupled to or is an integral part of input shaft 147. To apply A clutch 110, fluid is driven through passages 10 and 11 in the inner portions of A clutch housing 130. This causes clutch piston 71 to move axially rightward against the bias of a plurality of return springs 91, forcing engagement of a set of alternately interleaved clutch plates that are alternately keyed to splines cut internally on the inner side of drum coupler dog 158 and to splines cut on clutch inner hub 31. This drives drum coupler dog 158, drum 366, and second ring gear 174 at the speed of input shaft 147. Braking of this power transmitting path is provided using A brake clutch band 120 which is wrapped circumferentially on the cylindrical outer surface of A clutch housing 130, to the axial left of drum coupler dog 158. Selective actuation of this brake band assembly is achieved by means of a conventional piston-driven servo assembly and apply pin, not shown, whose construction and operation is well known to those skilled in the art.

Reaction stator 128 bearingly supports B clutch housing 132, B brake clutch housing 232, and C forward-/reversing clutch housing 252, and is splined to C reaction clutch housing 254. It also sealably feeds pressurized fluid to passages for applying all clutches, with the exception of passages 10 and 11, which are fed by the driven sprocket support 278.

TABLE 4

| Speed | Ratio State | CLUTCHES/BANDS | | | | | | | | OWC | | | Inverse Overall Ratio out/in | Overall Ratio in/out | Effective Ratio for Transmissions Having 2.6 Final Reduc. |
|---|---|---|---|---|---|---|---|---|---|---|---|---|---|---|---|
| | | A 110 | B 112 | C 114 | Cow 204 | REV 355 | Abr 120 | Bbr 122 | Cbr 124 | A/1 40 | B/2 42 | C/3 44 | | | |
| N | φ | | | | | | | | | | | | — | — | — |
| 1 | C | | | X | (X) | | | | | X | X | | .13 | 7.98 | 3.07 |
| 2 | B | | X | | X | | | | | X | | X | .20 | 4.94 | 1.90 |
| 3 | BC | | X | X | (X) | | | | | X | | | .33 | 3.05 | 1.17 |
| 4 | RA | X | | | | X | | | | | X | | .47 | 2.13 | .82 |
| 5 | A | X | | | X | | | | | | X | X | .67 | 1.49 | .57 |
| 6 | AC | X | | X | (X) | | | | | | X | | .80 | 1.25 | .48 |
| 7 | AB | X | X | | X | | | | | | | X | .87 | 1.14 | .44 |
| 8 | ABC | X | X | X | (X) | | | | | | | | 1.00 | 1.00 | .38 |
| L3 | BC | | X | X | (X) | | X | | | | | | .33 | 3.05 | 1.17 |
| L2 | B | | X | | X | | X | X | | | | | .20 | 4.94 | 1.90 |
| L1 | C | | | X | (X) | | X | | X | | | | .13 | 7.98 | 3.07 |

TABLE 4-continued

| | | CLUTCHES/BANDS | | | | | | | OWC | | | Inverse Overall | Overall | Effective Ratio for Transmissions |
|---|---|---|---|---|---|---|---|---|---|---|---|---|---|---|
| Speed | Ratio State | A 110 | B 112 | C 114 | Cow 204 | REV 355 | Abr 120 | Bbr 122 | Cbr 124 | A/1 40 | B/2 42 | C/3 44 | Ratio out/in | Ratio in/out | Having 2.6 Final Reduc. |
| R | R | | | | | X | X | X | | | | | −.20 | −4.94 | −1.90 |

The transmission output is similar to that shown in FIGS. 13 and 26, with second pinion carrier 212 integrated with the structure of differential carrier 375 which is part of a differential gearset 370. Inside differential gearset 370 are two differential pinions 372 and 378 which are rotatably supported by a differential shaft 395 which is fixed inside the differential carrier 375. Pinions 372 and 378 drivingly mesh with differential side gears 374 and 376. Differential side gear 374 is splined to the left output shaft 409 which passes coaxially leftward through the geartrain, being radially adjacent to sleeve shaft 221 and inner shaft 141. The other differential side gear 376 is splined to right output shaft 411 which passes coaxially rightward through differential gearset 370. Both output shafts 409 and 411 pass outboard of transmission case 100 and may be drivingly connected through universal joints to the driving wheels of a vehicle, not shown.

Referring to FIGS. 41, 43, and 47, and also to Table 4, a clutching and ratio table for the transmission of FIG. 47, and describing the operation of this gearing arrangement will show how a total of nine out of eleven possible ratio states may be obtained by selective or active actuation of the above-described clutch or apply devices. The number of teeth chosen for each gearing element is kept the same as given for the transmission of FIG. 26, to simplify the discussion and provide ratio patterns similar to those given in Tables 1 and 3.

In neutral, with input sprocket 198 driven by the prime mover, input shafts 141 and 147 are driven forward, and input shaft 142 is driven in reverse. The prime mover may also drive a hydraulic pump, not shown, for lubrication and clutch control. As shown in Table 4, with the Ratio State "empty set," all selectively operable clutches are released. Since the C one-way direct clutch 204 is released, first sun gear 162 may spin freely. Through the single linkage that couples first pinion carrier 210 to second sun gear 164, second pinion carrier 212 is also unrestrained, along with differential gearset 370 and the left and right output shafts 409 and 411. Optionally, C one-way direct clutch 204 may be applied without driving the transmission output.

From neutral, the first forward C ratio state is obtained by gradual application of C clutch 114. C clutch 114 couples inner shaft 141 to first sun gear 162. Under an output load, first ring gear 172 and second ring gear 174 are urged to rotate backward, but are restrained by active engagement of B one-way clutch 42 and A one-way clutch 40, respectively. To simplify clutch control, C one-way direct clutch 204 may also be applied, but does not participate in power transmission, as indicated by having the "X" clutch apply/active in parentheses.

From first, a second B ratio state is obtained through a single transition shift by release of C clutch 114 and application of B clutch 112. First ring gear 172 is now driven by input shaft 147, while backward motion of second ring gear 174 and first sun gear 162 is prevented by active engagement of one-way clutches 40 and 44, respectively. C one-way direct clutch 204 remains applied and is now necessary for power transmission.

The third BC ratio state is attained by gradual application of C clutch 114, so that both the "B" and "C" power transmitting paths contribute to the output motion. This drives first pinion carrier 210 and second sun gear 164 at transmission input speed, and second ring gear 174 is again restrained from backward rotation by active engagement of A one-way clutch 40. C one-way direct clutch 204 may remain applied but simply overruns as in the first ratio state. During the 3-4 shift, it must be released.

Shifting to the fourth or RA ratio state occurs by way of a double transition shift whereby B clutch 112 and C clutch 114 are released and reversing clutch 355 and A clutch 110 are applied. Application of A clutch 110 drives the second ring gear 174 forward, again giving a contribution of $0.67\omega_{in}$ to the transmission output, while the "R" or reversing power transmitting path enabled by actuation of reversing clutch 355 gives an output contribution of $-0.20\omega_{in}$. The "R" and "A" contributions add combinationally to a net output speed of $0.47\omega_{in}$ and again some power recirculates, with second ring gear 174 driving second sun gear 164 backward, so that once again the engine drives A clutch 110 with a torque $T_{110} = 1.43\ T_{engine}$, and while the reversing clutch 355 drives the engine via input transmitter first sun gear 82 with a torque $T_{355} = -0.43\ T_{engine}$. Also, when second sun gear 164 is being driven backward by the action of A clutch 110 driving second ring gear 174 with an output load, first ring gear 172 will be urged backward as well, but will be prevented from doing so by active engagement of B one-way clutch 42.

From fourth, a fifth or A ratio state is achieved through a single transition shift by simultaneous release of reversing clutch 355 and application of C one-way direct clutch 204. Under an output load with second ring gear 174 driven forward, first sun gear 162 and first ring gear 172 will be urged backward but will be restrained by active engagement of C one-way clutch 44 and B one-way clutch 42, respectively.

From fifth, a sixth or AC ratio state occurs through additional application of C clutch 114. C one-way direct clutch 204 may remain applied but does not participate in power transmission. Reverse rotation of first ring gear 172 is still prevented by action of B one-way clutch 42.

Shifting to a seventh AB ratio state occurs through a single transition shift where C clutch 114 is released simultaneously with application of B clutch 112. Reverse rotation of first sun gear 162 is prevented by action of C one-way clutch 44. C one-way direct clutch 204 remains applied and is now needed for power transmission.

From seventh, the eighth or top forward ratio state is achieved when C clutch 114 engages, so that all forward power transmitting paths "A," "B," and "C" contribute to output motion. The transmission again acts as a direct coupling, providing a deep effective overdrive as discussed for Table 1. C one-way direct clutch 204 again may remain applied but does not participate in power transmission. During coasting conditions, no engine braking occurs for speeds 1, 2, 3, 4, 5, 6, and 7 because at least one of the one-way clutches 40, 42, and 44 will overrun, allowing freewheeling of a principal gearing element and decoupling the prime mover from the output load. Engine braking during these ratio states may be obtained by actuation of one or more of brake clutches 120, 122, and 124, as needed. The "manual third" or "L3" engine braking BC ratio state is thus obtained through BC ratio clutching with A brake clutch 120 additionally applied to prevent overrunning of the A one-way clutch outer race 291 and A clutch housing 130 during coasting. The "manual second" or "L2" engine braking B ratio state is achieved through B ratio clutching plus additional application of both A brake clutch 120 and C brake clutch 124, and the "manual first" or "L1" C ratio state is attained with C ratio state clutching plus application of both A brake clutch 120 and B brake clutch 122.

The reverse or R ratio state is available by applying reversing clutch 355 along with A brake clutch 120 and B brake clutch 122. Applying reversing clutch 355 drives first sun gear 162 in reverse, which under an output load will urge first ring gear 172 and second ring gear 174 to rotate forward. Ring gears 172 and 174 are held stationary, however, by braking clutches 122 and 120, respectively.

Using the set of speed ratios given in Table 4, the RB ratio state, which is one of the two ratio states not utilized, gives an identically zero output contribution. Engagement of reversing clutch 355 gives an output contribution of $-0.20\omega_{in}$, while engagement of B clutch 112 gives $0.20\omega_{in}$, adding to a net output gearset has the same number of teeth on each gearing element as first planetary gearset P1. In first planetary gearset P1 during this RB state, the first sun gear 162 running in reverse at high speed exactly compensates for the forward motion of first ring gear 172, resulting in zero speed of the first pinion carrier 210. This also means that the other ratio state not utilized, the ARB ratio state, gives an output contribution identical to the A ratio state, that is, $0.67\omega_{in}$. Thus, an alternate way of achieving the same speed ratio as the A ratio state is to obtain the ARB state by actuating clutches 110, 355, and 112. This may be utilized to good effect in a clutch control algorithm.

Generally, however, when the input transmitter gearset and the first planetary gearset P1 have different numbers of teeth on each gearing element, the RB ratio state yields a non-zero output contribution, and can provide a low forward or low reverse gear. This small positive or negative output contribution can be added to the A ratio state to obtain the ARB ratio state, obtaining another forward speed, and bringing the total possible number of useful forward and reverse ratio states to eleven.

One clutch apply/release sequence which may be helpful for the 3-4 shift using a transmission clutch feedback/control system is to start applying A clutch 110 with B clutch 112, C clutch 114 and C one-way direct clutch 204 still applied. This will cause the engine speed to ramp down toward a speed synchronous with the ABC or $8^{th}$ speed ratio. As A clutch 110 engages and engine speed synchronous for the RA ratio state is approached or attained, release of B clutch 112 and C clutch 114 may commence or be fully underway. This leaves the engine speed still declining, now approaching a speed synchronous with a fifth or A ratio state. Then, when engagement of A clutch 110 is nearly complete, C one-way direct clutch 204 may be released and reversing clutch 355 applied, bringing the system back down toward the fourth or RA ratio state. This latter step is a smooth transition since upon the release of C one-way direct clutch 204, the C forward/reversing clutch housing 252 will be urged to rotate backward anyway, so applying reversing clutch 355 will be easier to execute. This sequence, taking place over a fraction of a second, is better than the simple double transition shift given above because it guards against having the transmission go to or approach a reverse R ratio state momentarily by premature engagement of reversing clutch 355 and/or delayed engagement of A clutch 110. It also creates an engine speed profile that minimizes torsional shock. The speed of A clutch housing 130 and/or second pinion carrier 212 and/or C forward/reversing clutch housing 252 may be monitored and this information used by the transmission control system to achieve high quality shifts. In a 4-3 downshift, a reverse sequence may take place whereby reversing clutch 355 is released and C one-way direct clutch 204 is applied, having the transmission approach an A or fifth ratio state with a momentary dip in engine speed. This again guards against unintended shifting into reverse. Then additionally the B clutch 112 and C clutch 114 may be applied, with another drop in engine speed in the direction of the ABC or $8^{th}$ synchronous speed ratio. When application of B clutch 112 and C clutch 114 is nearly complete, A clutch 110 may be released, bringing the engine speed back toward a speed synchronous with the third or BC ratio state.

For the ratios listed in Table 4, the 3-4 shift changes the effective transmission ratio from 1.17 to 0.81, a mild transition which results in only a 31% reduction in engine speed. In selecting this ratio set, a compromise has been struck where speed ratio increments for the 3-4 shift and the 4-5 shift are about equal. The top four speed states 5, 6, 7 and 8 are closely-spaced effective overdrive ratio states. Shifting between these top ratio states only requires single transition shifts. The extremely small speed ratio increments allow frequent and fast ratio shifts without creating adverse sensations for the customer, and generate a minimum of energy dissipated at clutch lining surfaces. An extremely varied set of drive ratios is attainable, however, by simply varying the number of teeth on each gearing element in the input transmitter and in the two planetary gearsets P1 and P2. This arises from the combinational nature of the ratio states. If, for example, a much smaller increment between the third and fourth ratio states is desired so as to make the double transition shift easier to execute, a different ratio pattern can be selected by changing the number of teeth on each gearing element. Using the following number of teeth on each gearing element: {input transmitter ring gears 182 and 184: 92; input transmitter sun gear 82: 60; input transmitter pinions 288: 16; first sun gear 162: 50; first ring gear 172: 82; first pinion carrier 210 pinions: 16; second sun gear 164: 42; second ring gear 174: 78; second pinion carrier 212 pinions: 18}, the following effective drive ratios are obtained for speed ratios 1 through 8, and reverse, respectively: {2.90, 1.77, 1.10, 0.86, 0.59, 0.49, 0.44, 0.38, −1.89}. In this ratio set, the 3-4 shift changes the effective drive ratio from 1.10 to 0.86 a much smaller increment which results in only a 21% reduction in engine speed. Alternatively, the input transmitter can have dual radii split pinions that allow the input transmitter first ring gear 182 and second ring gear 184 to be sized differently, driving input shafts 141 and 147 at different angular speeds. This can change the ratio pattern advantageously, including further minimizing the 3-4 ratio increment without disrupting the ratio pattern as a whole. See FIG. 67.

Overall, the close spacing of the effective drive ratios obtained from using this and other CIVT's yields many advantages as cited above. The heat energy generated by the clutch devices during power shifts, for example, is sensitive to the size of the ratio increment involved. During a typical power shift, the clutch heat $Q_v$ generated is proportional to the square of one minus the increment:

$$Q_v \propto (1 - R_{n+1}/R_n)^{\wedge}2 \qquad \text{(Eqn. 6)}$$

where $R_{n+1}$=upper ratio, and $R_n$=lower ratio. [ref: "Tribological Problems in Automatic Transmissions," H. J. Förster, from Oil Immersed Brakes and Clutches, IMechE Automotive Division, London, Mar. 15, 1977, pp. 43–49]. During the friction of power shifts, this heat can cause local temperature peaks which can lead to oxidation of the transmission oil and premature destruction or glazing of clutch lining materials. Evaluating (Eqn. 6) for each ratio increment in the ratio patterns given above and in Table 4 will show that the CIVT ratios given compare favorably with the ratio increments of transmissions presently in use, e.g., the General Motors four speed Hydra-Matictm 4T60E (440T4) front wheel drive transaxle transmission, where ratios 1-4 and reverse are: 2.92, 1.57, 1.00, 0.71, and −2.39, respectively; and also the General Motors four speed Hydra-Matic TM 4L60 (700 R4) rear wheel drive transmission, where the ratios are: 3.06, 1.63, 1.00, 0.70, and −2.29. The 1-2 shift heat generation for the transmission of FIG. 47, for example, is about ⅔ that of these two widely-used Hydra-Matic TM transmissions. In addition to enhancing customer satisfaction and simplifying clutch control, the closely-spaced ratios reduce the importance of friction modifiers in the transmission fluid that prevent "stick-slip" vibrations and other undesirable phenomena during clutch engagement and lockup. This allows that a reformulation of the transmission fluid may better address other useful fluid properties, such as oxidation resistance and low viscosity.

Figure 44:
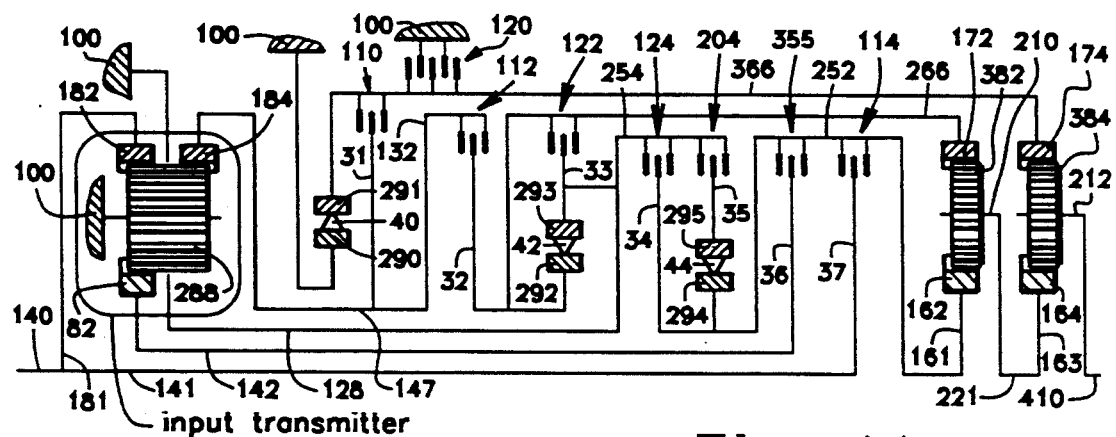
FIG. 44 is the embodiment of FIG. 43 having no drive link and suitable for rear wheel drive application.

FIG. 44 shows an embodiment almost identical to that of FIG. 43, except that now the prime mover drives the input transmitter first ring gear 182, instead of driving second ring gear 184 using an input sprocket and drive link. The input drive is by means of main input shaft 140, making the transmission particularly suitable for automotive rear wheel drive applications.

Figure 48:
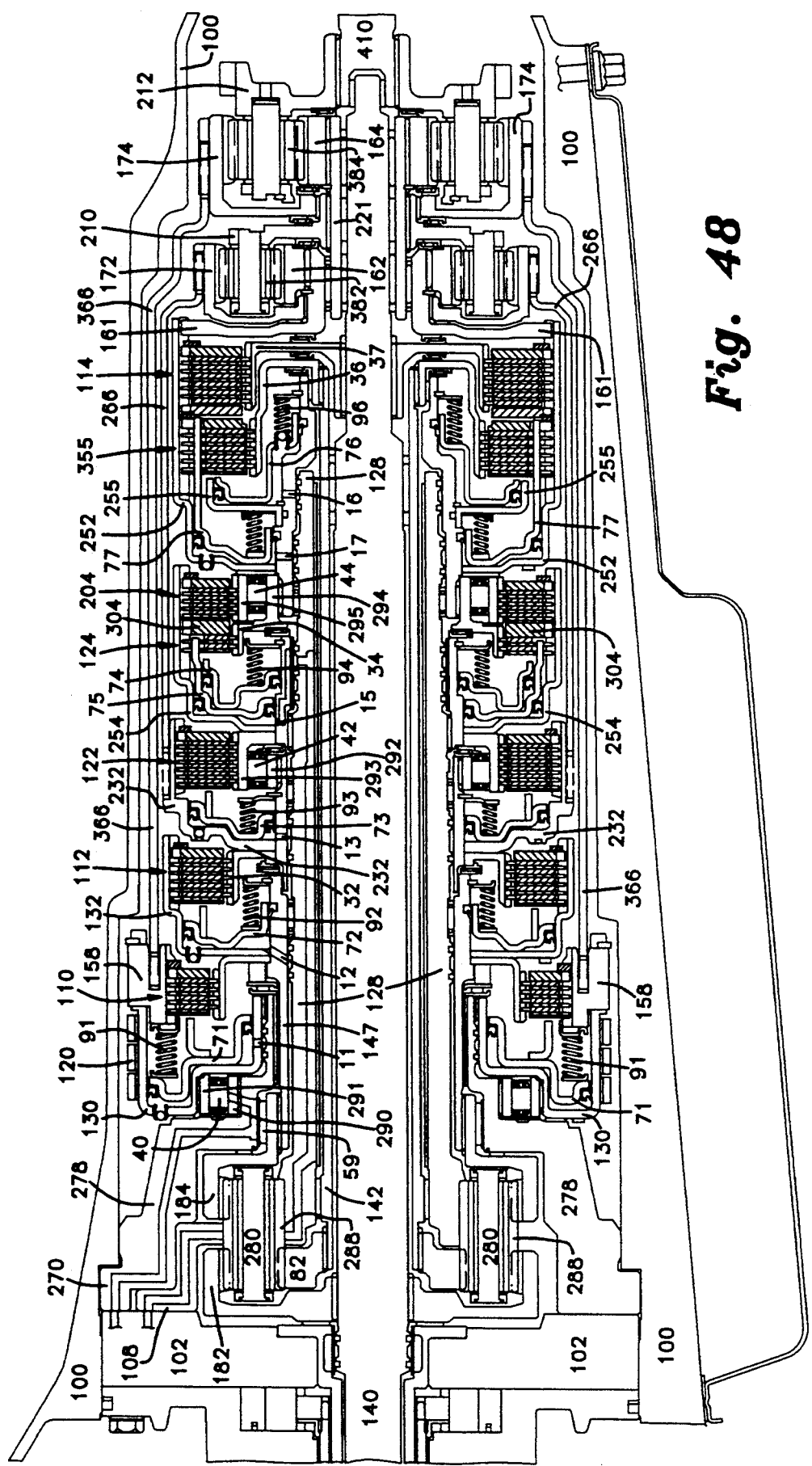
FIG. 48 shows a detailed generally cross-sectional view of a rear wheel drive transmission suggested by the embodiment shown in FIGS. 41 and 44, utilizing eight forward speeds and one reverse.

FIG. 48 shows a detailed generally cross-sectional view of a rear wheel drive transmission, suggested by the embodiment shown in FIGS. 41 and 44. It is similar to the front wheel drive transaxle transmission shown in FIG. 47. Main input shaft 140 is splined to input transmitter first ring gear 182 and clutch inner hub 37. Main input shaft 140 also extends further to the axial right, passing coaxially through sleeve shaft 221 and its associated split sleeve bearing to act as a journal for output shaft 410, which is splined directly to second pinion carrier 212. No differential gear assembly is used to obtain left and right outputs. In lieu of case end plate 101 given in FIG. 47, reaction stator grounding foot 108 and driven sprocket support foot 270 are now bolted to pump assembly 102, which contains a hydraulic pump driven by the engine for use by a lubrication and clutch control system, not shown. Also not shown is a conventional four-element hydrodynamic torque converter which is splined to the main input shaft 140 inside a bell housing to the axial left of the view shown. All other clutch devices, gearing elements, drums, shafts and other components function as previously described, using the same reference characters given in the above discussion for FIG. 47. The ratio and clutching patterns are given in Table 4. It is useful to note that this transmission can be used with an unconventional rear axle. Because final reduction gearing is not necessary, a rear axle reduction ratio of 1:1, or perhaps 1.25:1 may be used. For a 1.25:1 rear axle reduction ratio, the above-mentioned set of effective drive ratios, {2.91, 1.77, 1.10, 0.86, 0.59, 0.49, 0.44, 0.38, −1.89}, becomes: {3.63, 2.21, 1.37, 1.08, 0.74, 0.61, 0.55, 0.48, −2.37}. Using such a low final reduction ratio allows a smaller rear axle housing since the large ring or internal gear usually used may be reduced in size. The smaller housing reduces manufacturing cost and unit weight for the axle, and increases ground clearance. Compared to conventional drivetrains, the driveshaft linking the transmission to the rear axle would have to handle about two to three times the torque T and would rotate at speed ω equal to or nearly equal to the vehicle wheel speed, two or three times slower than usual:

$$T \sim 3T_{conventional} \text{ and } \omega - \tfrac{1}{3} \omega_{conventional}.$$

The slower rotational speed of the driveshaft may make it easier to dampen driveline vibration. If a conventional rear axle is desired, however, another gearing configuration may be selected that will provide drive ratios that still require and benefit from final reduction gearing.

Figure 45:
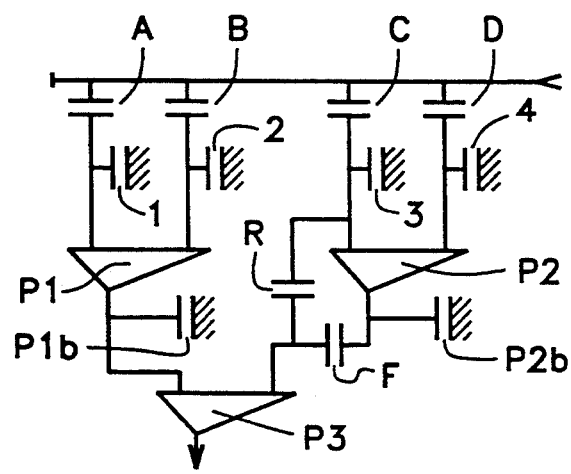
FIG. 45 is a symbolic diagram for a transmission using a combinational geartrain tree consisting of three singly coupled simple planetary gearsets in a symmetric or bifurcated configuration, using sacrificial reversing and having modulated power transmission paths fed by clutches A, B, C, and D, to achieve a total of nineteen ratio states.
Figure 46:
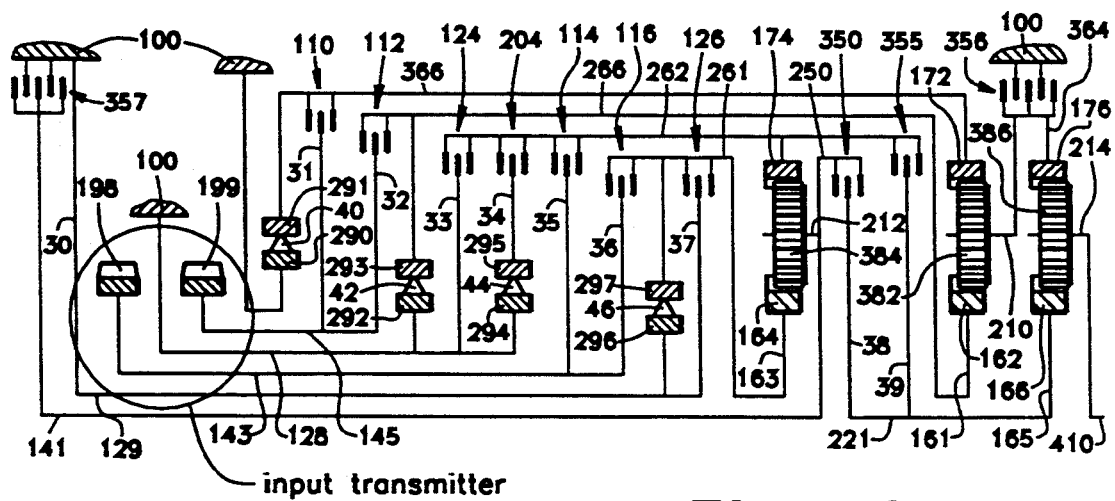
FIG. 46 shows a schematic representation corresponding to FIG. 45, using the input transmitter of FIGS. 10 and 11.

Description of FIGS. 45 and 46

The gearing arrangements made possible by this invention include transmissions having three or more component gearsets, not including the input transmitter structure. This greatly increases the number of available combinational ratio states with a minimum of additional gearing and clutching devices. FIG. 45 is a symbolic diagram for such a transmission using three singly coupled simple planetary gearsets P1, P2, and P3, in a symmetric or bifurcated configuration, where the planetary carrier of first planetary gearset P1 is coupled to the ring gear of third planetary gearset P3, and the planetary carrier of second planetary gearset P2 is coupled to the sun gear of third planetary gearset P3. This arrangement may be derived from that given in FIG. 8 by simply substituting another gearset (renamed "P1") for the "A" power transmitting path, as can be seen by inspection; the arrangement of FIGS. 8 and 9 can be thought of as a "core" structure for the arrangement given here. An additional carrier brake P1b is added to allow for engine braking and reversing states discussed below. The result is to have four modulated forward power transmission paths fed by clutches A, B, C, and D as shown, driving the ring and sun gears of first planetary gearset P1, and the ring and sun gears of second planetary gearset P2, respectively. The number of possible forward ratio states Z is then $$Z = 2^4 - 1$$

or fifteen: (A, B, C, D, AB, BC, CD, DA, AC, BD, ABC, BCD, CDA, DAB, ABED). Using sacrificial reversing as described for FIG. 8, an additional four ratio states are available: (R, RA, RB, RAB), bringing the total available to nineteen.

FIG. 46 shows one possible schematic representation suggested by FIG. 45, using the simple input transmitter shown in FIGS. 10 and 11. Referring to FIGS. 45 and 46, input sprockets 198 and 199 are drivingly connected to input shafts 143 and 145, respectively. Radially between input shafts 143 and 145 is a first reaction stator 128 which is coupled to case 100. Coaxially inside input shaft 143 is second reaction stator 129 which is also grounded in case 100. An innermost shaft 141 is selectively coupled via clutch inner hub 30 to case 100 by actuation of carrier brake 357. At the axial right end of the gearing arrangement is the third planetary gearset P3 of FIG. 45, which comprises a plurality of third planetary pinions 386 which are rotatably mounted on a third pinion carrier 214 and which drivingly mesh with both third sun gear 166 and third ring gear 176. Output shaft 410 is coupled to the third pinion carrier 214, while third ring gear 176 is coupled to drum 364 which in turn is coupled to or is an integral part of first pinion carrier 210. Drum 364 may be braked by carrier brake 356, which performs the function of P1b of FIG. 45. First planetary gearset P1 is located axially between planetary gearsets P2 and P3 and comprises a plurality of first planetary pinions 382 which are rotatably supported by the first pinion carrier 210 and which drivingly mesh with first sun gear 162 and first ring gear 172. First sun gear 162 is coupled via first sun gear hub 161 to drum 266, while first ring gear 272 is coupled to drum 366. Second planetary gearset P2 comprises a second pinion carrier 212 which retains a plurality of second planetary pinions 384 which drivingly mesh with both second sun gear 164 and second ring gear 174. Third sun gear 166 is coupled through its third sun gear hub 165 to sleeve shaft 221. To couple second planetary gearset P2 to the third planetary gearset P3, sleeve shaft 221 is splined to both clutch inner hub 38 and clutch inner hub 39. Upon actuation of forward (F) clutch 350, sleeve shaft 221 is coupled to forward clutch housing 250 which is coupled to or is an integral part of second pinion carrier 212. Selective actuation of reversing (R) clutch 355 couples sleeve shaft 221 to drum 262, which is coupled to second ring gear 174. To perform the function of clutch P2b of FIG. 45, second pinion carrier 212 is also coupled to inner shaft 141, allowing carrier brake 357 to arrest movement of the second pinion carrier.

The fourth or "D" power transmitting path driving second sun gear 164 is fed by means of drum 261, which is coupled to second sun gear 164 via second sun gear hub 163. To hold this path stationary, second reaction stator 129 terminates in or is coupled to clutch inner hub 37, which may be selectively coupled to drum 261 by actuation of D brake clutch 126. Reactive force needed to restrain second sun gear 164 from backward motion may be supplied by D one-way clutch 46, whose outer race 297 is coupled to the drum 261 and whose inner race 296 is coupled to the second reaction stator 129. To drive this power transmitting path forward, selective actuation of D clutch 116 couples drum 261 to clutch inner hub 36, which is coupled to input shaft 143. Drum 261 is fitted with or is integral with clutch housing(s) for clutches 116 and 126.

The third forward power transmitting path driving second ring gear 174 is fed by means of drum 262, and may be driven forward by selective actuation of C clutch 114, which couples drum 262 to clutch inner hub 35, which is splined or coupled to input shaft 143. Reaction force to prevent backward motion of second ring gear 174 is provided by C one-way clutch 44, whose inner race 294 is coupled to first reaction stator 128, and whose outer race 295 is coupled to or is integral with clutch inner hub 34. This allows that C one-way direct clutch 204 may selectively couple the output of C one-way clutch 44 to drum 262. Braking of this power transmitting path is by means of C brake clutch 124, which selectively couples drum 262 to clutch inner hub 33, which is coupled to first reaction stator 128. Drum 262 is fitted with or is integral with clutch housing(s) for clutches 114, 204, and 124.

The second power transmitting path driving first sun gear 162 is fed by means of drum 266. Reactive force to ensure only forward motion for this path are supplied by B one-way clutch 42, whose inner race 292 is coupled to first reaction stator 128 and whose outer race 293 is coupled to the drum 266. To drive this path, B clutch 112 may be selectively actuated, coupling drum 266 to clutch inner hub 32, which is coupled to and driven by input shaft 145. Drum 266 is again fitted with a clutch housing for B clutch 112.

TABLE 5

| Speed and Ratio State | CLUTCHES/BANDS | | | | | | | | | | | OWC | | | | Inverse Overall Ratio out/in | Overall Ratio in/out | Effective Ratio for Transmissions Having 2.6 Final Reduc. |
|---|---|---|---|---|---|---|---|---|---|---|---|---|---|---|---|---|---|---|
| | A 110 | B 112 | C 114 | D 116 | Cow 204 | FOR 350 | REV 355 | P2b 357 | Cbr 124 | Dbr 126 | P1b 356 | A/1 40 | B/2 42 | C/3 44 | C/4 46 | | | |
| N φ | | | | | | | | | | | | | | | | — | — | — |
| 1 RB | | E | | E | | E | E | | | | | E | | | | .079 | 12.66 | 4.87 |
| 2 D | | | | X | X | X | | | | | | X | X | X | | .12 | 8.51 | 3.27 |
| 3 C | | | X | | (X) | X | | | | | | X | X | | X | .20 | 5.02 | 1.93 |
| 4 RA | E | | | E | | | E | E | | | | | E | | | .23 | 4.33 | 1.67 |
| 5 B | | X | | | X | X | | | | | | X | | X | X | .27 | 3.76 | 1.45 |
| 6 CD | | | E | E | (E) | E | | | | | | E | E | | | .32 | 3.16 | 1.21 |
| 7 BD | | X | | X | X | X | | | | | | X | | X | | .38 | 2.61 | 1.00 |
| 8 A | E | | | | E | E | | | | | | | E | E | E | .42 | 2.39 | .92 |
| 9 BC | | X | X | | (X) | X | | | | | | X | | | X | .46 | 2.15 | .83 |
| 10 RAB | E | E | | E | | E | E | | | | | | | | | .50 | 2.01 | .77 |
| 11 DA | E | | | E | E | E | | | | | | | E | E | | .54 | 1.87 | .72 |
| 12 BCD | | X | X | X | (X) | X | | | | | | X | | | | .58 | 1.72 | .66 |
| 13 AC | E | | E | | (E) | E | | | | | | | E | | E | .62 | 1.62 | .62 |
| 14 AB | E | E | | | E | E | | | | | | | | E | E | .68 | 1.46 | .56 |
| 15 CDA | X | | X | X | (X) | X | | | | | | X | | | | .73 | 1.36 | .52 |

TABLE 5-continued

| Speed and Ratio State | | CLUTCHES/BANDS | | | | | | | | | | OWC | | | | Inverse Overall Ratio out/in | Overall Ratio in/out | Effective Ratio for Transmissions Having 2.6 Final Reduc. |
|---|---|---|---|---|---|---|---|---|---|---|---|---|---|---|---|---|---|---|
| | A 110 | B 112 | C 114 | D 116 | Cow 204 | FOR 350 | REV 355 | P2b 357 | Cbr 124 | Dbr 126 | P1b 356 | A/1 40 | B/2 42 | C/3 44 | C/4 46 | | | |
| 16 DAB | X | X | | X | X | X | | | | | | | | | X | .80 | 1.25 | .48 |
| 17 ABC | X | X | X | | (X) | X | | | | | | | | | X | .88 | 1.13 | .44 |
| 18 ABCD | X | X | X | X | (X) | X | | | | | | | | | | 1.00 | 1.00 | .38 |
| L3 C̄D̄ | | | X | X | (X) | X | | | | | X | | | | | .32 | 3.16 | 1.21 |
| L2 C̄ | | | X | | (X) | X | | | | X | X | | | | | .20 | 5.02 | 1.93 |
| L1 D̄ | | | | X | (X) | X | | | X | | X | | | | | .12 | 8.51 | 3.27 |
| R R̄ | | | | | | X | X | X | | | X | | | | | −.19 | −5.35 | −2.06 |

The first power transmitting path driving first ring gear 172 is fed by means of drum 366. To drive this path forward, selective actuation of A clutch 110 couples drum 366 to clutch inner hub 31, which is driven by input shaft 145. Reactive force to prevent backward motion are supplied by A one-way clutch 40, whose inner race 290 is coupled to case 100 and whose outer race 291 is coupled to the drum 366.

The equation of forward motion for this transmission is $$\omega_{out} = b_1 b_3 \omega_A + a_1 b_3 \omega_B + b_2 a_3 \omega_C + a_2 a_3 \omega_D \quad \text{(Eqn. 7)}$$

where the subscripts 1, 2 and 3 refer to planetary gearsets P1, P2 and P3, respectively. Reverse motion obtained by actuating reversing clutch 355 and carrier brake 357, with D clutch 116 applied and C clutch 114 released, makes a contribution to $\omega_{out}$ of $-(a_2 a_3/b_2)\omega_D$. Using the following number of teeth for each of the principal gearing elements: {first sun gear 162: 567 first ring gear 172: 88; first pinion carrier 210 pinions: 16; second sun gear 164: 46; second ring gear 174: 78; second pinion carrier 212 pinions: 16; third sun gear 166: 38; third ring gear 176: 82; third pinion carrier 214 pinions: 22}, the equation of forward motion becomes:

$$\omega_{out} = 0.418\omega_A + 0.266\omega_B + 0.199\omega_C + 0.117\omega_D \quad \text{(Eqn. 8)}$$

The reverse motion contribution to $\omega_{out}$ becomes $-0.187\omega_D$. Referring to FIGS. 45 and 46, and also to Table 5, a ratio and clutching table for the transmission of FIG. 46, will show how the above ratio states are obtained. No final reduction gearing is needed for automotive applications.

In neutral, input shafts 143 and 145 are driven by the prime mover, and all clutches are released. Since forward clutch 350 and reversing clutch 355 are not applied, third sun gear 166 is unrestrained, and the output shaft 410 may spin freely.

From neutral, the forward drive ratio states listed in Table 5 may be separated into two categories: standard states and elective states. Standard ratio states (speeds 2, 3, 5, 7, 9, 12, 15, 16, 17, and 18) are indicated using the "X" clutch apply/active symbols. When using a shift strategy that uses only the standard ratio states, no multiple transition shifts are encountered between successive speeds. Elective ratio states, (speeds 1, 4, 6, 8, 10, 11, 13, and 14) are indicated using "E" clutch apply/active symbols and involve multiple transition shifts when shifting consecutively through the speeds 1–18. As will be seen, however, some elective ratio states may be selected using single transition shifts when conditions permit, e.g., if a shift from speed 7 is targeted for speed 11.

The first elective RB ratio state is achieved by application of B clutch 112, D clutch 116, reversing clutch 355 and carrier brake 357. With carrier brake 357 applied, actuation of D clutch 116 produces reduced speed reverse motion at second ring gear 174, which is coupled via reversing clutch 355 to third sun gear 166. At the same time, actuation of B clutch 112 causes third ring gear 176 to rotate at reduced forward speed. Some power recirculates, with third ring gear 176 driving third sun gear 166 backward. With a load on output shaft 410, first ring gear 172 will be urged backward, but restrained by active engagement of A one-way clutch 40. As before, the overall speed ratio $\omega_{in}/\omega_{out}$ is listed, along with the inverse overall ratio and the effective ratio for transmissions having added 2.6:1 final reduction gearing.

The second standard D ratio state is obtained by applying D clutch 116, along with C one-way direct clutch 204 and forward clutch 350. D clutch 116 couples input shaft 143 to second sun gear 164 while forward clutch 350 couples the resultant reduced speed output of second pinion carrier 212 to third sun gear 166, where third planetary gearset P3 effects another speed reduction at third pinion carrier 214. Under an output load, first ring gear 172, first sun gear 162 and second ring gear 174 are urged to rotate backward, but are restrained active engagement of A one-way clutch 40, B one-way clutch 42, and C one-way clutch 44, respectively, with the coupling of C one-way clutch 44 to drum 262 made possible by application of C one-way direct clutch 204.

The third standard C ratio state is realized by simultaneous release of D clutch 116 and application of C clutch 114. Forward clutch 350 still conveys the moderately reduced speed of second pinion carrier 212 to third sun gear 166. C one-way direct clutch 204 may remain applied, but with C one-way clutch 44 overrunning, it does not participate in power transmission. This will be indicated again by using parentheses around the "X" or "E" clutch active/apply symbols. Backward motion of first ring gear 172, first sun gear 162, and second sun gear 164 is prevented by active engagement of one-way clutches 40, 42, and 46, respectively.

The fourth elective RA ratio state is accessed by applying A clutch 110, and D clutch 116 along with reversing clutch 355 and carrier brake 357. Reduced speed reverse motion again results at third sun gear 166, with actuation of A clutch 110 causing third ring gear 176 to rotate at moderately reduced forward speed. Power recirculates, with third ring gear 176 driving third sun gear 166 backward. With a load on output shaft 410, first sun gear 162 will be urged backward, but held stationary by active engagement of B one-way clutch 42.

The fifth standard B ratio state results when B clutch 112 is applied along with forward clutch 350 and C one-way direct clutch 204. With first sun gear 162 driven at the speed of input shaft 145, first pinion carrier 210 and third ring gear 176 are driven at moderate reduced speed, with another moderate speed reduction at third planetary gearset P3. First ring gear 172 and second sun gear 164 will be urged to rotate backward, but held by one-way clutches 40 and 46, respectively. Second ring gear 174 will also be urged to rotate backward, but restrained by C one-way clutch 44, whose outer race 295 is coupled to drum 262 by application of C one-way direct clutch 204.

The sixth elective CD ratio state is attained with application of C clutch 114, D clutch 116, and forward clutch 350. With both clutches 114 and 116 applied, second pinion carrier 212 rotates at the speed of input shaft 143, and is coupled by forward clutch 350 to third sun gear 166 for a single speed reduction at third planetary gearset P3. C one-way direct clutch 204 may remain applied, but C one-way clutch 44 simply overruns and does not participate in power transmission. Backward rotation of first ring gear 172 and first sun gear 162 is prevented by active engagement of A one-way clutch 40 and B one-way clutch 42, respectively.

The seventh standard BD ratio state is achieved by application of B clutch 112, D clutch 116, C one-way direct clutch 204 and forward clutch 350. Applying B clutch 112 drives first pinion carrier 210 and third ring gear 176 at reduced speed, while applying D clutch 116 drives second pinion carrier 212 and third sun gear 166 at reduced speed with coupling provided by action of forward clutch 350. First ring gear 172 is urged backward but restrained by A one-way clutch 40, and second ring gear 174 is similarly restrained by C one-way clutch 44 with C one-way direct clutch 204 applied.

The eighth elective A ratio state is obtained by application of A clutch 110, C one-way direct clutch 204, and forward clutch 350. Here A clutch 110 causes first ring gear 172 to be driven at the speed of input shaft 145, which causes first pinion carrier 210 and third ring gear 176 to be driven at moderate reduced speed. Backward rotation of first sun gear 162 and second sun gear 164 is prevented by action of B one-way clutch 42 and D one-way clutch 46, respectively, while backward motion of second ring gear 174 is stopped by C one-way clutch 44 with C one-way direct clutch 204 applied.

The ninth standard BC ratio state results when B clutch 112, C clutch 114 and forward clutch 350 are applied. Power flows from the "B" and "C" power transmitting paths combine, with forward clutch 350 providing for coupling of second pinion carrier 212 to third sun gear 166. Backward motion of first ring gear 172 and second sun gear 164 is prevented by active engagement of one-way clutches 40 and 46, respectively. C one-way direct clutch 204 may remain applied, but C one-way clutch 44 again overruns.

The tenth elective RAB ratio state is achieved in a manner similar to that of the fourth RA state, with B clutch 112 additionally applied. With A clutch 110 and B clutch 112 applied, first pinion carrier 210 and third ring gear 176 are driven at the speed of input shaft 145. Power again recirculates, with third ring gear 176 driving third sun gear 166 backward.

The eleventh elective DA ratio state results when A clutch 110, D clutch 116, C one-way direct clutch 204 and forward clutch 350 are applied. Application of A clutch 110 drives first ring gear 172 at the speed of input shaft 145, while application of D clutch 116 drives second sun gear 164 at the speed of input shaft 143, with forward clutch 350 coupling the reduced speed output of second pinion carrier 212 to third sun gear 166. First sun gear 162 and second ring gear 174 are restrained from backward motion by action of one-way clutches 42 and 44, respectively, with C one-way direct clutch 204 applied.

The twelfth standard BCD ratio state is achieved in a manner similar to that of the standard BC ratio state of speed 9, but with D clutch 116 additionally applied. With D clutch 116 driving second sun gear 164 at the speed of input shaft 143, D one-way clutch 46 overruns and is not active.

The thirteenth elective AC ratio state is achieved in a manner similar to that of the elective A ratio state of speed 8, but with C clutch 114 additionally applied, which causes C one-way clutch 44 to overrun. Again, C one-way direct clutch 204 may remain applied if desired.

The fourteenth elective AB ratio state is also achieved in a manner similar to that of the elective A ratio state of speed 8, but with B clutch 112 additionally applied instead. Now with B clutch 112 applied, B one-way clutch 42 overruns. C one-way direct clutch 204 remains applied and necessary for power transmission.

The fifteenth standard CDA ratio state results when A clutch 110, C clutch 114, D clutch 116, and forward clutch 350 are applied. With A clutch 110 applied, first pinion carrier 210 rotates at moderately reduced speed, while clutches 114 and 116 cause second pinion carrier 212 to rotate at the speed of input shaft 143. Forward clutch 350 couples second pinion carrier 212 to third sun gear 166. First sun gear 162 is urged backward but restrained by action of B one-way clutch 42. C one-way direct clutch 204 may remain applied but does not participate in power transmission.

Assuming that C one-way direct clutch 204 remains applied, the sixteenth standard DAB ratio state is obtained from the fifteenth CDA ratio state by a single transition shift where C clutch 114 is released and B clutch 112 is applied. Now second ring gear 174 is urged backward, but with C one-way direct clutch 204 applied it is restrained by active engagement of C one-way clutch 44.

The seventeenth standard ABC ratio state is obtained from the sixteenth DAB ratio state by applying C clutch 114 and releasing D clutch 116. Now second sun gear 164 is urged backward, but restrained by action of D one-way clutch 46. C one-way direct clutch 204 may remain applied, but is not necessary, with C one-way clutch 44 overrunning.

The eighteenth and top standard ABCD ratio state is obtained from the seventeenth ABC ratio state through a single transition shift where D clutch 116 is applied. With all forward power transmitting paths contributing to output motion, the transmission acts as a direct 1:1 coupling. With C one-way direct clutch 204 optionally applied, all one-way clutches 40, 42, 44, and 46 overrun.

During coasting conditions, no engine braking occurs for speeds 1, 2, 3, 4, 5, 6, 7, 8, 9, 11, 12, 13, 14, 15, 16, and 17 because at least one of the one-way clutches 40, 42, 44, and 46 will overrun, allowing freewheeling of a principal gearing element. Engine braking during selected ratio states (speeds 6, 3, and 2) is achieved by applying one or more of C brake clutch 124, D brake clutch 126, and carrier brake 356, which brakes first pinion carrier 210, making it unnecessary to have separate A and B brake clutches as were used in the embodiments described above. The "manual sixth" or "L3" engine braking CD ratio state is thus obtained through CD ratio clutching with carrier brake 356 additionally applied to prevent free spinning of the "A" or "B" power transmitting paths during coasting. The "manual third" or "L2" engine braking C ratio state is achieved through C ratio clutching plus additional application of both carrier brake 356 and D brake clutch 126. The "manual second" or "L1" D ratio state is attained with D ratio state clutching plus application of both carrier brake 356 and C brake clutch 124.

The reverse or R ratio state is available by applying D clutch 116, carrier brake 357, reversing clutch 355, and carrier brake 356. Clutches 116, 357, and 355 provide reversing motion as in the RA, RB and RAB ratio states above, but additionally, the application of carrier brake 356 prevents forward spinning of third ring gear 176, which will be urged forward when a load is placed on output shaft 410.

The designation of the ratio states in Table 5 as being standard or elective is somewhat arbitrary. The fifth ratio state, for example, may be designated as elective, with the sixth designated as standard. Also, some elective ratio states may be selected using single transition shifts during non-consecutive ratio transitions that are called for by the transmission control system, e.g., shifts between ratios: 2–6, 3–6, 5–8, 9–13, 9–14, etc.

Figure 49:
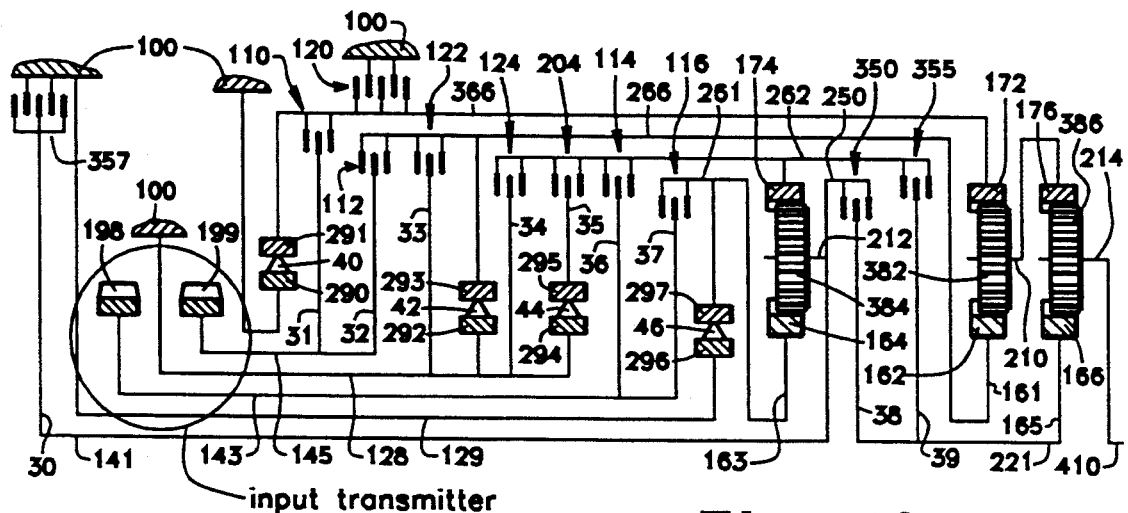
FIGS. 49 and 50 show schematic representations similar to the embodiment of FIG. 46, but with two alternative clutching schemes to provide for different engine braking ratios.
Figure 50:
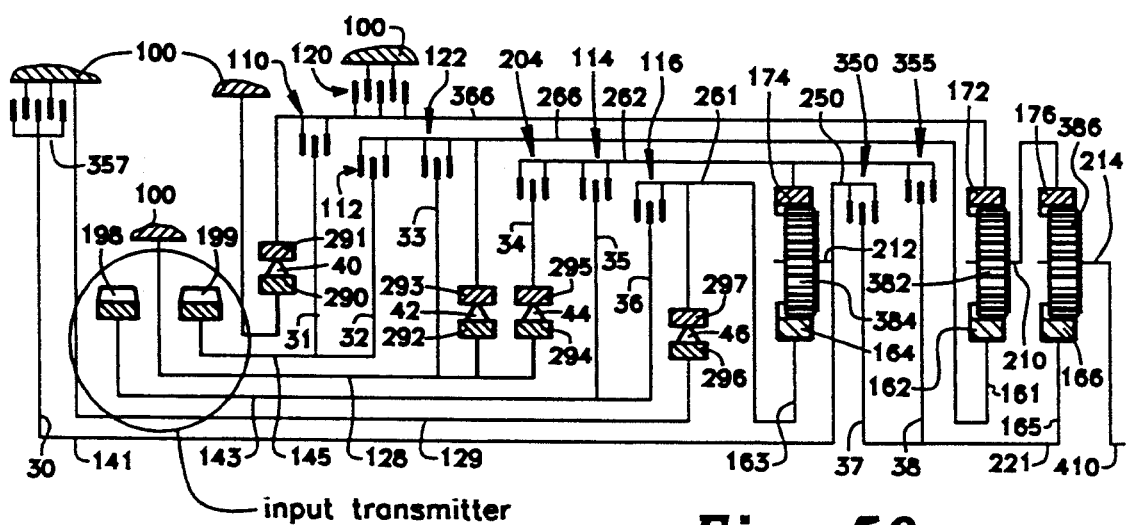

Description of FIGS. 49 and 50

For the transmission of FIG. 46, other engine braking schemes may be selected. FIGS. 49 and 50 show transmissions similar to that shown in FIG. 46, but with two different brake clutches used to give other engine braking ratio patterns. FIG. 49 shows the transmission of FIG. 46, but with carrier brake 356 and D brake clutch 126 eliminated and with A brake clutch 120 and B brake clutch 122 added. A brake clutch 120 can take the form of a conventional band clutch wrapped circumferentially around drum 366, while B brake clutch 122 is added in an axial location between B clutch 112 and B one-way clutch 42 of FIG. 46, selectively grounding drum 266 to stationary first reaction stator 128. Table 5 still applies in part to this unit, but for the reversing R ratio state, A brake clutch 120 and B brake clutch 122 are applied in lieu of carrier brake 356. Using clutches 120 and 122, new engine braking ratios are obtained: a "manual first" or "L1" RB ratio state is attained with RB ratio state clutching plus application of A brake clutch 120 to prevent overrunning of A one-way clutch 40; a "manual second" or "L2" engine braking D ratio state is achieved through D ratio clutching plus additional application of A brake clutch 120, B brake clutch 122, and C brake clutch 124; a "manual fourth" or "L3" engine braking RA ratio state is obtained through RA ratio clutching with B brake clutch 122 applied to prevent B one-way clutch 42 from overrunning; a "manual sixth" or "L4" engine braking CD ratio state is obtained through CD ratio clutching with A brake clutch 120 and B brake clutch 122 applied; a "manual seventh" or "L5" engine braking BD ratio state is obtained through BD ratio clutching with A brake clutch 120 and C brake clutch 124 applied. Alternatively, the structure shown in FIG. 50 may be used. It is similar to that shown in FIG. 49, but with C brake clutch 124 absent. Again, for the R reversing ratio state, A brake clutch 120 and B brake clutch 122 are applied in lieu of carrier brake 356 as given in Table 5. With one fewer brake, however, this transmission provides only the RB, RA, and CD engine braking states just given.

Figure 51:
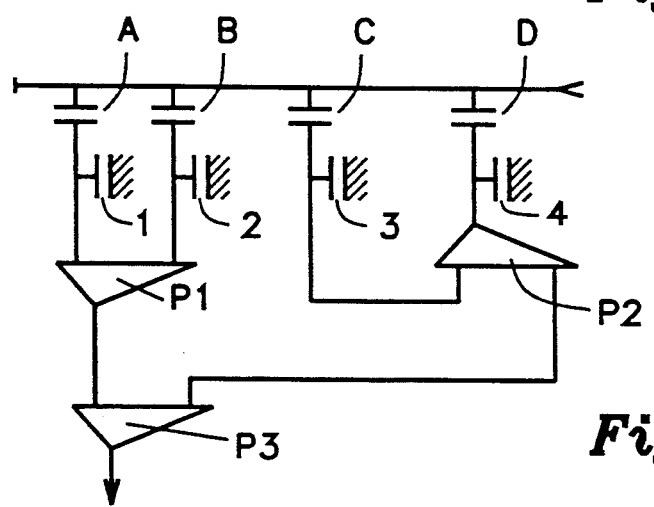
FIG. 51 is a symbolic diagram for a transmission using a combinational geartrain tree consisting of three singly coupled simple planetary gearsets in a configuration similar to the symmetric or bifurcated type of FIG. 45, except that reversing is generated internally, so that the modulated power transmission paths fed by clutches A, B, C, and D obtain a total of fifteen ratio states, using fewer clutches than required for the embodiment of FIG. 45.
Figure 52:
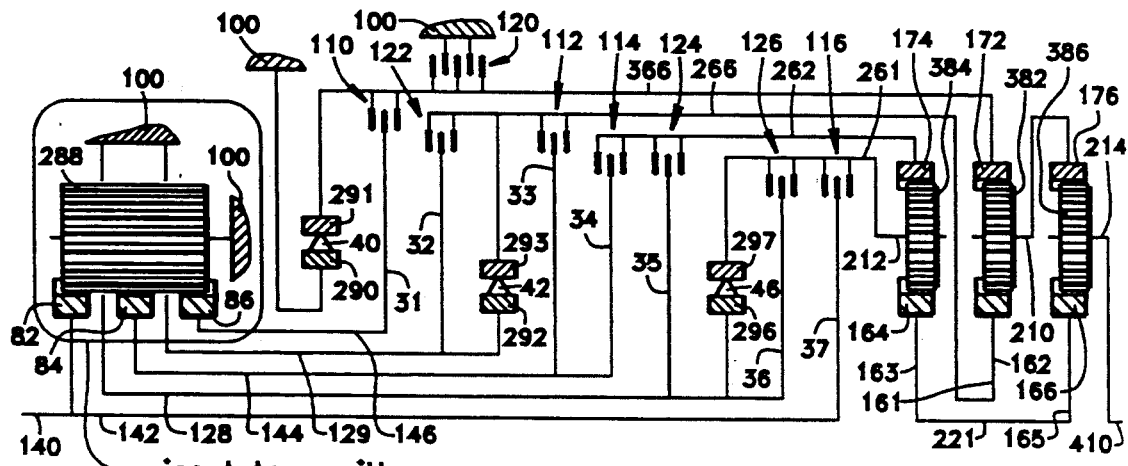
FIG. 52 shows a schematic representation corresponding to FIG. 51, which uses a simple input transmitter similar to the complex input transmitter shown in FIG. 53.

Description of FIGS. 51 and 52

Relative to the transmissions of FIGS. 45, 46, 49, and 50, many variations of the gearing configuration are possible, in a manner similar to the alternative configurations shown in FIGS. 6(a–r) and 7(a–r). FIG. 51 shows a symbolic diagram for a transmission using a combinational geartrain tree consisting of three singly coupled simple planetary gearsets in a configuration similar to the symmetric or bifurcated type of FIG. 45. Using a different gearing configuration, however, allows that reversing motion is generated internally. The planetary carrier of first planetary gearset P1 is again coupled to the ring gear of third planetary gearset P3, but now the sun gear of second planetary gearset P2 is coupled to the sun gear of third planetary gearset P3. There are again four modulated power transmitting paths fed by clutches A, B, C, and D as shown, driving the ring and sun gears of first planetary gearset P1, and the ring gear and planetary carrier of second planetary gearset P2, respectively. The number of possible ratio states Z is again 2 exp (4) − 1 or fifteen: (A, B, C, D, AB, BC, CD, DA, AC, BD, ABC, BCD, CDA, DAB, ABCD). The C ratio state now yields reversing motion, and this motion may be superposed with forward motion from the combinations of the ratio states A, B, and D.

FIG. 52 shows one schematic representation corresponding to FIG. 51. To realize this configuration, an input transmitter similar to that used in FIG. 46 may be used, having input sprockets 198 and 199, with first and second reaction stators 128 and 129. If, however, an end-driven automotive arrangement is desired which does not require input drive links or offset gearing and thus is better suited for rear wheel drive, the epicyclic input transmitter shown in FIG. 52 may be used, where a plurality of input transmitter pinions 288 drivingly mesh with sun gears 82, 84, and 86, which are coupled to input shafts 142, 144, and 146, respectively. Radially between input shafts 142 and 144 is a first reaction stator 128 which passes radially outward to bond with case 100 at an axial location between sun gears 82 and 84. Radially between input shafts 144 and 146 is a second reaction stator 129 which also passes radially outward to bond with case 100 at an axial location between sun gears 84 and 86. A main input shaft 140 may be fitted to or integral with input transmitter first sun gear 82 or input shaft 142.

At the axial right end of the gearing arrangement is the third planetary gearset P3 which again comprises a plurality of third planetary pinions 386, rotatably mounted on a third pinion carrier 214 and drivingly meshing with both third sun gear 166 and third ring gear 176. Output shaft 410 is coupled to the third pinion carrier 214, while third ring gear 176 is coupled to or is an integral part of first pinion carrier 210 of the first planetary gearset P1. Gearset P1 is located axially between planetary gearsets P2 and P3, comprising a plurality of first planetary pinions 382 which are rotatably supported by the first pinion carrier 210 and which drivingly mesh with first sun gear 162 and first ring gear 172. Second planetary gearset P2 is located to the axial left of gearset P1, and comprises a second pinion carrier 212 which retains a plurality of second planetary pinions 384 that drivingly mesh with both second sun gear 164 and second ring gear 174. The sun gears 164 and 166 are coupled through sleeve shaft 221.

The fourth power transmitting path driving second pinion carrier 212 is fed by means of drum 261. To drive this power transmitting path forward, selective application of D clutch 116 couples drum 261 to input shaft 142 via clutch inner hub 37. Braking of the path is provided by D brake clutch 126, which when applied will couple drum 261 to first reaction stator 128 via clutch inner hub 36. Reaction force needed to prevent second pinion carrier 212 from backward rotation is provided by D one-way clutch 46, whose inner race 296 is coupled to first reaction stator 128, and whose outer race 297 is coupled the axial left end of drum 261. Drum 261 is fitted with or is coupled to clutch housings for clutches 116 and 126.

The third power transmitting path driving second ring gear 174 is fed by means of drum 262. To hold drum 262 stationary, selective actuation of C brake clutch 124 couples the drum to clutch inner hub 35, which in turn is coupled to first reaction stator 128. To drive this path, selective actuation of C clutch 114 couples drum 262 to input shaft 144 via clutch inner hub 34. Drum 262 is fitted with or coupled to clutch housings for clutches 114 and 124.

The second power transmitting path driving first sun gear 162 is modulated via drum 266. To drive the drum forward, actuation of B clutch 112 couples drum 266 via clutch inner hub 33 to input shaft 144. Drum 266 is prevented from rotating backward by action of B one-way clutch 42, whose outer race 293 is coupled to drum 266, and whose inner race 292 is coupled to second reaction stator 129. To hold the drum stationary, B brake clutch 122 may selectively couple the drum to the second reaction stator 129 via clutch inner hub 32. Drum 266 is fitted with clutch housings for clutches 112 and 122.

The first power transmitting path driving first ring gear 172 is fed by means of outer drum 366, which may be selectively braked using A brake band clutch 120 which couples the drum directly to case 100. To drive the path, selective actuation of A clutch 110 couples drum 366 to input shaft 146 via clutch inner hub 31.

Reaction forces needed to prevent backward rotation of drum 366 is provided by A one-way clutch 40, with an inner race 290 coupled to case 100 and an outer race 291 coupled to drum 366. The drum 366 has provision for coupling to a clutch housing for A clutch 110.

The equation of motion for this transmission is $$\omega_{out} = b_1 b_3 \omega_A + a_1 b_3 \omega_B - (b_2/a_2) a_3 \omega_C + (1/a_2) a_3 \omega_D \quad \text{(Eqn. 9)}$$

where the subscripts 1, 2 and 3 again refer to planetary gearsets P1, P2 and P3, respectively. Using the following number of teeth for each of the principal gearing elements: {first sun gear 162: 38; first ring gear 172: 78; first pinion carrier 210 pinions: 20; second sun gear 164: 34; second ring gear 174: 82; second pinion carrier 212 pinions: 24; third sun gear 166: 38; third ring gear 176: 78; third pinion carrier 214 pinions: 20}, the equation of motion becomes:

$$\omega_{out} = 0.452\omega_A + 0.220\omega_B - 0.790\omega_C + 1.118\omega_D \quad \text{(Eqn. 10)}$$

Referring to FIGS. 51 and 52, and also to Table 6, a ratio and clutching table for the transmission of FIG. 52, will show how the above ratio states are obtained. Final reduction gearing would ordinarily be required for automotive applications.

In neutral, input shafts 142, 144 and 146 are driven by the prime mover, and all clutches are released, and output shaft 410 may spin freely.

From neutral, the forward drive ratio states listed in Table 5 may be divided into three categories: standard underdrive states, elective underdrive states, and standard overdrive states. Standard underdrive ratio states (speeds 2, 4, 6, 7 and R1) are indicated using the "X" clutch apply/active symbols, and again, when using a shift strategy using only the standard ratio states, no multiple transition shifts are encountered between successive forward speeds. Elective ratio states, (speeds 1, 3, 5, and R0, R2, and R3) are indicated using the "E" clutch apply/active symbols and involve multiple tran-

TABLE 6

| Speed | Ratio State | CLUTCHES/BANDS |||||||| OWC ||| Inverse Overall Ratio out/in | Overall Ratio in/out |
|---|---|---|---|---|---|---|---|---|---|---|---|---|---|---|
| | | A 110 | B 112 | C 114 | D 116 | Abr 120 | Bbr 122 | Cbr 124 | Dbr 126 | A/1 40 | B/2 42 | D/4 46 | | |
| N | φ | | | | | | | | | | | | — | — |
| 1 | B | | E | | | | | | E | E | | E | .22 | 4.54 |
| 2 | CD | | | X | X | | | | | X | X | | .33 | 3.05 |
| 3 | A | E | | | | | | | E | | E | E | .45 | 2.21 |
| 4 | BCD | | X | X | X | | | | | X | | | .55 | 1.83 |
| 5 | AB | E | E | | | | | | E | | | E | .67 | 1.49 |
| 6 | CDA | X | | X | X | | | | | | X | | .78 | 1.28 |
| 7 | ABCD | X | X | X | X | | | | | | | | 1.00 | 1.00 |
| 8 | D | | | | Y | | Y | | | Y | Y | | 1.12 | .89 |
| 9 | BD | | Y | | Y | | Y | | | Y | | | 1.34 | .75 |
| 10 | DA | Y | | | Y | | Y | | | | Y | | 1.57 | .64 |
| 11 | DAB | Y | Y | | Y | | Y | | | | | | 1.79 | .56 |
| L3 | ABCD | X | X | X | X | | | | | | | | 1.00 | 1.00 |
| L2 | BCD | | X | X | X | X | | | | | | | .55 | 1.83 |
| L1 | CD | | | X | X | X | X | | | | | | .33 | 3.05 |
| R0 | ABC | E | E | E | | | | | E | | | | −.12 | −8.50 |
| R1 | AC | X | | X | | | X | | X | | | | −.34 | −2.96 |
| R2 | BC | | E | E | | E | | | E | | | | −.57 | −1.76 |
| R3 | C | | | E | | E | E | | E | | | | −.79 | −1.27 | sition shifts when shifting consecutively through the speeds 1–11. Standard overdrive ratio states (speeds 8, 9, 10, and 11) are shown using "Y" clutch apply/active symbols as a group do not involve multiple transition shifts between consecutive ratio states in the group. A multiple transition shift is required, however, for shifts between the highest standard underdrive state, speed 7, and the lowest standard overdrive state, speed 8.

The first elective B ratio state is achieved by application of B clutch 112 and C brake clutch 124. With B clutch 112 applied and a load at output shaft 410, the second and third sun gears 164 and 166 will be urged backward, and will in turn urge second pinion carrier 212 backward as well. Backward motion of second pinion carrier 212 will be checked, however, by action of D one-way clutch 46. Similarly, backward motion of first ring gear 172 will be prevented by action of A one-way clutch 40. The second ring gear 174, which will be urged forward, is braked by application of C brake clutch 124. Overall speed ratios $\omega_{in}/\omega_{out}$ are listed, along with inverse overall drive ratios for illustrating the combinational and superpositional nature of the various ratio states.

The second standard underdrive CD ratio state is obtained by applying C clutch 114 and D clutch 116. This action drives second ring gear 174 and second pinion carrier 212 at the speed of main input shaft 140, locking up second planetary gearset P2 and thus also driving third sun gear 166 at the speed of the main input shaft. Backward motion of first ring gear 172 and first sun gear 162 is prevented by active engagement of one-way clutches 40 and 42, respectively.

The third elective A ratio state is attained by engaging A clutch 110 and C brake clutch 124. The resultant urging backward of first sun gear 162 and second pinion carrier 212 is checked by active engagement of one-way clutches 42 and 46, respectively, while forward motion of second ring gear 174 is prevented by applying C brake clutch 124.

The fourth standard underdrive BCD ratio state is achieved by applying B clutch 112, C clutch 114 and D clutch 116. The power flow described above for speed 2 combines with that described for speed 1. Backward motion of first ring gear 172 is prevented by engagement of A one-way clutch 40.

The fifth elective AB ratio state occurs when A clutch 110 and B clutch 112 are applied, along with C brake clutch 124. With first planetary gearset P1 locking up and becoming, in effect, a drive coupling, third ring gear 176 is driven at the speed of main input shaft 140. Second and third sun gears 164 and 166 will be urged backward, and the resultant backward urging of second pinion carrier 212 is prevented by action of D one-way clutch 46, while second ring gear 174 is held stationary by clutch 124.

The sixth standard underdrive CDA ratio state is achieved by applying A clutch 110, C clutch 114 and D clutch 116. Backward motion of first sun gear 162 is prevented by action of B one-way clutch 42.

The seventh standard underdrive ABCD ratio state occurs when A clutch 110, B clutch 112, C clutch 114, and D clutch 116 are applied, so that the transmission as a whole becomes a direct coupling, giving a 1:1 overall ratio.

Transition to the eighth standard overdrive D ratio state from speed 7 involves a multiple transition shift whereby clutches 110, 112, and 114 are released, while C brake clutch 124 is applied. With only D clutch 116 and C brake clutch 124 applied, forward driving of second pinion carrier 212 allows that second and third sun gears 164 and 166 are driven at speed higher than that of the main input shaft 140. Although a speed reduction is effected by third planetary gearset P3, the resultant overall ratio still becomes a shallow overdrive speed ratio. Backward rotation of first ring gear 172 and first sun gear 162 is prevented by engagement of one-way clutches 40 and 42, respectively.

The ninth standard overdrive BD ratio state is attained by application of B clutch 112 and D clutch 116, along with C brake clutch 124. Backward rotation of first ring gear 172 is arrested by A one-way clutch 40.

The tenth standard overdrive AD ratio state results when A clutch 110 and D clutch 116 are applied, along with C brake clutch 124. Backward motion of first sun gear 162 is prevented by action of B one-way clutch 42.

The highest standard overdrive DAB ratio state is achieved by applying A clutch 110, B clutch 112, C brake clutch 124 and D clutch 116, which drives all the power transmitting paths contributing to forward motion at the output shaft 410.

With the exception of speeds 7 and 11, no engine braking will occur during coasting conditions because at least one of the one-way clutches 40, 42, or 46 will overrun, allowing freewheeling of one of gearing elements 172, 162, or 212, respectively. The "manual seventh" or "L3" ABCD ratio state is obtained through clutching identical to that for speed 7. Selected additional engine braking ratio states may be obtained, however, by applying one or both of A brake clutch 120 and B brake clutch 122. Thus, the "manual fourth" or "L2" BCD ratio state is achieved through BCD ratio clutching with additional application of A brake clutch 120. The "manual second" or "L1" CD ratio state is attained through CD ratio clutching plus application of both A brake clutch 120 and B brake clutch 122. If desired, another engine braking CDA ratio state may be obtained through CDA clutching plus application of B brake clutch 122 alone.

With the particular number of teeth selected for each gearing element, four reversing ratio states are available. A very low ratio elective "R0" reverse ABC ratio state can be achieved by applying A clutch 110, B clutch 112, and C clutch 114, along with D brake clutch 126. With clutches 110 and 112 applied, first planetary gearset P1 locks up as a unit and through first pinion carrier 210, drives the third ring gear 176 at transmission input speed. With C clutch 114 energized and D brake clutch 126 applied, reversing motion is fed to the third sun gear 166. A second standard "R1" reverse AC ratio state is obtained by applying A clutch 110, C clutch 114, B brake clutch 122 and D brake clutch 126. Power flows are similar to those for the ABC state, except that first sun gear 162 is not driven and is prevented from spinning forward during an output load by application of B brake clutch 122. A third elective "R2" reverse BC ratio state occurs when B clutch 112, C clutch 114, A brake clutch 120 and D brake clutch 126 are engaged. Now first sun gear 162 is driven and first ring gear 172 is held stationary by A brake clutch 120. For each of the reverse ratio states ABC, AC, and BC, some power recirculates, with third sun gear 166 driving third ring gear 176. Finally, an elective "R3" reverse C ratio state results when C clutch 114, A brake clutch 120, B brake clutch 122 and D brake clutch 126 are applied. With first sun gear 162, first ring gear 172 and second sun gear 164 held stationary, reversing motion is fed to third sun gear 166, where a speed reduction takes place at third planetary gearset P3.

Figure 53:
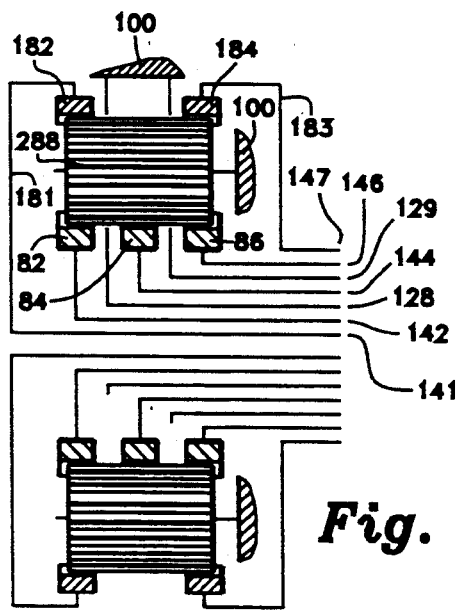
FIG. 53 shows a complex epicyclic input transmitter in the upper and lower half-planes, having two reaction stators and five driving/driven gearing elements.

Description of FIGS. 53 and 54

Gearing elements may be added to the input transmitter shown in the schematic representation of FIG. 52. FIG. 53 shows a complex epicyclic input transmitter in the upper and lower half-planes where ring gears 182 and 184 have been added. First ring gear 182 meshes with the plurality of input transmitter pinions 288 on the axial left side, and is coupled to inner shaft 141 via a first ring gear hub 181; similarly second ring gear 184 meshes with the pinions 288 on the axial right side and is coupled to input shaft 147 via a second ring gear hub 183. As before, one or both of these extra rotating inputs may be used to great advantage for geartrains making use of reversing motion. FIG. 54 shows an another input transmitter, also in the upper and lower half-planes, that may used for the embodiment of FIG. 52, using a single wide input drive link 315 which drivingly meshes with input sprockets 197, 198, and 199. First reaction stator 128 emerges at an axial location between input sprockets 197 and 198 while second reaction stator 129 emerges between input sprockets 198 and 199, both bonding at least mechanically to case 100 at a location between the slack and tensioned sides of input drive link 315. Individual drive links may be used for any of the drive sprockets, which may be driven at different angular speeds to enhance the transmission ratio pattern or clutching control strategy.

Figure 55:
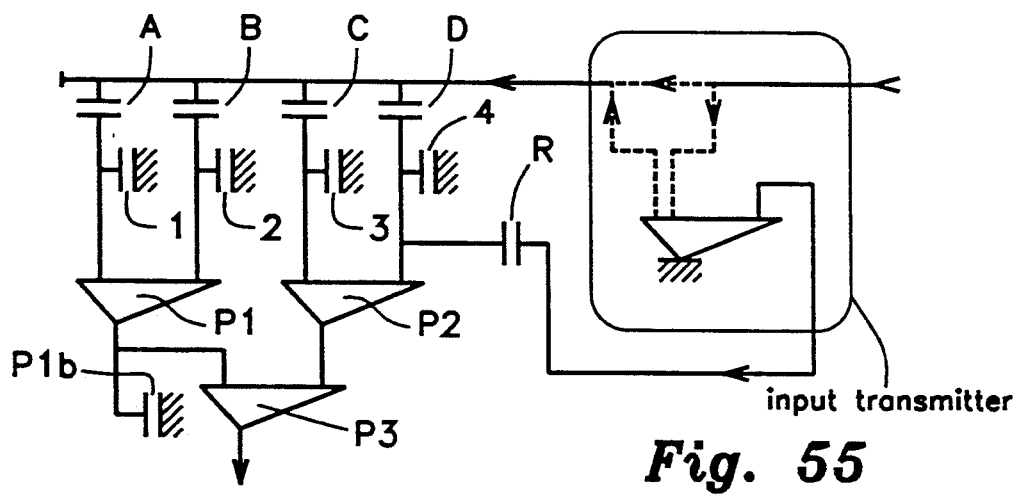
FIG. 55 is a symbolic diagram for a transmission using a combinational geartrain tree consisting of three singly coupled simple planetary gearsets in a symmetric or bifurcated configuration similar to FIG. 45, but with external reversing provided to the power transmitting path fed by clutch D, yielding a total of twenty-three total ratio states.
Figure 56:
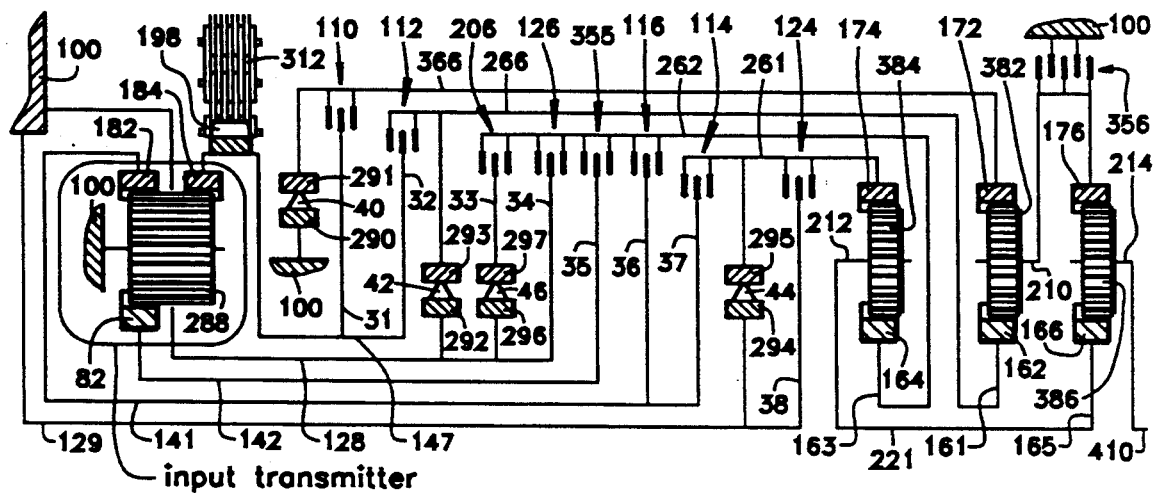
FIG. 56 shows a schematic representation corresponding to the transmission of FIG. 55.

Description of FIGS. 55 and 56

FIG. 55 shows a symbolic diagram for a transmission using a combinational geartrain tree consisting of three singly coupled simple planetary gearsets in a symmetric or bifurcated configuration similar to FIG. 45, but providing external reversing to the power transmitting path fed by clutch D, in the same way that external reversing motion was made available to the power transmitting path fed by clutch C in FIG. 41. FIG. 56 shows one possible corresponding schematic representation for the transmission of FIG. 55. Referring to FIGS. 55 and 56, an input transmitter similar to that shown in FIG. 40 is used, except that the input transmitter second sun gear 84 is omitted. Input drive link 312 drives input sprocket 198, which is integral with or is coupled to second ring gear 184. In order of increasing radius, the coaxially arranged shafts or torque transmitting elements are second reaction stator 129, which mechanically couples to case 100; inner shaft 141, which is coupled to input transmitter first ring gear 182; input shaft 142, which is coupled to input transmitter first sun gear 82; first reaction stator 128, also bonding to case 100; and input shaft 147, which is coupled to input sprocket 198 and input transmitter second ring gear 184. At the right axial end of the geartrain are the three planetary gearsets P1, P2, and P3, which are singly linked as shown in FIG. 55. Carrier brake 356 again performs the function of brake P1b, selectively holding stationary the third ring gear 176 and first pinion carrier 210. The third power transmitting path driving second ring gear 174 is fed by drum 261. Selective braking of this path is provided by C brake clutch 124, which couples second reaction stator 129 to the drum via clutch inner hub 38. Reaction force to prevent backward motion of drum 261 is provided by C one-way clutch 44, with outer race 295 coupled to drum 261 and inner race 294 coupled to the second reaction stator 129. To drive this path, C clutch 114, via clutch inner hub 37, selectively couples drum 261 to inner shaft 141. The fourth power transmitting path driving second sun gear 164 is fed by drum 262. This path may be driven via clutch inner hub 36 when D clutch 116 selectively couples inner shaft 141 to drum 262. Input shaft 142, which rotates at high reverse speed, may be coupled to drum 262 via clutch inner hub 35 by selective actuation of reversing clutch 355. This path may be grounded via clutch inner hub 34 by D brake clutch 126, which selectively couples first reaction stator 128 to drum 262. Reaction force to arrest backward motion of this path is provided by D one-way clutch 46, whose inner race 296 is coupled to first reaction stator 128 and whose outer race 297 is coupled to or is integral with clutch inner hub 33, which may in turn be selectively coupled to drum 262 by selective action of D one-way direct clutch 206. This allows intentional reverse motion of drum 262 when desired. The second power transmitting path driving first sun gear 162 is fed by drum 266. Reaction force to assure only forward motion of this drum is provided by B one-way clutch whose inner race 292 is coupled to reaction stator 128 and whose outer race 293 is coupled to drum 266. To drive this path, B clutch 112 couples drum 266 via clutch inner hub 32 to input shaft 147. The first power transmitting path driving first ring gear 172 is fed by drum 366 and may be driven by actuating A clutch 110, which couples the drum to the input shaft 147 via clutch inner hub 31. Reaction force to prevent reverse motion of drum 366 are supplied by A one-way clutch 40, with inner race 290 coupled to case 100 and outer race 291 coupled to the drum 366.

This arrangement provides for up to twenty-three ratio states (A, B, C, D, AB, BC, CD, DA, AC, BD, ABC, BCD, CDA, DAB, ABCD, AR, BR, CR, ABR, BCR, CAR, ABCR, and R). These ratio states are obtained in a manner similar to that described above where ratio states A, B, C, D, and R are achieved by actuation of clutches 110, 112, 114, 116, and 355 respectively, and where any power transmitting path(s) not driven are held stationary by one-way clutches 40, 42, 44, and 46 and brakes 124 and 126 when necessary. As before, D clutch 116 and reversing clutch 355 may not be applied simultaneously, and application of reversing clutch 355 requires release of D one-way direct clutch 206 to allow reverse motion. An A brake clutch 120 or B brake clutch 122 may be added, or the D brake clutch 126 may be omitted for certain applications, such as providing certain engine braking or reversing ratio states, depending on the number of teeth selected for each gearing element. To cut costs, first planetary gearset P1 may be eliminated, along with one drive clutch, one one-way clutch, etc., to revert to simpler structures like those given in FIGS. 41, 42, 43, 44, 47, and 48. Most of the remaining structures in the transmission unit could then be used without requiring design changes for each component.

Figure 57:
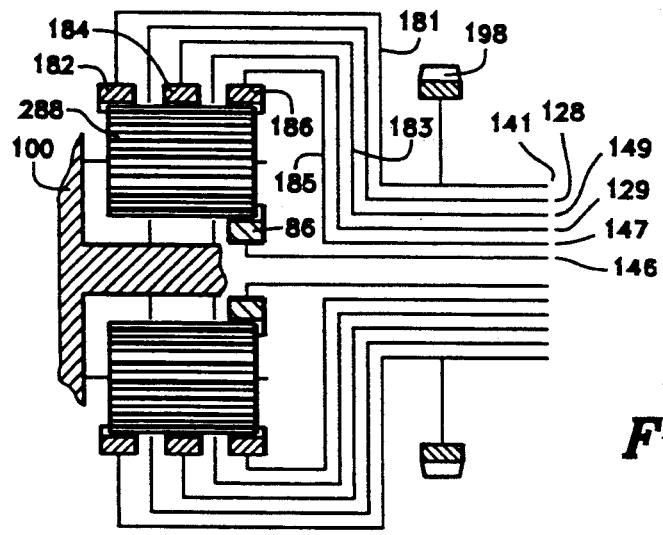
FIG. 57 shows another complex epicyclic input transmitter that can be used to realize the embodiment of FIGS. 55 and 56, having two centrally grounded reaction stators and four driving/driven gearing elements.

Description of FIG. 57

Many arrangements may be devised to provide an input transmitter appropriate for a particular gearing arrangement so that each power transmitting path may be selectively coupled to the desired rotational inputs. Any means may be used to provide the necessary coaxial layering of shafts or rotating structures. FIG. 57, for example, shows an epicyclic input transmitter where a plurality of pinions 288 having support spindles grounded in case 100, gearingly mesh with ring gears 182, 184, and 186 and a single sun gear 86. First and second reaction stators 128 and 129 are centrally grounded, bonding to case 100 at a location radially inside the input transmitter pinions 2S8. Sun gear 86 is coupled to input shaft 146; third ring gear 186 is coupled to input shaft 147 via third ring gear hub 185; second ring gear 184 is coupled to an input shaft 149 via second ring gear hub 183; first ring gear 182 is coupled to inner shaft 141 via first ring gear hub 181. One possible driving means is shown where an input sprocket 198 is drivingly coupled to inner shaft 141, but the driving means may be coupled to any of the principal elements 182, 184, or 186 at any axial location, even at the opposite axial end of the geartrain. By rearranging the coaxial order of shafts, the embodiment shown in FIG. 56 may use this input transmitter if desired.

Figure 58:
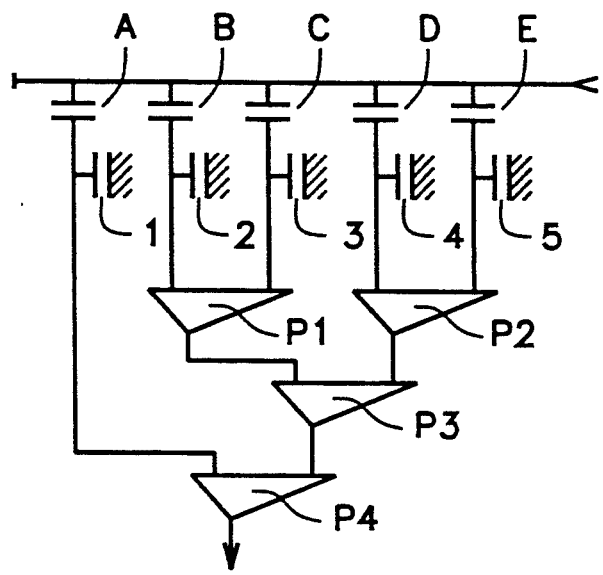
FIG. 58 is a symbolic diagram for a transmission using a combinational geartrain tree consisting of four singly coupled simple planetary gearsets with the first three planetary gearsets in a symmetric or bifurcated configuration similar to FIG. 45, and with an additional power transmitting path provided by a fourth planetary gearset, such that power transmission paths fed by clutches A, B, C, D and E achieve a total of $(2 \exp 5) - 1$ or thirty-one forward ratio states.

Description of FIG. 58

So long as an appropriate multiple-element input transmitter is used, an arbitrary number of gearsets of any type may be employed to practice this invention, with the number of unique ratio states available multiplying rapidly. FIG. 58 shows a symbolic diagram for a transmission using a combinational geartrain tree consisting of four singly coupled simple planetary gearsets with the first three planetary gearsets in a symmetric or bifurcated configuration similar to FIG. 45, but with the planetary carrier of third planetary gearset P3 coupled to the sun gear of a fourth planetary gearset P4. The ring gear of fourth planetary gearset P4 then constitutes an additional power transmitting path, fed by clutch A. The five power transmission paths fed by clutches A, B, C, D and E achieve a total of (2 exp 5)−1 or thirty-one forward ratio states. Reversing or other internal clutching provisions can yield many more ratio states, and many configurational changes analogous to those of FIGS. 6(a–4) and 7(a–r) are possible.

Figure 59:
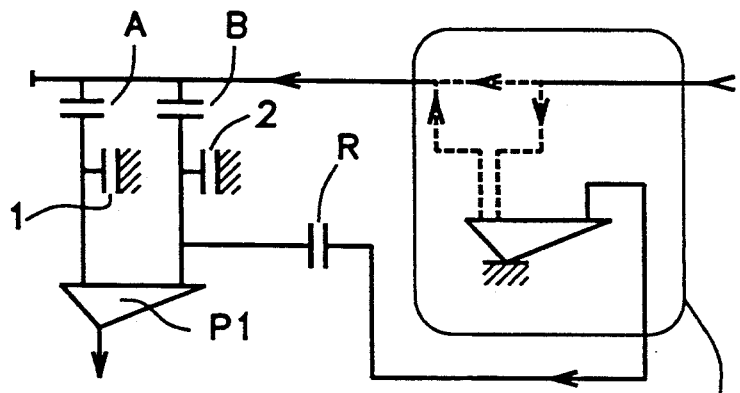
FIG. 59 is a symbolic diagram for a transmission using a single simple planetary gearset, with two power transmitting paths fed by clutches A and B, with the latter path having available external reversing, and yielding a total of five ratio states.
Figure 60:
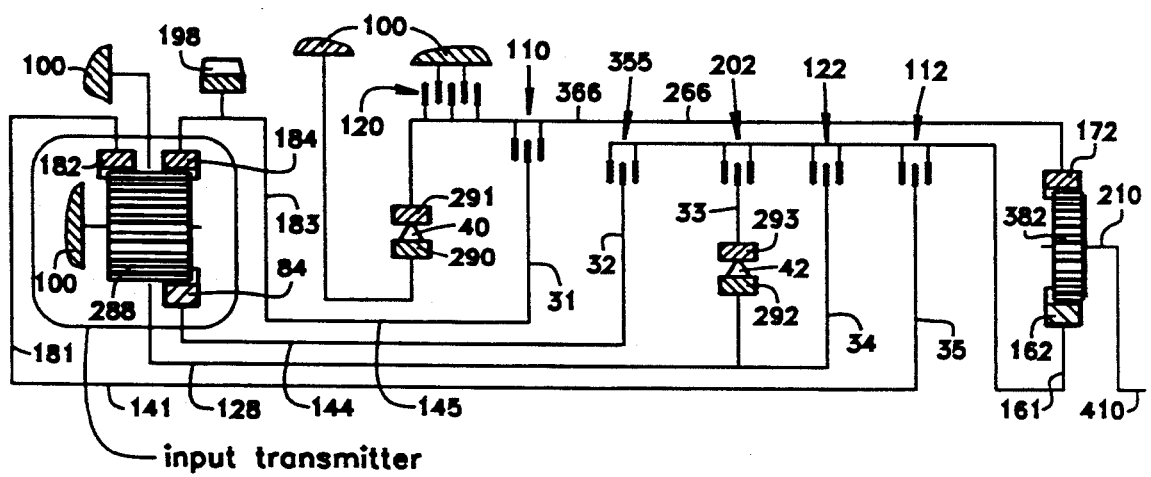
FIG. 60 shows a schematic representation corresponding to the embodiment of FIG. 59, using a complex input transmitter.

Description of FIGS. 59 and 60

To practice this invention it is not necessary to make use of a combinational geartrain tree, where two or more gearsets are singly linked. The gearset(s) employed, for example, may be doubly linked, or a single gearset may be used. FIG. 59 shows a symbolic diagram for a transmission using a single simple planetary gearset, with the planetary carrier used as an output and having two power transmitting paths fed by clutches A and B which drive the ring and sun gears, respectively. Externally generated reversing is provided to the power transmitting path fed by clutch B. This arrangement yields a total of five ratio states: (A, B, AB, AR, and R). FIG. 60 shows a schematic representation corresponding to the embodiment of FIG. 59. The epicyclic input transmitter shown comprises a plurality of input transmitter pinions 288, with rotation axes fixed to case 100, which drivingly mesh with first and second ring gears 182 and 184 and with a sun gear 84. A single reaction stator 128 passes between the pinions 288 to bond to case 100. The inner shaft 141 is coupled to first ring gear 182 using a first ring gear hub 181. Inner shaft 141 is coaxially surrounded by reaction stator 128, followed coaxially by input shaft 144, which is coupled to input transmitter second sun gear 84. An outer input shaft 145 is coupled to second ring gear 184 via second ring gear hub 183. The hub 183 may incorporate or be coupled to an input sprocket 198, or alternatively the transmission may be end-driven using a main input shaft, not shown, to drive the first ring gear hub 181. The planetary gearset P1 has its planetary carrier coupled to output shaft 410. The second power transmitting path driving sun gear 162 is coupled to drum 266 via a sun gear hub 161. This path may be driven forward by actuation of B clutch 112, which via clutch inner hub 35 couples inner shaft 141 to drum 266. Braking for this path occurs by action of B brake clutch 122, which couples the reaction stator 128 to drum 266 using clutch inner hub 34. Application of reversing clutch 355 imparts reverse motion to this path by coupling drum 266 to input shaft 144 via clutch inner hub 32. Reaction force to arrest reverse motion when required is furnished by B one-way clutch 42 whose inner race 292 is coupled to reaction stator 128 and outer race 293 to clutch inner hub 33, which may be selectively coupled to drum 266 using B one-way direct clutch 202. The first power transmitting path driving ring gear 172 is coupled to drum 366. To drive this path, actuation of A clutch 110 couples input shaft 145 to drum 366 via clutch inner hub 31. Reverse motion is prevented by A one-way clutch 40, whose inner race 290 is coupled to case 100 and whose outer race 291 is coupled to drum 366. A brake clutch 120 may selectively ground the drum 366 when required. The first forward B ratio state occurs with actuation of B clutch 112, with A one-way clutch 40 holding ring gear 172 when during an output load. B one-way direct clutch 202 may be applied, but does not participate in power transmission. The second forward A ratio state is obtained by applying A clutch 110, with B one-way direct clutch 202 applied to allow B one-way clutch 42 to arrest reverse motion of sun gear 162. A third forward AB ratio state is obtained when A clutch 110 and B clutch 112 are applied together, causing planetary gearset P1 to lock up as a unit, driving pinion carrier 210 at transmission input speed. B one-way direct clutch 202 may again remain applied to simplify clutch control. The reverse R ratio state occurs with actuation of reversing clutch 355 and also A brake clutch 120 to prevent forward spinning of ring gear 172. A fourth "low" forward or reverse AR ratio state occurs with actuation of reversing clutch 355 with A clutch 110. Power can recirculate, with ring gear 172 driving sun gear 162 or vice-versa, depending on the number of teeth selected for each gearing element in planetary gearset P1 and in the input transmitter. To achieve engine braking in the A and B ratio states, one should additionally apply B brake clutch 122 and A brake clutch 120, respectively.

Figure 61:
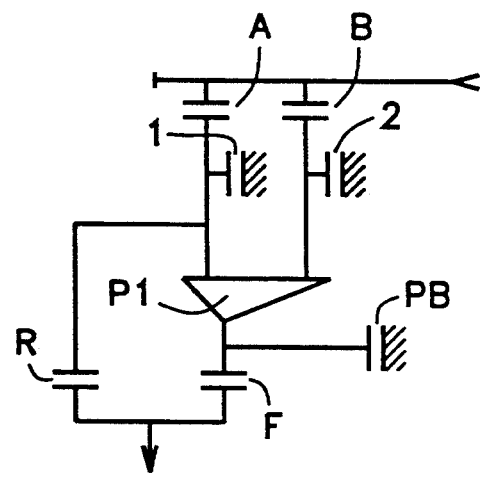
FIG. 61 is a symbolic diagram for a transmission using a single simple planetary gearset, with two power transmitting paths fed by clutches A and B, with clutching provisions for sacrificial reversing, yielding a total of one reverse and three forward ratio states.
Figure 62:
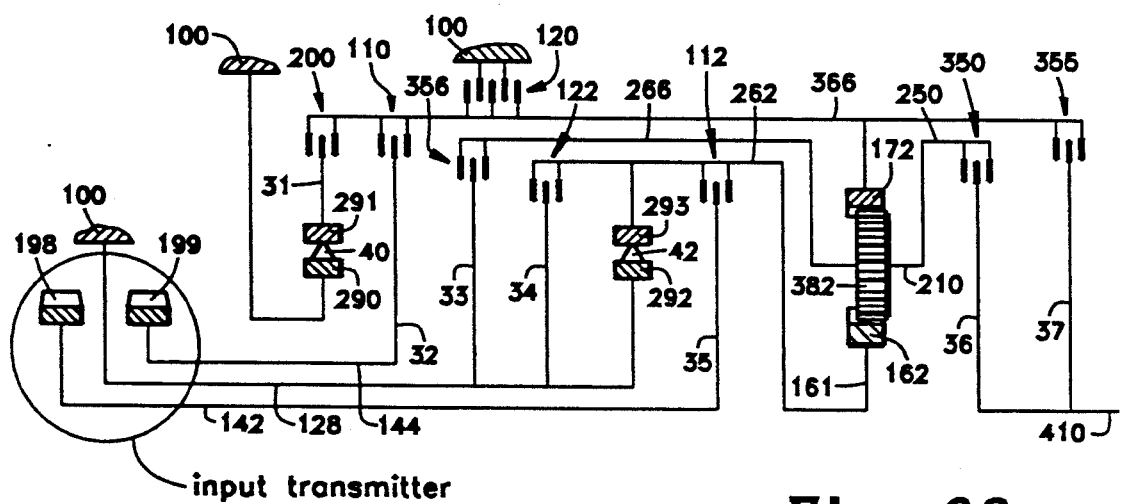
FIG. 62 shows a schematic representation corresponding to the embodiment of FIG. 61, using a simple input transmitter.

Description of FIGS. 61 and 62

To minimize the gearing hardware required, the epicyclic input transmitter in the above example may be replaced by the simple input transmitter used in FIGS. 5, 10 and 11. FIG. 61 shows a symbolic diagram for a transmission similar to that of FIGS. 59 and 60 except that the external reversing input has been replaced by the sacrificial reversing arrangement used for first planetary gearset P1 of FIG. 8. Four ratio states are possible: (A, B, AB and R). FIG. 62 gives a schematic representation corresponding to the embodiment of FIG. 61. As before, input shafts 142 and 144 are coupled to input sprockets 198 and 199, respectively. The pinion carrier 210 is coupled to forward clutch housing 250 on the axial right side and coupled to drum 66 on the axial left side. Sun gear 162 is coupled to drum 262 via sun gear hub 161 and ring gear 172 is coupled to drum 366. Output shaft 410 is coupled to clutch inner hubs 36 and 37, so that application of forward (F) clutch 350 allows that output shaft 410 is coupled to forward clutch housing 250 and pinion carrier 210 while application of reversing (R) clutch 355 couples output shaft 410 to drum 366 and ring gear 172. The first power transmitting path driving sun gear 162 may be acted upon by B clutch 112, B one-way clutch 42 and B brake clutch 122, while the second power transmitting path driving ring gear 172 may be acted upon by A clutch 110, A brake clutch 120, and A one-way clutch 40, whose outer race 291 may be selectively coupled to drum 366 by A one-way direct clutch 200. Non-application of A one-way direct clutch 200 allows reverse motion of drum 366 during the R ratio state. Axially between A clutch 110 and B brake clutch 122 is carrier brake 356, which performs the function of clutch PB of FIG. 61. The first forward B ratio state is achieved by applying B clutch 112, forward clutch 350 and A one-way direct clutch 200. The second forward A ratio state occurs when A clutch 110 and forward clutch 350 are applied. The third forward AB ratio state occurs when both A clutch 110, B clutch 112 and forward clutch 350 are applied. The reverse R ratio state is attained by application of B clutch 112, reversing clutch 355 and carrier brake 356. Engine braking for the A and B ratio states again requires application of B brake clutch 122 and A brake clutch 120, respectively.

Figure 63:
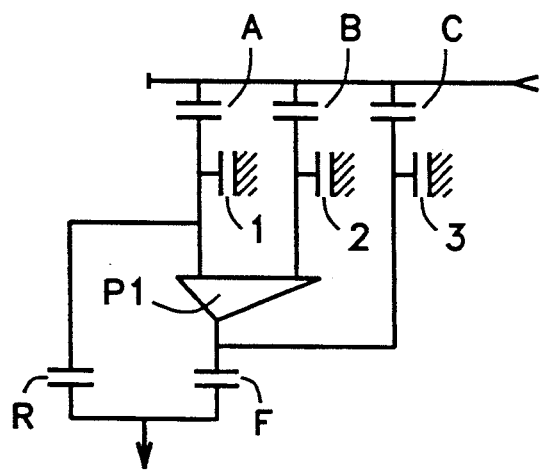
FIG. 63 is a symbolic diagram for a transmission using a single simple planetary gearset, with two standard power transmitting paths fed by clutches A and B, and a third path sacrificially generated fed by clutch C, yielding a total of one reverse and four forward ratio states, including one overdrive state.
Figure 64:
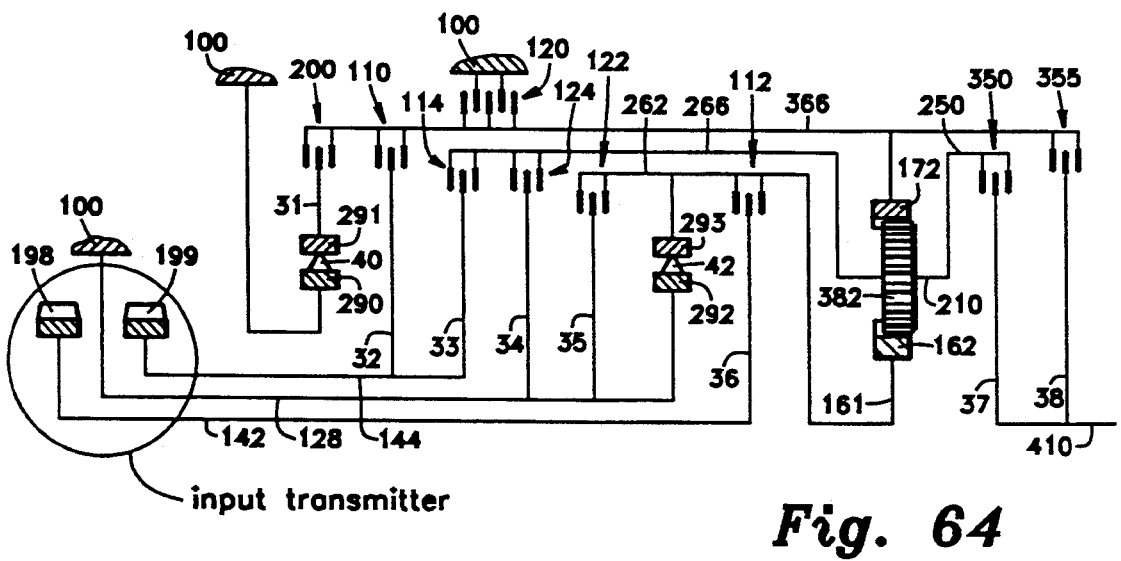
FIG. 64 shows a schematic representation corresponding to the embodiment of FIG. 63, using a simple input transmitter.

Description of FIGS. 63 and 64

Referring to FIG. 63, a symbolic diagram, the above configuration of FIG. 61 may be improved by adding an overdrive ratio state. This is achieved by adding a third power transmitting path to drive the pinion carrier 210 directly. This is a sacrificially generated power transmitting path, since driving this path can interrupt the power transmitting paths fed by clutches A and B. The clutch PB in FIG. 61 is replaced by braking device(s) 3 of FIG. 63. Referring also to FIG. 64, a corresponding schematic representation, carrier brake 356 of FIG. 61 has been replaced with C clutch 114 and C brake clutch 124. C brake clutch 124 still performs the braking function of carrier brake 356, but actuation of C clutch 114 drives pinion carrier 210 by coupling the carrier via drum 266 and clutch inner hub 33 to the input shaft 144. By also applying B brake clutch 122 and reversing clutch 355, an overdrive ratio state is achieved by having ring gear 172 coupled to output shaft 410.

Figure 65:
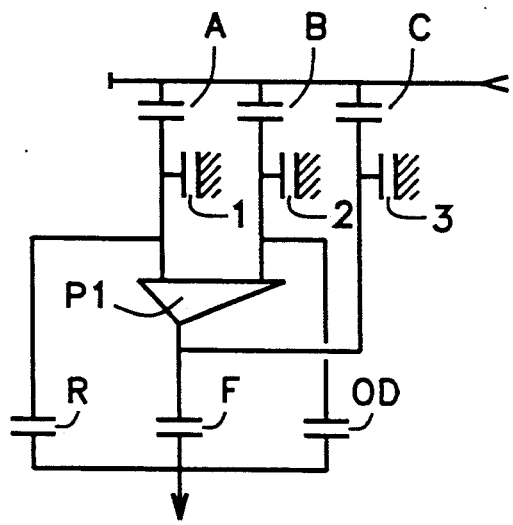
FIG. 65 is a symbolic diagram for a transmission similar to FIG. 63, with an OD clutch added to give a total of one reverse and five forward ratio states, including one overdrive and one high overdrive state.
Figure 66:
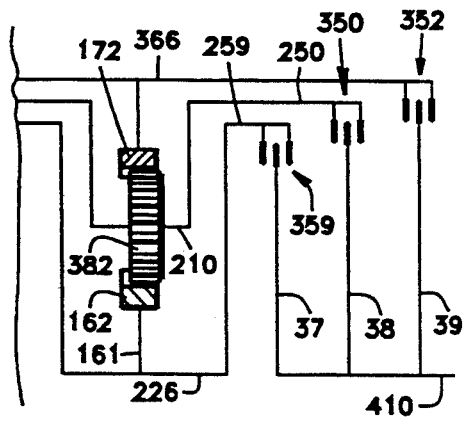
FIG. 66 shows a partial schematic representation corresponding to the embodiment of FIG. 65, whereby the full schematic can be obtained by substituting the partial schematic as shown for the right-hand side of the schematic of FIG. 64.

Description of FIGS. 65 and 66

Referring to FIG. 65, a symbolic diagram shows how a second high overdrive ratio state may be obtained by adding an OD clutch to allow coupling the sun gear 162 to the transmission output shaft 410 while the pinion carrier 210 is driven by actuation of C clutch 114. FIG. 66 shows a partial schematic representation corresponding to the embodiment of FIG. 65. The full schematic can be obtained by substituting the partial schematic as shown for the right-hand side of the schematic of FIG. 64. Reversing clutch 355 has been renamed reversing-/overdrive clutch 352 and forward clutch 350 is still needed for forward speeds 1–3. A high overdrive clutch 359 is added, however, to perform the function of OD clutch of FIG. 65. This clutch couples output shaft 410 to high overdrive clutch housing 259, which is coupled to sun gear hub 161 using a sleeve shaft 226. By applying C clutch 114, A brake clutch 120 and high overdrive clutch 359, a second overdrive ratio state is obtained, where with ring gear 172 stationary, the pinion carrier 210 is driven and the sun gear 162 is coupled to the transmission output. This gives three underdrive and two overdrive ratios and one reverse ratio for a total of six ratio states.

Figure 67:
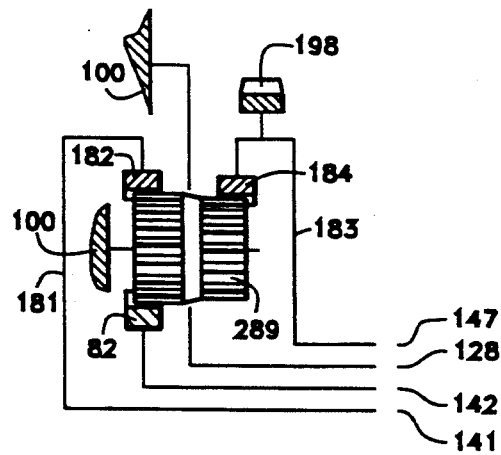
FIG. 67 shows a schematic input transmitter similar to that used in the embodiment of FIGS. 43 and 47, but using instead pinions having dual radii.

Description of FIG. 67

In addition to changing the number of teeth selected for each gearing element, the ratio patterns for CIVT's may also be altered if desired by introducing a greater variety of input shaft speeds. FIG. 67 shows an input transmitter similar to that used in the transmission of FIGS. 43 and 47, where the input transmitter pinions 288 have been replaced by dual radius pinions 289 that each are wide at the left axial end, and narrow at the axial right end. First ring gear 182 and sun gear 82 drivingly mesh with the wide left axial side of dual radius pinions 289, while second ring gear 184 drivingly meshes with the narrow right axial end of the dual radius pinions, allowing first ring gear 182 and second ring gear 184 to turn at different angular speeds.

Figure 68:
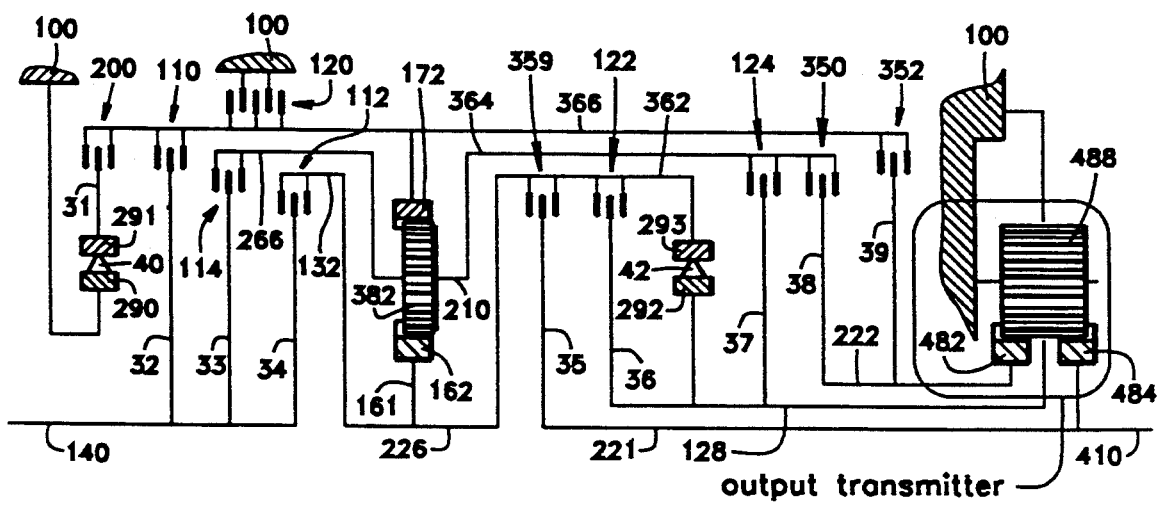
FIG. 68 shows the schematic embodiment functionally similar to that suggested by FIG. 66, but using instead an output transmitter.

Description of FIG. 68

In providing one or more kinematic degrees of freedom to any independent element of a geartrain, often a rearrangement of clutch devices, shafts, etc., will allow replacing the input transmitter structure with an "output transmitter." As an example of this, FIG. 68 shows a schematic embodiment functionally similar to that suggested in FIG. 66, but using instead an output transmitter. At the input end of the transmission is a conventional main input shaft 140, which by means of clutch inner hubs 32, 33, and 34, provides the driving members for clutches 110, 114, and 112, respectively. Drums 366 and 266 are again coupled to ring gear 172 and pinion carrier 210, respectively. A one-way clutch 40, A one-way direct clutch 200, and A brake clutch 120 are located as before in FIG. 66, but drum 262 has been replaced by a B clutch housing 132. Also, the B brake clutch 122, B one-way clutch 42 and C brake clutch 124 have been relocated to the axial right of planetary gearset P1. The output transmitter at the axial right resembles the input transmitter given previously in FIGS. 16, 19, and 23, having a plurality of fixed axis output transmitter pinions 488 which drivingly mesh with output transmitter sun gears 482 and 484. Output transmitter sun gear 482 is coupled to sleeve shaft 222, while output transmitter sun gear 484 is coupled to both sleeve shaft 221 and to output shaft 410. Reaction stator 128 passes radially between sleeve shafts 221 and 222 and emerges between the pinions 488 to bond to case 100. Sun gear 162 is now coupled via sun gear hub 161 to sleeve shaft 226, which in turn is coupled to both B clutch housing 132 and to drum 362. Drum 362 is fitted with a clutch housing for high overdrive clutch 359, which via clutch inner hub 35 selectively couples sleeve shaft 221 to drum 362. Drum 362 also accommodates B brake clutch 122, which selectively couples reaction stator 128 to drum 362 via clutch inner hub 36. Backward motion of drum 362 may be arrested by action of B one-way clutch 42, whose outer race 293 is coupled to the drum 362 and whose inner race 292 is coupled to the reaction stator 128. Pinion carrier 210 is coupled on its axial right side to drum 364, which is fitted with a clutch housing for C brake clutch 124. Application of C brake clutch 124 couples the drum 364 to reaction stator 128 via clutch inner hub 37. Drum 364 also houses or is coupled to a clutch housing for forward clutch 350, which selectively couples the drum 364 to sleeve shaft 222 via clutch inner hub 38. Sleeve shaft 222 is also coupled to a clutch inner hub 39 so that application of reversing- /overdrive clutch 352 can couple the sleeve shaft to drum 366, as before.

Figure 69:
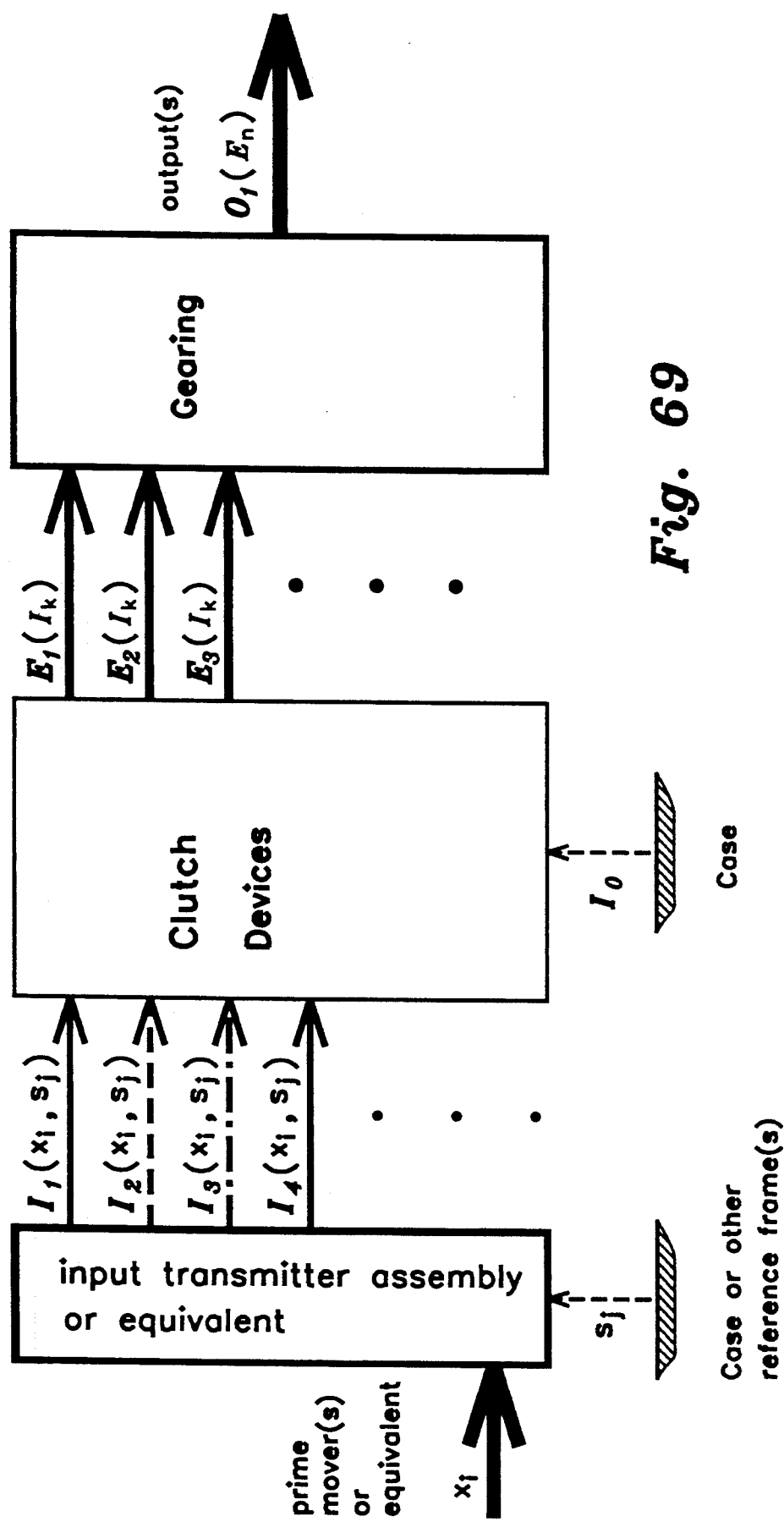
FIG. 69 shows one abstract representation of a generalized combinational incrementally variable transmission.

Description of FIG. 69

It is not possible here to show the nearly infinite number of transmissions that can result by applying the teachings of this disclosure. The many embodiments made possible may be differentiated by the following characteristics:

[1] Number and Type of Gearsets Used

Any type of gearing may be used, including the simple planetary gearsets discussed above, along with complex planetary gearsets having long and short dual pinion sets such as the well known Ravigneaux gearset, or single axis differential gearsets, etc. The gearsets may be mixed in any manner, with the permanent linkages or couplings between gearsets in any configuration. Single, double or multiple linkages between gearsets may be used as desired. Traditional gearing or non-geared transmission devices may be used that contain belts, traction rollers, etc.

[2] Type of Input Transmitter(s)

This includes the various input transmitters shown above, as well as those shown in FIGS. 70-72 below. Many arrangements are possible that are not specifically described here. As described above, input drive sprockets or epicyclic gearsets may be used as part of the input transmitter(s), or countershaft or offset gearing may be used as well, such as using countershaft gearing in place of the input transmitter pinions 288. As demonstrated in FIG. 68, output transmitters may also be used, either alone or with one or more input transmitters. Using both input and output transmitters can be useful in constructing a transmission with a high number of available ratio states while reducing the complexity of the input transmitter.

[3] Reaction Element(s)

Any number or placement of reaction stators or elements may be used as part of the input or output transmitter structures, so long as at least one reaction element is placed in the interior of a power transmitting structure or path. As mentioned, any reaction stator may be bonded to a rotating reference frame or allowed to rotate, becoming a reaction rotor.

[4] Clutching to Input Transmitter Driven Elements

Any arrangement may be used to couple selected input transmitter driven elements or power transmitting structures to available power transmitting paths.

[5] Clutching to Internal Gearing Elements or Shafts

As required, selected internal gearing elements or shafts may be coupled to one another, to alter power transmitting paths already driven, or to establish new ones.

[6] Clutching to Case or Reference Frame

This includes one-way clutches and brakes used to ground selected power transmitting paths and the various configurations used to obtain various engine braking options.

[7] Ratio Development

This includes the number of teeth chosen for each gearing element as well as changes in the overall transmission ratio by using initial or final ratio reduction gearing to suit the application.

FIG. 69 gives one possible general scheme, using a block diagram, that covers a large number of combinational incrementally variable transmissions and other transmissions obtained by using the teachings of this disclosure. At the left side, the block entitled, "input transmitter assembly or equivalent" is intended to represent any mechanical power transmitting assembly that has the effect of an input transmitter, that is, providing a set of driven or held coaxial structures for coupling into a plurality of power transmitting paths. For this purpose, power from one or more prime movers is delivered to the input transmitter at angular speed(s) $x_i$, where the index i specifies or enumerates each prime mover or mechanical equivalent. This is shown by the heavy arrow at the left of the block. The input transmitter will also make use of one or more reaction elements that are grounded in the transmission case or other reference frame, possessing angular speeds $s_j$. For the transmissions discussed above, these structures were the first and second reaction stators 128 and 129, where the angular speeds $s_1$ and $s_2$ for each structure, respectively, would equal zero, since they were bonded to the transmission case. The net effect of the input transmitter assembly is to provide a plurality of input structures in a substantially coaxial arrangement, that have angular speeds $I_k$ for coupling to various power transmitting paths. This is indicated by the arrows under $I_1$, $I_2$, $I_3$, etc. In principle, there is no restriction on the number of inputs $I_k$, but their coaxial arrangement, from the inner input to the outer input, must be such that at least one of the intermediate inputs (not the innermost or outermost) functions as a reaction stator or reaction element. The angular speed of each mechanical input, $I_k$, can be a function of $I_1$, $I_2$, $I_3$ . . . , and also of $s_1$, $s_2$, $s_3$ and thus generally:

$$I_k = I_k(x_i, s_j)$$

In the transmission of FIGS. 43 and 47, the input sprocket was driven by one prime mover at an angular speed $x_1$, and the reaction stator 128 was fixed at angular speed $s_1=0$. The input transmitter mechanically converted these inputs to four coaxial shafts or structures, namely, (from outermost to innermost) input shaft 147, reaction stator 128, input shaft 142 and inner shaft 141, having angular speeds $I_1$, $I_2$, $I_3$, and $I_4$, respectively.

The functional block entitled, "Clutch Devices" represents the means by which the mechanical inputs or structures at angular speeds $I_1$, $I_2$, $I_3$ . . . are coupled, selectively or otherwise, to a plurality of power transmitting paths at angular speeds $E_n$ that are shown as $E_1$, $E_2$, $E_3$, etc., adjacent to heavy arrows that are drawn pointing into the functional block entitled, "Gearing." In addition to using the inputs $I_1$, $I_2$, $I_3$ . . . , the clutch devices may use the transmission case to selectively ground or brake any of the power transmitting paths $E_n$, and this is represented at the bottom of the "Clutch Devices" block as an additional input $I_0$, where $I_0=0$. Generally, the array of clutching devices will allow that the angular speed $E_n$ of each power transmitting path is a function of $I_1$, $I_2$, $I_3$ . . . so that:

$$E_n = E_n(I_k)$$

In the transmission of FIGS. 43 and 47, the power transmitting paths corresponding to $E_1$, $E_2$, $E_3$ would be the first, second and third power transmitting paths driving second ring gear 174, first ring gear 172, and first sun gear 162, respectively.

The "Gearing" functional block represents any interconnected machine elements which are not part of the input transmitter and which transfer power from the plurality of gearing inputs $E_n$ to one or more outputs with angular speeds $O_1$, $O_2$, $O_3$, etc. It may also represent any internal clutching such as the forward clutch 350 or reversing clutch 355 in the various examples (e.g., FIGS. 43 and 47) above where power transmitting paths are altered or interrupted. The angular speed of each output is generally a function of $E_1$, $E_1$, $E_3$ ... and examples are found in Eqns. 2, 4, 5, 7, 8, 9, and 10 above. The gearing may also make use of the transmission case to permanently fix one or more gearing or machine elements, but typically this is not required. In a CIVT, all unlinked gearing elements can have two or more kinematic states and there is no need to have permanently grounded ring gears or the like, as is common in presently used transmissions.

As shown above and in FIGS. 70–72, the input transmitter, clutch devices, and gearing need not be arranged axially from left to right as shown. Portions or components corresponding to any of the three functional blocks may be located adjacent to components from another functional block. Many topological variations are possible. For example, an output sprocket may be located adjacent to components that perform clutching functions. Also, as previously mentioned, reaction stators may be replaced by reaction rotors that have a similar or identical structure, but rotating at constant or accelerating non-zero angular speeds $s_j$. In the case of the various epicyclic input transmitters disclosed above, replacing the reaction stator 128 with a reaction rotor would require that the input transmitter carrier 218 for the input transmitter pinions 288 also rotate to avoid parts interference. This would change the speed ratios between the input transmitter ring and sun gears, if any, but two or more input transmitter ring gears (or sun gears) would still turn in synchrony among themselves, regardless of the motion of the reaction rotor and input transmitter pinion carrier.

One can apply the methods taught here to provide maximum kinematic degrees of freedom to a four element gearset, such as disclosed in U.S. Pat. No. 4,864,892, Ando et. al., which employs a compound planetary gearset having first and second ring or internal gears, one long sun gear, and a plurality of meshing twin pinions interposed therebetween. The gearset resembles a simple planetary gearset with twin pinions, except that the inner set of the meshing twin pinions extends outward to allow engagement with an additional second ring gear. With one gearing element coupled to the transmission output, three gearing elements remain to be selectively driven. Using an appropriate input transmitter, we can provide each of the three remaining independent or unlinked gearing elements with at least one degree of freedom. This results in a minimum of $2^3-1$ or seven ratio states, instead of the maximum of five as disclosed in the patent, Using an input transmitter having additional driving elements such as an external reversing provision would yield even more ratio states, In a similar way, the compound planetary gearset used in the transmission of U.S. Pat. No. 4,884,472 to Miura is also not fully utilized. Miura also uses a four element compound planetary gearset, having first and second sun gears and one ring or internal gear. The gearset also resembles a simple planetary gearset with twin pinions, except that the outer set of meshing twin pinions meshingly engages with an additional second sun gear. Again, with one gearing element coupled to an output, three power transmitting paths may be established, giving at least seven ratio states instead of five. Instead, Miura adds a subtransmission to obtain five forward speeds and one reverse.

Another example is provided by U.S. Pat. No. 4,802,385 (Hiraiwa) which discloses a transmission using a five element compound planetary-type geartrain that uses dual non-meshing sets of pinions mounted on a single pinion carrier. The first set of pinions meshes with first sun and ring gears, while the second set of pinions meshes with second sun and ring gears. It is kinematically equivalent to two simple planetary gearsets having linked carriers. With the first ring gear coupled to the transmission output, this gearset has four kinematically independent or free gearing elements. Using an appropriate input transmitter, the teachings of this disclosure allows a minimum of $2^4-1$ or fifteen forward and reverse ratio states, instead of the six as disclosed by Hiraiwa. And of course, a complex input transmitter could present to the gearing more than one degrees of freedom for selected gearing elements, allowing for even more possible ratio states.

Similarly, the four planetary gearsets used in the previously mentioned U.S. Pat. No. 4,683,776 to Klemen could be better utilized using the instant invention. Klemen uses double linkages between the first and second and between the third and fourth planetary gearsets, with a single linkage or permanently coupling between the second and third sets. The transmission output is coupled to the pinion carrier of the fourth planetary gearset. Using only single linkages between gearsets allows that five gearing elements are independent and may be driven as desired. This allows power transmitting paths A–E as given in FIG. 58, with at least $2^5-1$ or thirty-one ratio states, with many more ratio states possible still with use of an appropriate input transmitter that allows two possible driving speeds for selected gearing elements in the geartrain.

Figure 70:
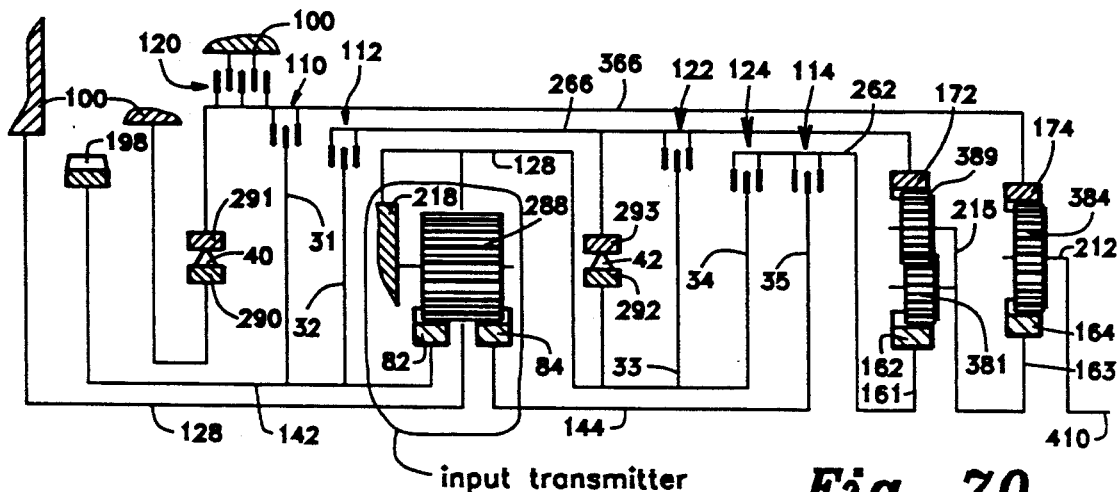
FIG. 70 shows a schematic representation of a transmission similar to that shown in FIG. 23, allowing placement of the input transmitter in the axial middle of the geartrain, and a different coaxial arrangement of shafts.

Description of FIG. 70

FIG. 70 shows a schematic representation of a transmission similar to that shown in FIG. 23, allowing placement of the input transmitter in the axial middle of the geartrain, and using a different coaxial arrangement of shafts. Many of the transmissions presented thus far may use instead the input transmitters in the way illustrated by example in FIGS. 70–72. Here the input transmitter is used to insert a reaction element into the interior of a power transmitting path or structure by allowing the path or structure to be split into two separate elements. Input sprocket 198 now drives only input shaft 142. Relative to FIG. 23, the input transmitter is now placed axially between B clutch 112 and B one-way clutch 42. Reaction stator 128 now originates from case 100, passing coaxially rightward through the interior of input shaft 142, and radially outward between input transmitter first and second sun gears 82 and which are coupled as before to input shafts 142 and 144, respectively. If the reaction stator 128 and the input transmitter were absent, the input shaft 142 would continue axially rightward through the geartrain, and would include input shaft 144 as shown. Said differently, a single input shaft "142–144" would pass coaxially rightward through the geartrain, and could allow coupling to the power transmitting paths 366, 266, and 262 by way of clutches 110, 112, and 114. It would not then be possible to selectively brake drum 262. Instead, however, this power transmitting structure has been split into two power transmitting elements, namely input shafts 142 and 144. Input transmitter pinions 288 provide a power bridge as before, assuring torque handling continuity of input shafts 142 and 144, while allowing reaction stator 128 to pass between them. Once radially outward of pinions 288, the reaction stator 128 bonds to a fixed input transmitter carrier 218 to the axial left of pinions 288 and also passes axially rightward to B one-way clutch 42, B brake clutch 122 and C brake clutch 124 as in FIG. 23. In this way, a reaction element 128 is placed inside a space that would have been inaccessible, bounded by input shaft "142–144" and power transmitting paths 366, 266, and

Figure 71:
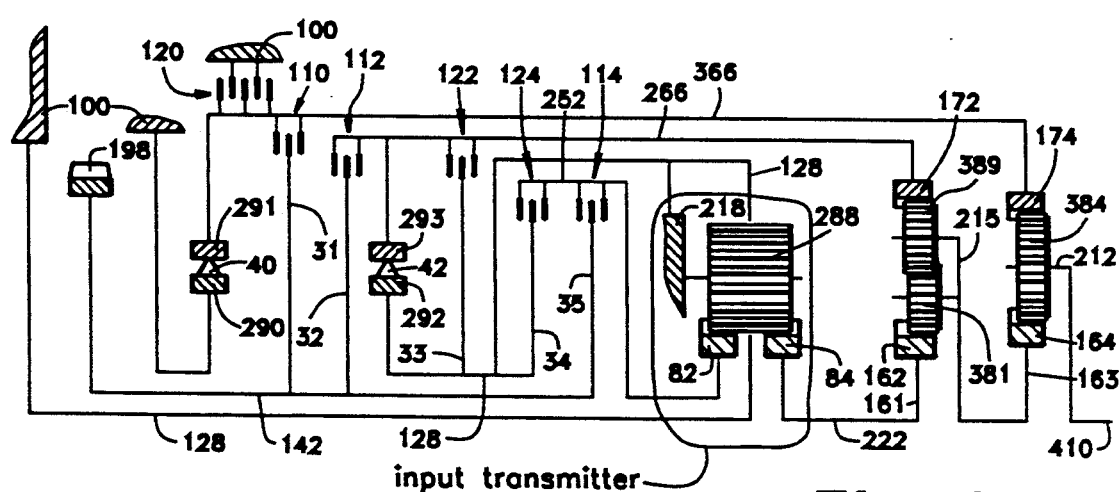
FIG. 71 shows a schematic representation of a transmission similar to that shown in FIG. 70, except now the input transmitter is used to insert a reaction element through a power transmitting path.

Description of FIG. 71

FIG. 71 shows a schematic representation of a transmission similar to that shown in FIG. 70, except now the input transmitter is used to insert a reaction element through the third power transmitting path formerly shown as drum 262, now labelled as C forward/reversing clutch housing 252. As shown, the input transmitter is located to the immediate axial left of first and second planetary gearsets P1 and P2. As in FIG. 70 input sprocket 198 now only drives input shaft 142, which now extends fully axially rightward so as to allow coupling through clutches 110, 112, and 114 as before. Also like FIG. 70, reaction stator 128 passes coaxially rightward through the interior of input shaft 142. The split power transmitting path now starts with the C forward-/reversing clutch housing 252, which now houses C brake clutch 124 and C clutch 114, and in the absence of the input transmitter and reaction stator 128, would continue axially rightward to couple with first sun gear hub 161. This third power transmitting path, however, is split into two power transmitting elements, namely C forward/reversing clutch housing 252 and what is now shown as sleeve shaft 222, which are coupled to input transmitter first sun gear 82 and input transmitter second sun gear 84, respectively. As in FIG. 70, reaction stator 128 passes radially outward between first and second sun gears 82 and 84, passes radially outward of pinions 288, and bonds to input transmitter carrier 218 to the axial left, continuing axially leftward to provide selective restraining means to C forward/reversing clutch housing 252 and drum 266 via C brake clutch 124, and B brake clutch 122 and B one-way clutch 42, respectively.

Figure 72:
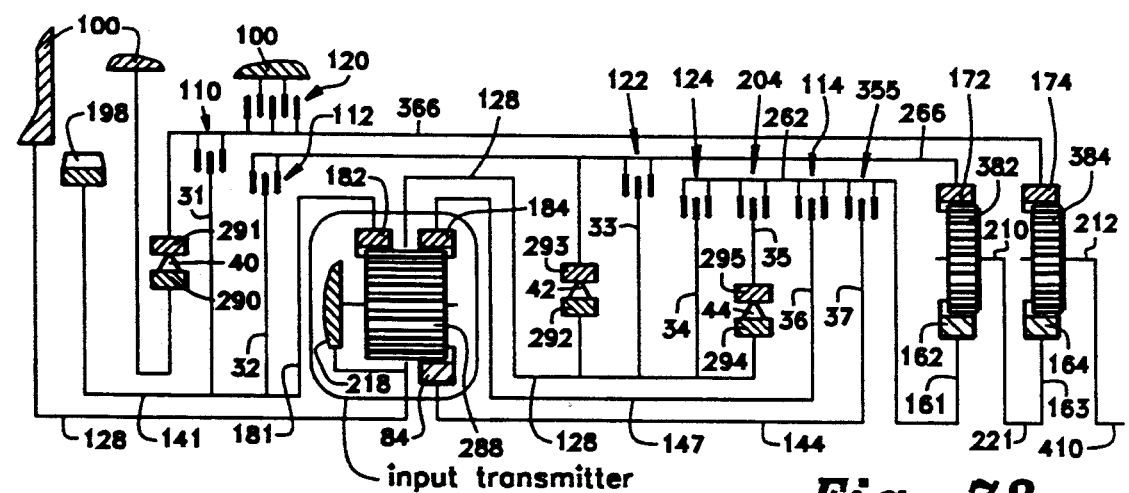
FIG. 72 shows a schematic representation of a transmission similar to that shown in FIG. 42, allowing placement of the input transmitter in the axial middle of the geartrain, and a different coaxial arrangement of shafts.

Description of FIG. 72

In a similar way, the complex input transmitter as shown in FIG. 42 can be moved to the axial middle of the geartrain, through a simple rearrangement of power transmitting paths whereby the third power transmitting path driving first sun gear 162 is interchanged with the second power transmitting path driving first ring gear 172, thus allowing the third power transmitting path to occupy the innermost drum 262. A one-way clutch 40 and A brake clutch 120 are located as in FIG. 42. Input sprocket 198 now drives inner shaft 141, which is drivingly coupled to clutch inner hubs 31 and 32 for use by A clutch 110 and B clutch 112, respectively. Inner shaft 141 is now coupled to input transmitter first ring gear 182 via first ring gear hub 181, with the input transmitter now located to the axial right of B clutch 112. Using a plurality of input transmitter pinions 288, a power bridge is established, allowing continuation of torque transfer from inner shaft 141 to input shaft 147, which is coupled to an input transmitter second ring gear 184. As in FIG. 42, pinions 288 also drive an input transmitter second sun gear 84, which is coupled to input shaft 144. Reaction stator 128 now passes from case 100 axially rightward through the interior of inner shaft 141, passes radially outward of pinions 288, bonds to input transmitter carrier 218 to the axial left of pinions 288, and then passes radially outward between first and second ring gears 182 and 184 to pass to the axial right for use by B one-way clutch 42, B brake clutch 122, C brake clutch 124 and C one-way clutch 44. Input shaft 147 passes coaxially rightward from input transmitter second ring gear 184 through the interior of reaction stator 128 to couple to clutch inner hub of C clutch 114. Input shaft 144 passes coaxially rightward through the interior of input shaft 147 from input transmitter second sun gear 84 to clutch inner hub 37 which is used by reversing clutch 355.

Figure 73:
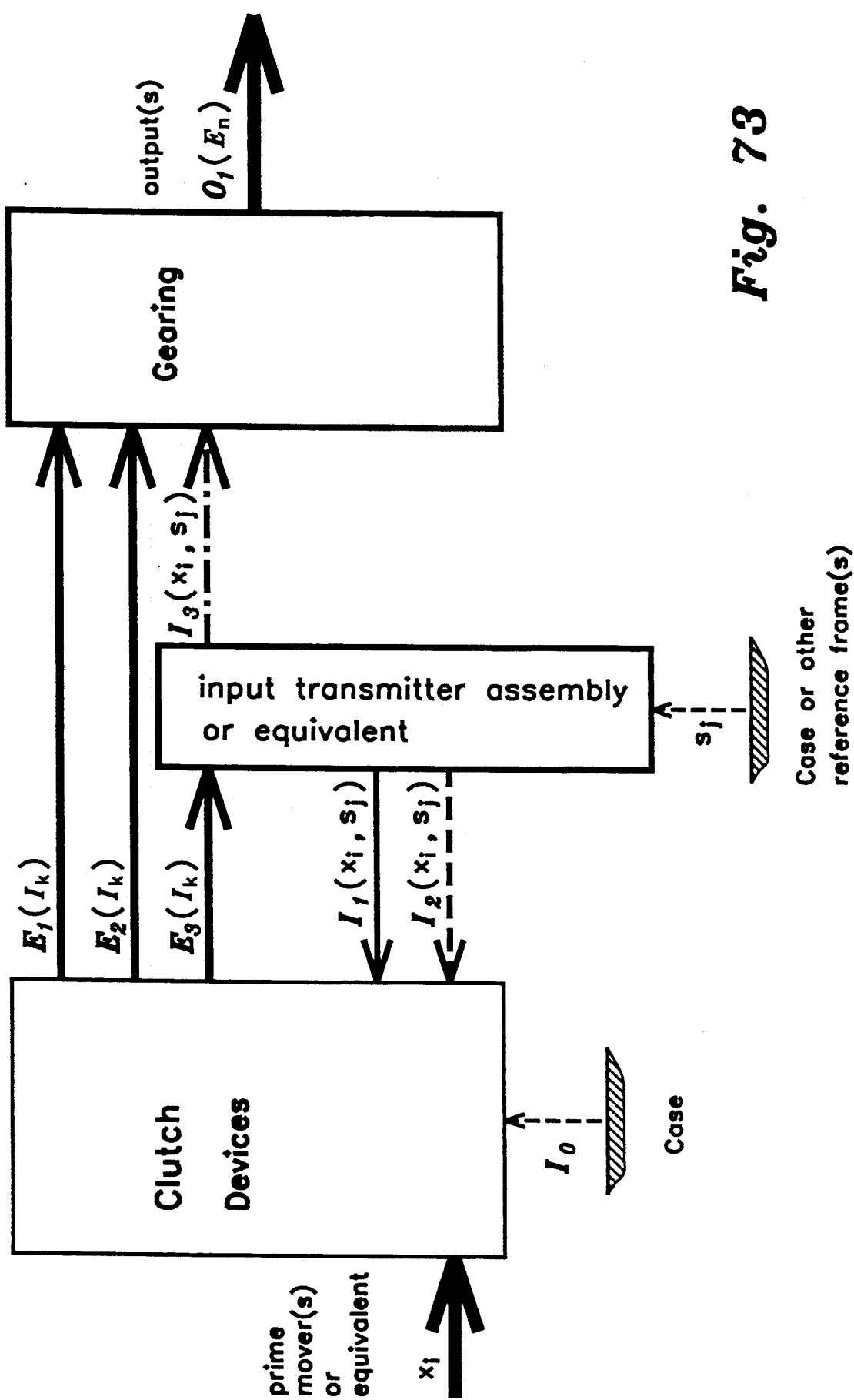
FIG. 73 shows one generalized abstract representation of a transmission like that shown in FIG. 71.

Description of FIG. 73

FIG. 73 gives one generalized abstract representation of a the transmission like that shown in FIG. 71. To show this, the arrangement shown in FIG. 69 has to be changed somewhat because the driving input to the input transmitter is not the "prime mover(s) or equivalent" but rather one of the power transmitting paths. The functional block "input transmitter assembly or equivalent" is located between "Clutch Devices" and "Gearing." The driving input(s) $x_i$ are fed directly to the clutch devices, which may selectively couple to power transmitting paths having angular speeds $E_1$, $E_2$, $E_3$, etc. As before, the input transmitter receives inputs from one or more one reaction elements having angular speeds $s_j$ and provides a plurality of inputs, having angular speeds $I_k$, for use by the clutch devices. The input transmitter also serves to connect the power transmitting path labelled with the angular speed $E_3$ (C forward-/reversing clutch housing 252 of FIG. 71) to the input transmitter output labelled with the angular speed $I_3$ (sleeve shaft 222 of FIG. 71). Generally, however, angular speed $E_3$ does not have to equal angular speed $I_k$—the sleeve shaft 222 of FIG. 71 could have been connected instead to a input transmitter second ring gear 184, such as found in FIG. 72 causing sleeve shaft 222 to exhibit reverse motion with respect to C forward/reversing clutch housing 252.

Alternate sources of power can be devised to drive one or more of the power transmitting paths in a CIVT, including other powertrains or assemblies, or even secondary movers such as electric motors. One could, for example, construct a "continuous shift" transmission where an electronically controlled electric motor drive allows ratio shifts with little or no dissipated energy at clutch mechanisms. This could be accomplished by coupling the electric motor armature to one or more of the power transmitting paths, or by using the electric motor to drive one or more reaction rotors. The reaction rotor(s) could be held stationary to provide transmission operation as given above, then driven by the auxiliary electric motor to increase or decrease the transmission output speed without changing the speed of the prime mover. When the transmission output speed reaches a speed synchronous with the targeted or desired speed ratio, a clutch application control system can initiate a ratio shift while deenergizing the auxiliary electric drive motor. This would allow for smooth, almost undetectable ratio shifts with little or no energy dissipated at clutch lining surfaces.

Using the teachings of this disclosure, transmissions having an extremely wide ratio range with many ratio increments may be constructed with a minimum of gearing hardware by linking additional gearsets to one another and using more complex input and/or output transmitters to allow coupling into the power transmitting paths created. By using input and/or output transmitters, all free gearing elements can have selective access to at least one input/output transmitter driving element. This insures topological compatibility, avoiding parts interference such as is discussed in [ref: Muller, p. 293]. Transmission inputs and outputs may be coupled to components at any point along the axis of the transmission, and may each occur at multiple locations. Many unforeseen applications may be found for these transmissions, such as use in locomotives or in stationary equipment such as lathes. For applications where clutch control is not critical, such as in bicycle drives, cascading of CIVT's can yield many ratio states with a minimum of gearing hardware and meshing losses. The five speed transmission of FIG. 66, for example, may be cascaded with itself to produce a transmission with twenty-five or more speeds using two planetary gearsets.

Obviously, many modifications and variations of the present invention are possible in light of the above teaching. It is therefore to be understood, that within the scope of the appended claims, the invention may be practiced otherwise than as specifically described or suggested here.

I claim:

1. An input arrangement to introduce a reaction stator into an interior of a power transmission having a plurality of power transmitting paths, comprising:
   first and second substantially coaxial power transmitting structures each disposed to permit individual selective coupling to at least one of said power transmitting paths;
   a mechanical reference frame (100);
   a reaction stator (128) coupled to said mechanical reference frame at a first axial location and positioned radially between said substantially coaxial power transmitting structures so as to permit selective coupling of said reaction stator to at least one said power transmitting path at a second axial location;
   means for selectively coupling said reaction stator to said power transmitting path at said second axial location, said reaction stator further positioned so as to permit said means for selectively coupling to be substantially located within the interior of at least one of said power transmitting paths, thereby allowing said reaction stator to provide a reaction force to at least one said power transmitting path in said power transmission using said means for selectively coupling at a location other than proximate the mechanical reference frame.

2. The input arrangement of claim 1, wherein said first and second power transmitting structures are driven by first and second input means for delivering power (312, 314) to said power transmission, respectively.

3. The input arrangement of claim 2, wherein the mechanical reference frame to which said reaction stator is coupled may rotate, thereby making said reaction stator a reaction rotor.

4. The input arrangement of claim 1, wherein said first and second power transmitting structures are drivingly coupled to first and second gear means, respectively; and further comprising at least one pinion means (288) gearingly meshing with both said first and second gear means, said pinion means being rotatably mounted on a carrier (218) which is substantially fixed in said mechanical reference frame; said pinion means and said carrier each being positioned circumferentially, radially, and axially so as not to interfere with said reaction stator proximate to said first axial location, thereby establishing a power bridge between said first and second power transmitting structures while still allowing said reaction stator to pass by said pinion means toward said second axial location.

5. The input arrangement of claim 4, wherein said first power transmitting structure is driven by an input means for delivering power (312) to said power transmission.

6. The input arrangement of claim 4, wherein said first and second gear means are sun gears.

7. The input arrangement of claim 4, wherein said first and second gear means are ring gears.

8. The input arrangement of claim 4, wherein said first gear means is a sun gear and said second gear means is a ring gear.

9. The input arrangement of claim 4, wherein said first gear means is a ring gear and said second gear means is a sun gear.

10. An input arrangement to introduce a reaction stator into an interior of a power transmission having a plurality of power transmitting paths, comprising:
    first and second substantially coaxial power transmitting structures, drivingly coupled to first and second gear means, respectively;
    a mechanical reference frame (100);
    a reaction stator (128) coupled to said mechanical reference frame at a first axial location and positioned axially between said first and second substantially coaxial power transmitting structures and first and second gear means so as to permit selective coupling of said reaction stator to at least one said power transmitting path at a second axial location,
    at least one portion means (288) gearingly meshing with both said first and second gear means, said pinion means being rotatably mounted on a carrier (218) which is substantially fixed in said mechanical reference frame;
    said pinion means and said carrier each being positioned circumferentially, radially, and axially so as not to interfere with said reaction stator proximate to said first axial location, thereby establishing a power bridge between said first and second power transmitting structures while still allowing said reaction stator to pass by said pinion means toward said second axial location;
    means for selectively coupling said reaction stator to said power transmitting path at said second axial location, said reaction stator further positioned so as to permit said means for selectively coupling to be substantially located within the interior of at least one of said power transmitting paths, thereby allowing said reaction stator to provide a reaction force to at least one said power transmitting path in said power transmission using said means for selectively coupling at a location other than proximate the mechanical reference frame.

11. The input arrangement of claim 10, wherein said first and second gear means are sun gears.

12. The input arrangement of claim 10, wherein said first and second gear means are ring gears.

13. The input arrangement of claim 10, wherein said first gear means is a sun gear and said second gear means is a ring gear.

14. The input arrangement of claim 10, wherein said first gear means is a ring gear and said second gear means is a sun gear.

15. The input arrangement of claim 10, wherein the mechanical reference frame to which said reaction stator is coupled may rotate, thereby making said reaction stator a reaction rotor.

* * * * *